United States Patent
Cole et al.

(10) Patent No.: US 11,661,468 B2
(45) Date of Patent: May 30, 2023

(54) ADDITIVE MANUFACTURING USING VARIABLE TEMPERATURE-CONTROLLED RESINS

(71) Applicant: Align Technology, Inc., San Jose, CA (US)

(72) Inventors: Michael Christopher Cole, San Jose, CA (US); Peter Dorfinger, Los Altos Hills, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/458,192

(22) Filed: Aug. 26, 2021

(65) Prior Publication Data

US 2022/0098350 A1 Mar. 31, 2022

Related U.S. Application Data

(60) Provisional application No. 63/071,124, filed on Aug. 27, 2020.

(51) Int. Cl.
*B29C 64/124* (2017.01)
*C08F 283/01* (2006.01)
(Continued)

(52) U.S. Cl.
CPC ............. *C08F 283/01* (2013.01); *A61C 7/08* (2013.01); *A61C 7/10* (2013.01); *B29C 64/124* (2017.08);
(Continued)

(58) Field of Classification Search
CPC ... B29C 64/124; B29C 64/223; B29C 64/295; B29C 64/314; B33Y 10/00; B33Y 30/00;
(Continued)

(56) References Cited

U.S. PATENT DOCUMENTS 5,820,368 A 10/1998 Wolk
5,975,893 A 11/1999 Chishti et al.
(Continued)

FOREIGN PATENT DOCUMENTS

DE 102018215002 A1 * 3/2020
WO WO-2015075094 A1 5/2015
(Continued)

OTHER PUBLICATIONS

DE-102018215002-A1, Obst et al., published Mar. 5, 2020, machine translation to English (Year: 2020).*
(Continued)

*Primary Examiner* — Joseph S Del Sole
*Assistant Examiner* — Lawrence D. Hohenbrink, Jr.
(74) *Attorney, Agent, or Firm* — Seed IP Law Group LLP

(57) ABSTRACT

Provided herein are systems and processes to control multiple temperatures in additive manufacturing. Such temperature control adjusts polymer properties and facilitates processing of materials to form 3D objects. The systems and processes disclosed herein also facilitate the processing of typically difficult-to-process materials and deliver such materials to a photocuring zone configured to photopolymerize materials into 3 dimensional objects with a layer-by-layer process. Such processes can include the steps of heating a resin to a flowable temperature, applying the resin to a carrier, cooling the film to increase viscosity or to solidify the resin, and applying the film containing the resin onto an area being printed, then photocuring the film. Also provided herein are resins and related polymer materials having properties that are tunable with exposure to more than one temperature zone. The formed polymers can include multiple regions of polymer material, each independently having distinct properties. Processes and systems are also provided herein that are configured to produce poly-
(Continued)

meric materials having multiple regions with distinct properties from a single-component formulation.

25 Claims, 17 Drawing Sheets

(51) Int. Cl.
| | |
|---|---|
| *B33Y 10/00* | (2015.01) |
| *A61C 7/08* | (2006.01) |
| *A61C 7/10* | (2006.01) |
| *B29C 64/223* | (2017.01) |
| *B33Y 70/00* | (2020.01) |
| *B33Y 80/00* | (2015.01) |
| *B33Y 30/00* | (2015.01) |
| *B29C 64/295* | (2017.01) |
| *B29C 64/314* | (2017.01) |
| *B33Y 40/10* | (2020.01) |
| *B33Y 50/02* | (2015.01) |

(52) U.S. Cl.
CPC ............ *B33Y 10/00* (2014.12); *B29C 64/223* (2017.08); *B29C 64/295* (2017.08); *B29C 64/314* (2017.08); *B33Y 30/00* (2014.12); *B33Y 40/10* (2020.01); *B33Y 50/02* (2014.12); *B33Y 70/00* (2014.12); *B33Y 80/00* (2014.12)

(58) Field of Classification Search
CPC ......... B33Y 40/10; B33Y 50/02; B33Y 70/00; B33Y 80/00
USPC ........................................................ 264/401
See application file for complete search history.

(56) References Cited

U.S. PATENT DOCUMENTS

| | | | |
|---|---|---|---|
| 6,183,248 B1 | 2/2001 | Chishti et al. |
| 6,309,215 B1 | 10/2001 | Phan et al. |
| 6,386,864 B1 | 5/2002 | Kuo |
| 6,450,807 B1 | 9/2002 | Chishti et al. |
| 6,454,565 B2 | 9/2002 | Phan et al. |
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,892,474 B2 | 2/2011 | Shkolnik et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,162,264 B2 | 12/2018 | McLeod et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |

(56) References Cited

U.S. PATENT DOCUMENTS

| | | |
|---|---|---|
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2014/0061974 A1 | 3/2014 | Tyler |
| 2014/0067334 A1 | 3/2014 | Kuo |
| 2014/0265034 A1 | 9/2014 | Dudley |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0265376 A1 | 9/2015 | Kopelman |
| 2015/0366638 A1 | 12/2015 | Kopelman et al. |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2017/0297264 A1* | 10/2017 | Linnell ............ B29C 64/129 |
| 2018/0153648 A1 | 6/2018 | Shanjani et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0084230 A1* | 3/2019 | Stadlmann ............ B29C 64/135 |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1* | 8/2019 | Shanjani ............ A61C 7/08 |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

FOREIGN PATENT DOCUMENTS

| | | |
|---|---|---|
| WO | WO-2016078838 A1 | 5/2016 |
| WO | WO-2018032022 A1 | 2/2018 |

OTHER PUBLICATIONS

Tumbleston J.R., et al., "Continuous Liquid Interface Production of 3D Objects," Science (Mar. 2015), vol. 347.6228: pp. 1349-1352.

* cited by examiner

ADDITIVE MANUFACTURING USING VARIABLE TEMPERATURE-CONTROLLED RESINS

CROSS-REFERENCE

This application claims the benefit of U.S. Provisional Patent Application No. 63/071,124, filed Aug. 27, 2020, the contents of which is incorporated herein by reference in its entirety.

BACKGROUND OF THE INVENTION

Three-dimensional (3D) printers are important devices used in the production of polymeric 3D objects. Material, such as polymeric resin, is typically brought together in a layer-by-layer process and the material is solidified to form the 3D objects. Such additive manufacturing enables the formation of complex and useful structures.

SUMMARY OF THE INVENTION

Provided herein are systems and processes for providing controlled and variable temperature zones for use in additive manufacturing of polymeric materials. Such temperature control enables adjustment and control of polymer properties and facilitates processing of materials to form 3D polymer objects. The systems and processed disclosed herein also facilitate the processing of typically difficult-to-process materials (e.g., solid resins) and to deliver such materials to a photocuring zone configured to photopolymerize the materials into a three-dimensional object in a layer-by-layer process. As described further herein, such processes can include the steps of heating a resin to a flowable temperature, applying the resin to a carrier (e.g., a film), cooling the film to increase viscosity or to solidify the resin, and applying the film containing the resin onto an area being printed, then photocuring the film. Also described herein, unused resin can be reused through this process.

Also provided herein are resins and related polymer materials having properties that are tunable with exposure to more than one temperature zone. In some embodiments the formed polymers include multiple regions of polymer material, each independently having distinct properties. Processes and systems are also provided herein that are configured to produce polymeric materials having multiple regions with distinct properties (e.g., such as a composite material or a multiphase system) from a single-component formulation.

As further described herein, by selectively heating or cooling regions of a resin prior to (or during) polymerization the resultant physical properties of the polymerized material are controllable. In certain embodiments described herein, this process is performed on a layer-by-layer basis, and the material and/or the polymer properties of a printed 3D polymer object are controlled 3-dimensionally. This disclosure provides, in part, printed objects having distinct moduli in different regions (e.g., phases in a multiphase system), such as glass transition temperature, elasticity, water uptake, and hardness.

In various aspects, the present disclosure provides a method for producing a polymeric material, the method comprising: providing a resin; controlling a controlling a temperature of the resin, the resin comprising: a first region having a first temperature; and a second region having a second temperature; and polymerizing the resin to form a polymeric material. In some aspects, controlling the temperature of the resin is spatially controlled. In some aspects, controlling the temperature of the resin is spatially controlled in an x-y dimension. In certain aspects, controlling the temperature of the resin is spatially controlled perpendicular to a photocuring light source. In some aspects, controlling the temperature of the resin is spatially controlled in an x-dimension, y-dimension, and/or z-dimension. In certain aspects, the z-dimension is the direction of light emanating from a photocuring light source.

In some aspects, polymerizing the polymeric material further comprises producing a first polymerized region and a second polymerized region. In certain aspects, the first polymerized region has at least one characteristic different from the second polymerized region, the at least one characteristic selected from the group consisting of elongation at break, storage modulus, tensile modulus, and stress remaining, color, transparency, hydrophobicity, lubricity, surface texture, percent crystallinity, phase composition ratio.

In certain aspects, controlling the temperature comprises heating or cooling the resin at the first region to the first temperature. In some aspects, controlling the temperature comprises heating or cooling the resin at the second region to the second temperature. In some aspects, heating the resin at the first region and/or heating the resin at the second region comprises exposure to a light source. In certain aspects, the light source is an infrared light source. In some aspects, the difference between the first temperature and the second temperature is 5° C. or greater, 10° C. or greater, 15° C. or greater, 20° C. or greater, 30° C. or greater, 40° C. or greater, 50° C. or greater, or greater than 50° C.

In some aspects, polymerizing the resin comprises photopolymerization.

In certain aspects, the method for producing a polymeric material further comprises providing a mask. In some aspects, the method for producing a polymeric material further comprises thermally curing the polymeric material. In certain aspects, the method for producing a polymeric material further comprises photo-curing the polymeric material. In some aspects, the method for producing a polymeric material further comprises applying the resin to a substrate. In certain embodiments, the substrate comprises a fluoropolymer. In some aspects, the method for producing a polymeric material further comprises fabricating an object. In certain aspects, the fabricating comprises printing the resin with a 3D printer. In certain aspects, the fabricating comprises stereolithography, digital light processing, two photon-induced photopolymerization, inkjet printing, multijet printing, fused deposition modeling, or any combination thereof. In some aspects, the object comprises a plurality of regions having at least one differing characteristic, the at least one differing characteristic selected from the group consisting of elongation at break, storage modulus, tensile modulus, stress remaining, glass transition temperature, water uptake, hardness, color, transparency, hydrophobicity, lubricity, surface texture (e.g., surface finish—matte, gloss), percent crystallinity, and phase composition ratio. In certain aspects, the plurality of regions each have a size dimension less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In some aspects, the voxel size for any particular region has a one to 3 size dimensions less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm.

In some aspects, the resin comprises a crystalline material and one of the first region or the second region comprises the crystalline material in melted form. In certain aspects, the resin is homogenous. In some aspects, the resin phase separates into two or more phases before polymerization. In certain aspects, the resin phase separates upon a change in temperature. In certain aspects, the resin phase separates upon photopolymerization.

In some aspects, the resin comprises a plurality of monomers, the majority of which copolymerize at the first temperature and homopolymerize at the second temperature. In some aspects, the resin comprises a plurality of monomers, the majority of which copolymerize at the second temperature and homopolymerize at the first temperature.

In certain aspects, controlling the temperature of the resin initiates a secondary chemical reaction. In some aspects, the secondary chemical reaction comprises an ionic thermal reaction, an epoxide polymerization, an ionic thermal polymerization, a bond breaking reaction, a bond forming reaction, activation of a catalyst, or any combination thereof.

In some aspects, the object is an orthodontic appliance. In certain aspects, the orthodontic appliance is an aligner, expander or spacer. In some aspects, the orthodontic appliance comprises a plurality of tooth receiving cavities configured to reposition teeth from a first configuration toward a second configuration. In certain aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In certain aspects, the orthodontic appliance is an aligner.

In various aspects, the present disclosure provides a polymeric material formed from the method for producing a polymeric material disclosed herein. In certain aspects, the polymeric material is characterized by one or more of: an elongation at break greater than or equal to 5%; a storage modulus greater than or equal to 500 MPa; a tensile modulus greater than or equal to 500 MPa; a stress remaining greater than or equal to 0.01 MPa; and a flexural modulus greater than or equal to 60 MPa after soaking in water for 24 hours. In some aspects, the polymeric materials is characterized by an elongation at break greater than or equal to 5%. In certain aspects, the polymeric materials is characterized by a storage modulus greater than or equal to 500 MPa. In some aspects, the polymeric materials is characterized by a tensile modulus greater than or equal to 500 MPa. In certain aspects, the polymeric materials is characterized by a stress remaining greater than or equal to 0.01 MPa. In some aspects, the polymeric materials is characterized by a flexural modulus greater than or equal to 60 MPa after soaking in water for 24 hours. In certain aspects, the polymeric material is characterized by a stress remaining of 5% to 45% of the initial load, or a stress remaining of 20% to 45% of the initial load. In some aspects, the polymeric material is characterized by a tensile modulus from 500 MPa to 2000 MPa or a tensile modulus from 800 MPa to 2000 MPa.

In some aspects, the polymeric material is characterized by: an elongation at break greater than or equal to 5%; a storage modulus greater than or equal to 500 MPa; a tensile modulus greater than or equal to 500 MPa; and a stress remaining greater than or equal to 0.01 MPa.

In certain aspects, the polymeric material is characterized by an elongation at break greater than 10%, an elongation at break greater than 20%, an elongation at break greater than 30%, an elongation at break of 5% to 250%, an elongation at break of 20% to 250%, or an elongation at break value between 40% and 250%. In some aspects, the polymeric material is characterized by a storage modulus of 0.1 MPa to 4000 MPa, a storage modulus of 300 MPa to 3000 MPa, or a storage modulus of 750 MPa to 3000 MPa. In certain aspects, the polymeric material is characterized by a stress remaining of 0.01 MPa to 15 MPa, or a stress remaining of 2 MPa to 15 MPa. In some aspects, the stress remaining is measured after 24 hours soaking in aqueous solution.

In various aspects, the present disclosure provides an object comprising: a first region comprising a first plurality of monomers, the first region characterized by a first set of physical properties; and a second region comprising a second plurality of monomers, the second region characterized by a second set of physical properties, wherein first plurality of monomers and the second plurality of monomers are similar, and the first set of physical properties and the second set of physical properties are different. In some aspects, the first plurality of monomers and the second plurality of monomers are substantially the same. In certain aspects, the object is formed from a single resin. In some aspects, the single resin is homogenous.

In some aspects, the object further comprises a third region comprising a third plurality of monomers and characterized by a third set of physical properties, wherein the first plurality of monomers, the second plurality of monomers, and the third plurality of monomers are similar, and the first set of physical properties, the second set of physical properties, and the third set of physical properties are different from one another. In some aspects, the first plurality of monomers, the second plurality of monomers, and the third set of monomers are substantially the same. In certain aspects, the third region is more amorphous than the first region and the second region.

In various aspects, the present disclosure provides a system for forming an object, the system comprising: a resin injector configured to dispense a resin; a first temperature-controlling element; a source of light; a build platform configured to hold the object; and a carrier platform configured to carry the resin from the resin injector to the first temperature-controlling element, the source of light, and the build platform.

In various aspects, the present disclosure provides a system for forming an object, the system comprising: a printhead comprising: a resin injector configured to dispense a resin; a first temperature-controlling element; and a source of light; and a build platform configured to hold the object. In certain aspects, the printhead is configured to dispense the resin onto the build platform, forming a deposited layer. In some aspects, the printhead is configured to dispense the resin onto the deposited layer. In certain aspects, the printhead comprises a plurality of resin injectors, each configured to dispense an individual resin. In some aspects, the printhead further comprises an infrared heating element. In certain aspects, the printhead is configured to move horizontally. In some aspects, the printhead is configured to move horizontally in a two-dimensional plane. In certain aspects, the printhead is configured to move vertically. In some aspects, the printhead is configured to move in three spatial dimensions.

In some aspects, the build platform is configured to move horizontally, to move horizontally in a two-dimensional plane, to move vertically, or to move in three spatial dimensions. In certain aspects, the first temperature-controlling element is positioned after the resin injector and is configured to decrease the temperature of the resin. In some aspects, the first temperature-controlling element is positioned after the thickness controller and is configured to decrease the temperature of the resin. In certain aspects, the first temperature-controlling element is positioned in the resin injector and is configured to increase the temperature of the resin. In some aspects, the first temperature-controlling element comprises a cooling plate. In certain aspects, the cooling plate is connected to a chiller or a thermoelectric cooling system. In some aspects, the resin injector heats the resin.

In some aspects, the system for forming an object further comprises a second temperature-controlling element. In certain aspects, the second temperature-controlling element is configured to increase the temperature of the resin. In some aspects, the second temperature-controlling element comprises a heater. In certain aspects, the second temperature-controlling element is a re-melter. In some aspects, the second temperature-controlling element comprises a source of light.

In certain aspects, the carrier platform is configured to move at a first rate along a horizontal plane, and the build platform is configured to move at a second rate along a horizontal plane, the first rate substantially similar to the second rate. In some aspects, the build platform is configured to apply a pressure to the carrier platform or receive a pressure from the carrier platform.

In some aspects, the resin injector is configured to dispense the resin in a heated form. In certain aspects, the carrier platform is a film. In some aspects, the source of light is configured to emit ultraviolet light, infrared light, visible light, or any combination thereof.

In certain aspects, the system for forming an object further comprises a layer thickness controller. In some aspects, the layer thickness controller comprises a doctor blade.

In some aspects, the carrier platform is configured to iteratively apply the resin to the build platform and/or to a resin applied thereon.

In certain aspects, the second temperature-controlling element is configured to heat an uncured resin attached to the carrier platform. In some aspects, the second temperature-controlling element is configured to heat the uncured resin after the carrier platform passes the build platform.

In some aspects, the system is configured to recycle uncured resin.

In certain aspects, the system for forming an object further comprises an infrared heating element. In some aspects, the infrared heating element is configured to warm a region of the resin. In some aspects, the region is warmed to a temperature relatively higher than a portion of the resin outside of the region. In certain aspects, the infrared heating element is positioned below the carrier platform. In some aspects, the infrared heating element is positioned above the carrier platform. In some aspects, the infrared heating element is configured to emit microwave light.

In some aspects, the system for forming an object further comprises a particulate dispenser. In some aspects, the particulate dispenser is a hopper or a sprayer. In certain aspects, the particulate dispenser is configured to apply an adhesion promoter to the resin. In some aspects, the adhesion promoter comprises a powdered adhesion promoter or a liquid adhesion promoter. In certain aspects, the adhesion promoter comprises an infrared absorbing compound, carbon black, a dye, a multiphoton absorber, a metal particle, a nanoparticle, water absorbed into silica, or any combination thereof. In some aspects, the adhesion promoter comprises an adhesive and/or a monomer system. In certain aspects, the particulate dispenser is configured to dispense an optical absorber to the resin. In some aspects, the optical absorber is applied as a thin layer. In some aspects, the optical absorber is applied to at least one side of the resin. In certain aspects, the optical absorber is applied to one side of the resin. In some aspects, the optical absorber is applied to at least two sides of the resin. In certain aspects, the optical absorber is applied to two sides of the resin. In certain aspects, the particulate dispenser is further configured to dispense an adhesion promoter, adhesion monomers, or a combination thereof. In some aspects, the particulate dispenser is configured to apply an adhesion resistor to the resin. In certain aspects, the adhesion resistor prevents layers of the resin from sticking together.

In some aspects, the carrier platform is configured to transport an uncured resin from the build platform to the resin injector. In certain aspects, the carrier platform is configured to transport the uncured resin from the build platform to a re-melter and from the re-melter to the resin injector.

In some aspects, the carrier platform is configured to move along a horizontal plane, and the build platform is configured to move along a vertical plane. In certain aspects, the carrier platform is configured to move along a vertical plane.

In certain aspects, the system for forming an object further comprises a first feed roll configured to dispense the carrier platform absent the resin, and a first take up reel configured to receive the carrier platform carrying uncured resin.

In some aspects, the first temperature-controlling element comprises a cooling plate, an air fan, a water bath, a cold roller, or any combination thereof. In some aspects, the first temperature-controlling element dispenses air, an inert gas, or a rapidly evaporating material. In certain aspects, the rapidly evaporating material comprises butane, liquid nitrogen, solid carbon dioxide, or a combination thereof.

In certain aspects, the resin injector and the first temperature-controlling device are positioned between the first feed roll and the first take up reel. In some aspects, the second temperature-controlling device, the particulate dispenser, or a combination thereof are positioned between the first feed roll and the first take up reel.

In some aspects, the system for forming an object further comprises a second feed roll and a second take up reel. In certain aspects, the first take up reel is the second feed roll. In some aspects, the build platform is configured to receive the resin from the carrier platform. In certain aspects, the light source and the build platform are positioned between the second feed roll and the second take up reel. In some aspects, the infrared heating element is positioned between the second feed roll and the second take up reel.

In certain aspects, the system for forming an object further comprises a window positioned between the light source and the build platform. In some aspects, the system for forming an object further comprises a cutting device. In certain aspects, the cutting device comprises a die cutter, a laser cutter, a knife blade, other cutting means, or another cutting mechanism. In some aspects, the cutting device is configured to cut uncured resin into a plurality of uncured resin sheets. In certain aspects, the system for forming an object further comprises a robotic arm configured to move at least some of the plurality of uncured resin sheets. In some aspects, the robotic arm is configured to move at least some of the plurality of uncured resin sheets to the build platform. In certain aspects, the system for forming an object further comprises a storage device configured to store the plurality of uncured resin sheets. In some aspects, the system for forming an object further comprises a mask.

In some aspects, the object is an orthodontic appliance. In certain aspects, the orthodontic appliance is an aligner, expander or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In certain aspects, the orthodontic appliance is an aligner.

In various aspects, the present disclosure provides a method of forming a cured polymeric material, the method comprising using the system for forming an object as disclosed herein.

In various aspects, the present disclosure provides a method of forming a cured polymeric material, the method comprising: heating a resin; applying the resin to a carrier platform; adjusting the temperature of the applied resin with a first temperature-controlling element; applying the resin onto a receiving component; and curing at least a portion of the resin to form the cured polymeric material.

In some aspects, the resin is heated to a flowable temperature. In certain aspects, the carrier platform is a film. In some aspects, adjusting the temperature comprises cooling the resin. In certain aspects, the region comprises a build platform. In some aspects, the region comprises a layer of applied resin on top of the build platform. In certain aspects, curing at least a portion of the resin comprises exposure to a source of light.

In some aspects, the method of forming a cured polymeric material further comprises transporting the resin from a resin injector to the first temperature-controlling element, from the first temperature-controlling element to the build platform, from the first temperature-controlling element to a light source, or any combination thereof. In certain aspects, the method of forming a cured polymeric material further comprises transporting an uncured portion of the resin from the light source and/or from the build platform to a second temperature-controlling device. In some aspects, the second temperature-controlling device heats the uncured portion of the resin to melt the uncured portion of the resin. In certain aspects, curing the at least the portion of the resin comprises photopolymerization.

In various aspects, the present disclosure provides a method of polymerizing a resin, the method comprising: applying a first temperature to the resin; applying a second temperature to the resin; and curing at least a portion of the resin to form a cured polymeric material. In some aspects, the method of polymerizing a resin further comprises fabricating an object. In certain aspects, the fabricating comprises printing the resin with a 3D printer. In some aspects, the fabricating comprises stereolithography, digital light processing, two photon-induced photopolymerization, inkjet printing, multijet printing, fused deposition modeling, or any combination thereof.

In some aspects, a first portion of the resin is cured at the first temperature. In certain aspects, a second portion of the resin is cured at the second temperature.

In certain aspects, the method of polymerizing a resin further comprises placing a first layer of the resin on top of a second layer of the resin.

In some aspects, the method of polymerizing a resin further comprises applying a pressure to at least one of the first layer of the resin or the second layer of the resin. In some aspects, applying the pressure adheres the first layer of the resin to the second layer of the resin.

In certain aspects, the method of polymerizing a resin further comprises iteratively building layers of the resin.

In some aspects, the object is in contact with a portion of uncured resin. In certain aspects, the object is encompassed by uncured resin. In certain aspects, the method of polymerizing a resin further comprises removing the uncured resin. In some aspects, removing the uncured resin comprises heating the object. In certain aspects, removing the uncured resin comprises application of microwave energy. In some aspects, the removing of the uncured resin comprises use of solvent.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
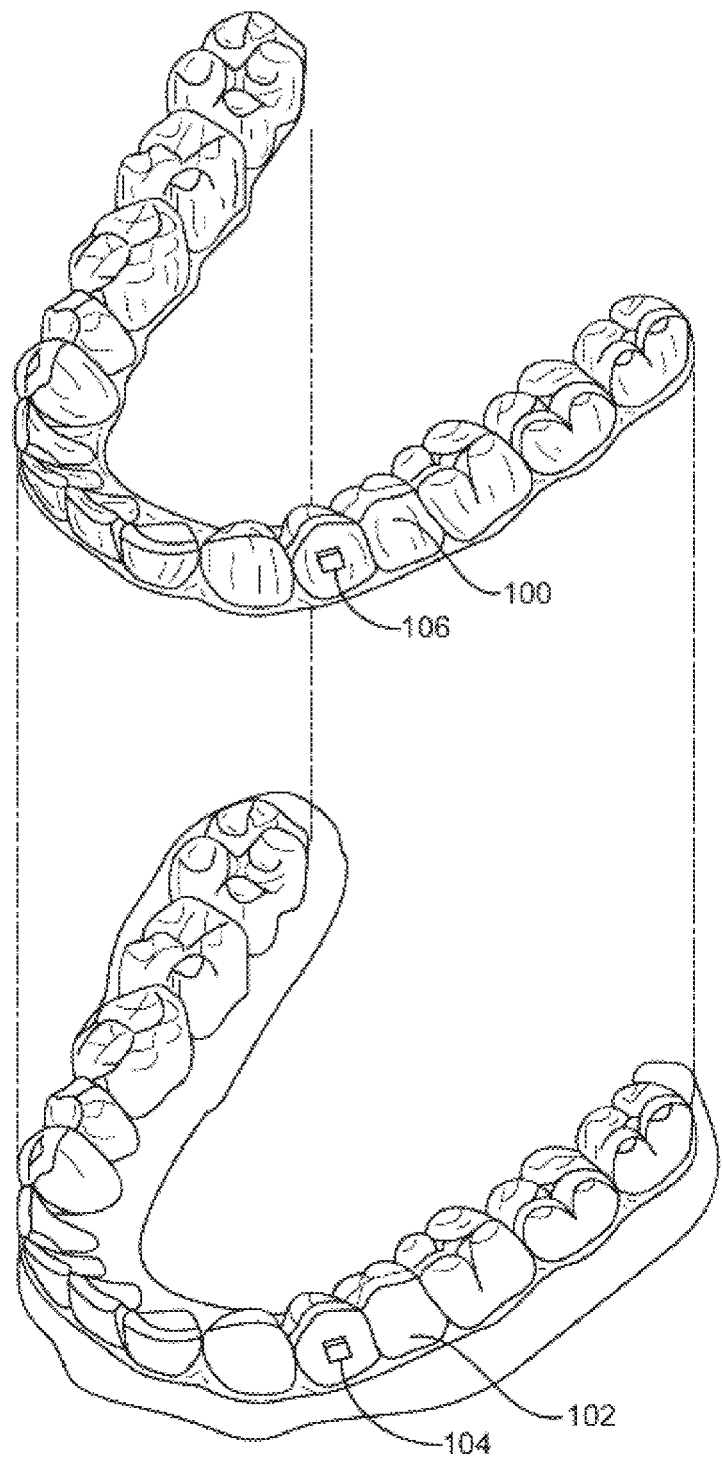
FIG. 1A illustrates a tooth repositioning appliance, in accordance with embodiments.

Traditional additive manufacturing (3D) printers such as Digital Light Processing (DLP) and Stereolithography (SLA) printers have low selectivity of temperature control. Typical 3D printers are operated at a single set temperature (e.g., at room temperature, in a defined heated range, or in a defined cooled range). The traditional additive manufacturing printers also form polymeric materials that have minimal to no variation of mechanical or polymer properties in the printed product. These typical 3D printers also have a substantial amount of waste associated with them, as it is often difficult or impossible to reuse resin once it has passed through the system. In part due to these limitations, traditional 3D printers are limited in the materials they can handle, the products they can output, and the physical properties of the produced products.

The present disclosure provides systems and processes for forming printed objects (i.e., 3D printed objects) and the polymeric materials produced therefrom. The additive manufacturing systems herein control the temperature of resins during the manufacturing process to provide products having controlled physical and material properties. This disclosure also provides methods for controlling temperature of resins during the formation of polymeric materials. Additionally, this disclosure provides methods of using the systems described herein. Furthermore, this disclosure provides materials used in the methods and systems described herein, as well as objects formed from the materials, methods, and systems described herein. Although not limited in its applications of use, this disclosure provides orthodontic appliances formed from the materials, methods, and systems described herein.

Systems and Processes for Forming Printed Objects

The present disclosure provides systems and processes for forming polymeric materials from resins through regional control of temperature. In some embodiments, the present disclosure provides a system for forming an object, the system comprising:
a resin injector configured to dispense a resin;
a first temperature-controlling element;
a source of light;
a build platform configured to hold the object; and
a carrier platform configured to carry the resin from the resin injector to the first temperature-controlling element, the source of light, and the build platform. Exemplary embodiments of such systems are provided herein. In some embodiments, the resin injector is a heated resin injector.

In some embodiments, the present disclosure provides a system for forming an object, the system comprising:
a resin injector configured to dispense a resin, optionally wherein the resin injector is a heated resin injector;
at least one temperature-controlling element;
at least one source of light;
a build platform configured to hold the object; and
a carrier platform configured to carry the resin from the resin injector to the at least one temperature-controlling element, the at least one source of light, and the build platform.

In some embodiments of the systems disclosed herein, the source of light is comprised of electromagnetic radiation. In some embodiments, the source of light comprises a wavelength that cures a photopolymerizable resin, such as the resins described herein. In some embodiments, the source of light comprises a wavelength less than 700 nm.

In some embodiments of the systems disclosed herein, the first temperature-controlling element is a first cooling element, and is configured to decrease the temperature of the resin. In some embodiments, the first cooling element is placed between the resin injector and the source of light along the pathway of the carrier platform, and the first cooling element is configured to decrease the temperature of the resin. In some embodiments, the system further comprises a layer thickness controller. In some embodiments, the first cooling element is placed between the layer thickness controller and the source of light along the pathway of the carrier platform, and the first cooling element is configured to decrease the temperature of the resin. In embodiments the first cooling element comprises a cooling plate. In some embodiments, the cooling plate is connected to a chiller or a thermoelectric cooling system. In some embodiments the first temperature-controlling element comprises a cooling plate, an air fan, a water bath, a cold roller, or any combination thereof. In some embodiments the first temperature-controlling element is configured to dispense air, an inert gas, or a rapidly-evaporating material. In some embodiments the first cooling element comprises a cooling plate, an air fan, a water bath, a cold roller, or any combination thereof. In some embodiments the first cooling element is configured to dispense air, an inert gas, or a rapidly-evaporating material. In some embodiments rapidly-evaporating material is dispensed to cool the resin upon evaporation of said material from the resin surface. In some embodiments the rapidly-evaporating material comprises butane, liquid nitrogen, solid carbon dioxide (e.g., $CO_2$ snow), or a combination thereof.

In some embodiments of the systems disclosed herein, the first temperature-controlling element is a first heating element configured to increase the temperature of the resin. As a non-limiting example, the first temperature-controlling element can be configured to heat the resin, e.g., within the resin injector. In some embodiments, the first temperature-controlling element is a first heating element. In some embodiments, the resin injector heats the resin. In some embodiments, the resin injector is configured to dispense the resin in a heated form.

In some embodiments of the systems disclosed herein, the system further comprises a second temperature-controlling element. In some embodiments, the second temperature-controlling element is a first cooling element as described herein. In some embodiments, the second temperature-controlling element is a first heating element as described herein. In some embodiments, the second temperature-controlling element comprises a heater. In some embodiments, the second temperature-controlling element is a re-melter (i.e., a heating element configured to melt the resin). In some embodiments, the second temperature-controlling element comprises a source of light and is configured to provide irradiation (e.g., infrared or microwave irradiation).

In some embodiments of the systems disclosed herein, the system comprises a first temperature-controlling element that increases temperature of the resin (e.g., within or proximal to the resin injector), a second temperature-controlling element that decreases temperature of the resin (e.g., a first cooling element), and a third temperature-controlling element that increases temperature of the resin (e.g., a heater, a re-melter, or a source of light). In some embodiments, the third temperature-controlling element is a re-melter that heats uncured resin attached to the carrier platform. In some embodiments, the re-melter is configured to heat the uncured resin after the carrier platform passes the build platform.

In some embodiments of the systems disclosed herein the resin injector does not heat the resin and the system comprises a first temperature-controlling element that decreases temperature of the resin (e.g., a first cooling element) and a second temperature-controlling element that increases temperature of the resin (e.g., a heater, a re-melter, or a source of light). In some embodiments, the second temperature-controlling element is a re-melter that heats uncured resin attached to the carrier platform. In some embodiments, the re-melter is configured to heat the uncured resin after the carrier platform passes the build platform.

In some embodiments of the systems disclosed herein, the carrier platform (e.g., a carrier film) is configured to move at a first rate along a horizontal plane. In some embodiments, the build platform is configured to move at a second rate along a horizontal plane. In certain embodiments, the first rate is substantially similar to the second rate such that the carrier platform (e.g., carrier film) moves in substantially the same direction and rate as the build platform. In this manner the carrier platform can deposit resin to the build platform or previous layers deposited on said build platform while the carrier platform is in transit.

In some embodiments of the systems disclosed herein, the carrier platform is a film (i.e., a carrier film). In some embodiments, the build platform is configured to apply a pressure to the carrier platform. For example, in some embodiments the build platform is configured to move vertically to provide a pressure to the carrier platform (e.g., carrier film) to facilitate deposition of the resin from the carrier platform to the build platform or previous layers deposited on the build platform. In some embodiments, the carrier platform is configured to apply a pressure to the build platform. For example, in some embodiments the carrier platform is configured to move vertically to provide a pressure to the build platform to facilitate deposition of the resin from the carrier platform to the build platform or previous layers deposited on the build platform. In some embodiments of the systems disclosed herein, the carrier platform is configured to iteratively apply the resin to the build platform and/or to a resin layer previously applied thereon. In some embodiments of the systems disclosed herein, the build platform is configured to receive the resin from the carrier platform (e.g., carrier film).

In some embodiments of the systems disclosed herein, the system is configured to apply pressure to two or more layers of resin (e.g., sheets of resin). In some embodiments the system is configured to apply the pressure when at least one of the two or more layers of resin is near the melting point of the resin. In some embodiments, the pressure is applied when the at least one layer is within 80° C., 70° C., 60° C., 50° C., 40° C., 30° C., 20° C., 10° C., or 5° C. of the resin melting temperature. In some embodiments the application of pressure is configured to cause at least some melting of the resin. In some embodiments the application of pressure is configured to adhere layers of the resin (e.g., through melting of at least a portion of the resin, such as the surface interface between the two layers).

Figure 8:
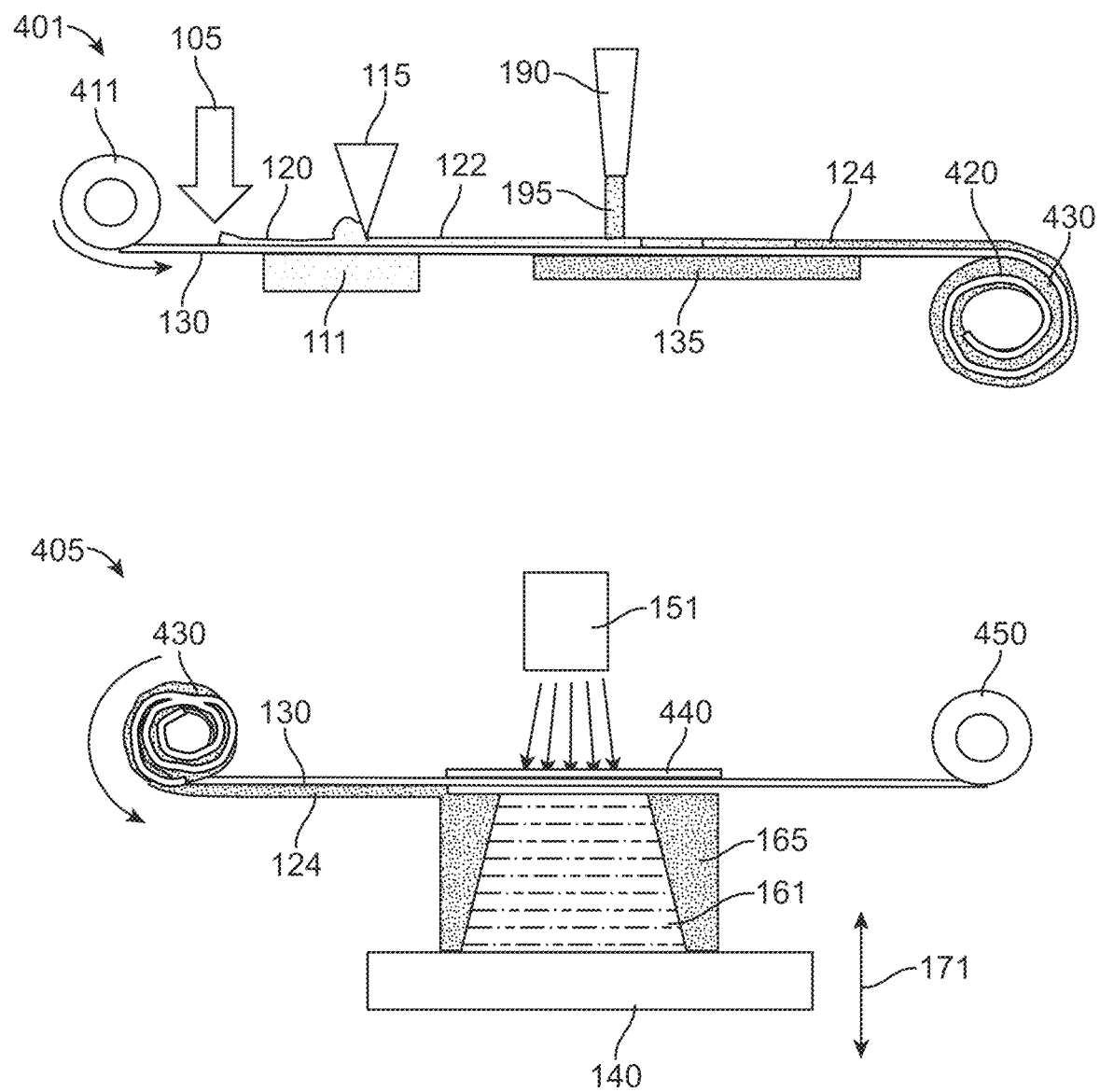
FIG. 8 illustrates an embodiment of a system configured to control temperature during the formation of a printed object wherein a roll of resin is formed in a resin-forming step and the roll of resin is used to form a printed object in a printing step.

In some embodiments the pressure is applied when the at least two layers of resin are uncured. In some embodiments the pressure is applied evenly to the at least two layers (e.g., by application of the pressure using a flat object (as a non-limiting example, such as the window illustrated in FIG. 8)). In some embodiments of the systems disclosed herein, a window or other flat translucent or transparent component is located between the source of light and the layer of uncured resin. In certain embodiments the window or other flat translucent or transparent component is configured to provide even pressure to the at least two layers. In some embodiments the window or other flat translucent or transparent component is attached to moving means such that the window or other flat translucent or transparent component is configured to move and thereby apply pressure to at least one of the at least two layers of resin. In some embodiments the systems disclosed herein comprise means for providing a pressure to at least two layers of the resin (e.g. uncured resin) prior to illumination with the source of light (e.g., prior to photopolymerization). In some embodiments the means for providing pressure is located spatially away from the source of light. In some embodiments the means for providing pressure is located in proximity to the source of light (e.g., as illustrated in FIG. 8). The amount of pressure applied to the at least two layers of resin is sufficient to adhere the layers of resin together. The amount of pressure can depend on the temperature of the resin, the viscosity of the resin, the melt temperature of the resin, or other factors. In some embodiments, the resins described herein are thixotropic (i.e., flow under pressure but stay in place in the absence of said pressure). In some embodiments, it is preferable that a small amount of pressure is required to adhere the layers of resin together.

In some embodiments of the systems disclosed herein, the resin (e.g., uncured resin) is configured to at least partially melt when a pressure is applied. In some embodiments, the resin used herein (e.g., uncured resin), when near its melting point, is configured such that a small amount of pressure causes at least some melting. In some embodiments the at least some melting is configured to laminate two layers of resin together. As a non-limiting example, two layers of resin (e.g., uncured resin) having pressure applied to them can at least partially melt at the interface between the two layers, thereby laminating the layers together. The closer the temperature of the resin is to its melting point, the lower the amount of force or time required to apply sufficient pressure to laminate the layers together. In some embodiments of the systems disclosed herein, the layers of resin are exposed to a light source following lamination. In some embodiments, exposing light to the layers of resin (e.g., to photopolymerize the resin) after application of pressure (e.g., to laminate the layers) causes permanent attachment of the two layers.

In some embodiments of the systems disclosed herein, the source of light is configured to emit electromagnetic radiation. In some embodiments of the systems disclosed herein, the source of light is configured to emit ultraviolet light, infrared light, visible light, or any combination thereof. In some embodiments of the systems disclosed herein, the system further comprises a layer thickness controller. In certain embodiments, the layer thickness controller comprises a doctor blade or a roller. In some embodiments of systems described herein, the system is configured to recycle uncured resin.

Figure 6:
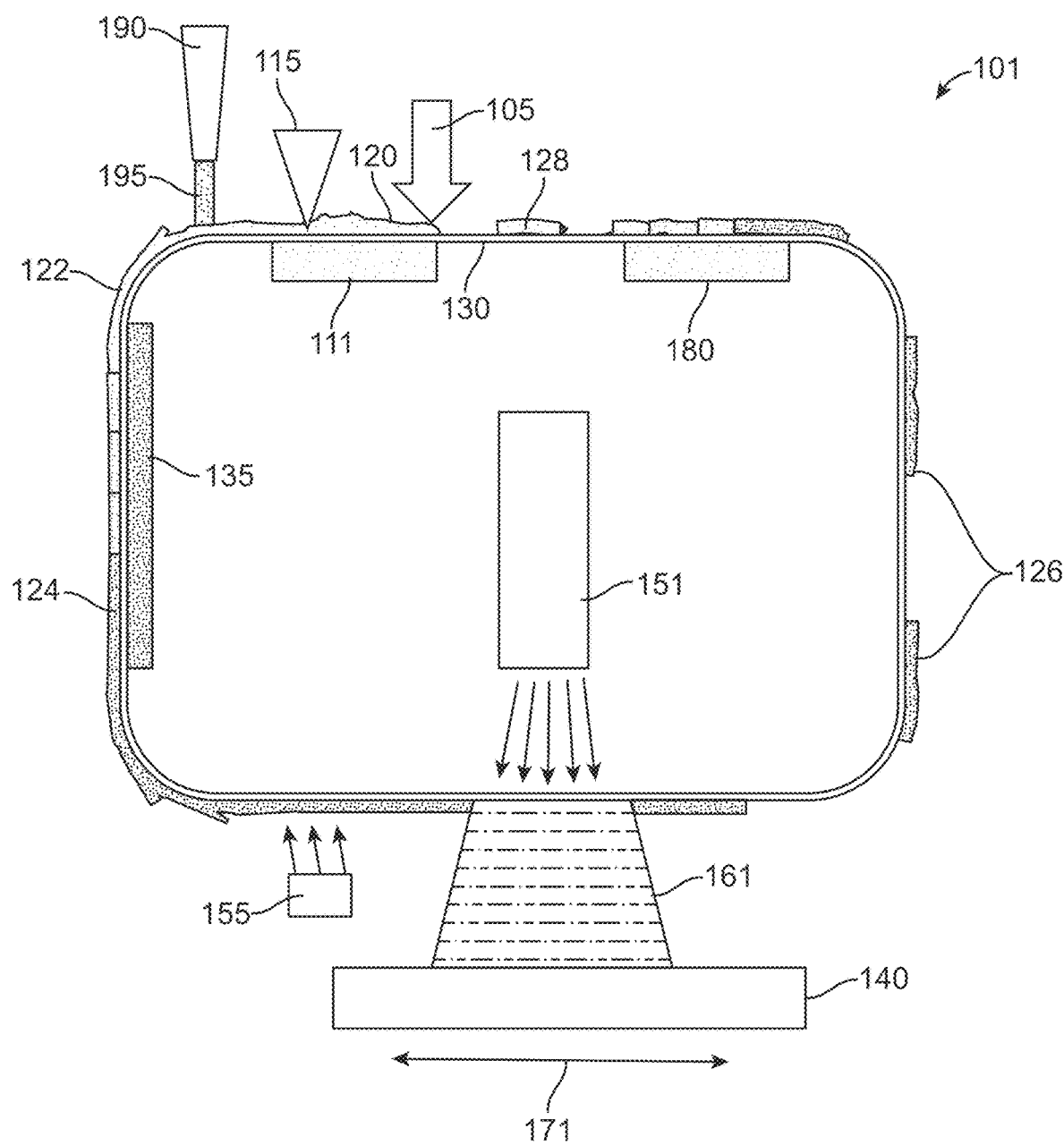
FIG. 6 illustrates an embodiment of a system configured to control temperature during the formation of a printed object including a device configured to apply an additional component to the resin and an infrared heater.

In some embodiments of the systems disclosed herein, the system includes an infrared heating element. In some embodiments, the infrared heating element is in addition to the first temperature controlling element, the second temperature controlling element, and/or the third temperature controlling element. In some embodiments the infrared heating element is placed in proximity to a location along the pathway of the conveyance means (e.g., carrier platform such as carrier film) between a cooling element and the building platform and/or source of light. In some embodiments the infrared heating element is configured irradiate (i.e., heat) a portion of the resin as it is conveyed toward the build platform (as a non-limiting example, as illustrated in FIG. 6). Thus in some embodiments the infrared heating element is configured to warm a region (e.g., surface) of the resin. In some embodiments, the region is warmed to a temperature relatively higher than a portion of the resin outside of the region. As a non-limiting example, a first surface of a resin can be heated 20° C. higher than a second surface of the resin (e.g., located on the opposite side of the resin). Locally heating the resin with, for example, the infrared heating element can improve adherence of resin layers and can also enable manipulation of material characteristics of the cured material. In some embodiments, the infrared heating element is positioned above the carrier platform (e.g., above the carrier film). In some embodiments, the infrared heating element is positioned below the carrier platform (e.g., below the carrier film). In some embodiments, the infrared heating element is positioned above the build platform. In certain embodiments, the infrared heating element is configured to heat a portion of the 3D printed object on the build platform (e.g., a surface of the 3D printed object can be heated prior to deposition of a next layer of resin). In some embodiments the infrared heating element is configured to emit microwave light.

In some embodiments, the infrared heating element is located such that it is configured to apply heat to at least a region of the resin before it is cured. In some embodiments, the infrared heating element is located such that it is configured to apply heat to at least a region of the resin immediately before it is cured (i.e., within 10 seconds, within 5 seconds, or within 1 second of polymerization). In some embodiments, the infrared heating element is an infrared laser. In some embodiments, the infrared heating element is an infrared lamp. In some embodiments, the infrared heating element is an infrared lamp with a digital mirror device. In some embodiments, the infrared heating element is a scanning infrared laser. In some embodiments, the infrared heating element is an infrared diode array. In some embodiments, the infrared heating element is another controllable infrared light source.

In certain embodiments, a heating element comprises a heating block using ultrasonic heating. In some embodiments, a heating element comprises a heating block comprising finite pixel control and uses ultrasonic heating. In such embodiments, ultrasonic heating is directed to heat specific locations on the resin. In some embodiments, the heating element comprising a heating block using ultrasonic heating is be used in place of the infrared heating element. In some embodiments, the adhesion promoter comprises monomers that are highly exothermic when exposed to light.

In some embodiments of the systems disclosed herein, the system includes a particulate dispenser. In some embodiments the particulate dispenser is located and configured such that it dispenses a particulate to a surface of the resin after the resin has been introduced by the resin injector and/or after the resin has passed a thickness controller. In some embodiments, the particulate dispenser is located and configured such that it dispenses a particulate to a surface of the resin before the resin has passed a thickness controller and/or before the resin has passed a cooling element. As a non-limiting example, an embodiment of the particulate dispenser in a system disclosed herein is illustrated in FIG. 6. In some embodiments the particulate dispenser is a hopper. In some embodiments the particulate dispenser is a sprayer. In some embodiments, the particulate dispenser is an inkjet device that spatially controls where the dispensed particulate material is applied. In some embodiments, the particulate dispenser is a dispensing technology that spatially controls dispense of the particulate material.

In certain embodiments, the particulate dispenser is configured to apply an adhesion promoter to the resin (i.e., is a device configured to apply an adhesion promoter). In other embodiments, the particulate dispenser is configured to apply a material to decrease adhesion and/or to adjust material properties of the resin and/or cured polymeric material formed therefrom. In some embodiments the adhesion promoter comprises a powdered adhesion promoter. In some embodiments the adhesion promoter comprises a liquid adhesion promoter. In some embodiments the adhesion promoter comprises an infrared absorbing compound, carbon black, a dye, a multiphoton absorber, a metal particle, a nanoparticle, water absorbed into silica, or any combination thereof. In some embodiments the adhesion promoter comprises an adhesive. In some embodiments the adhesion promoter comprises a monomer system (e.g., an adhesive monomer system). In some embodiments the particulate dispenser is configured to apply an adhesion resistor to the resin. In some embodiments the adhesion resistor prevents layers of the resin from sticking together (e.g., when rolled or stacked). In some embodiments, the adhesion promoter is an adhesion resistor. In certain embodiments, a material performs each function at different temperatures. A non-limiting example of a material that is both an adhesion resistor and an adhesion promoter can, e.g., resist adhesion while cold and promote adhesion while warm. In certain embodiments, the material can be, e.g., solid while cold and liquid while warm.

Figure 9:
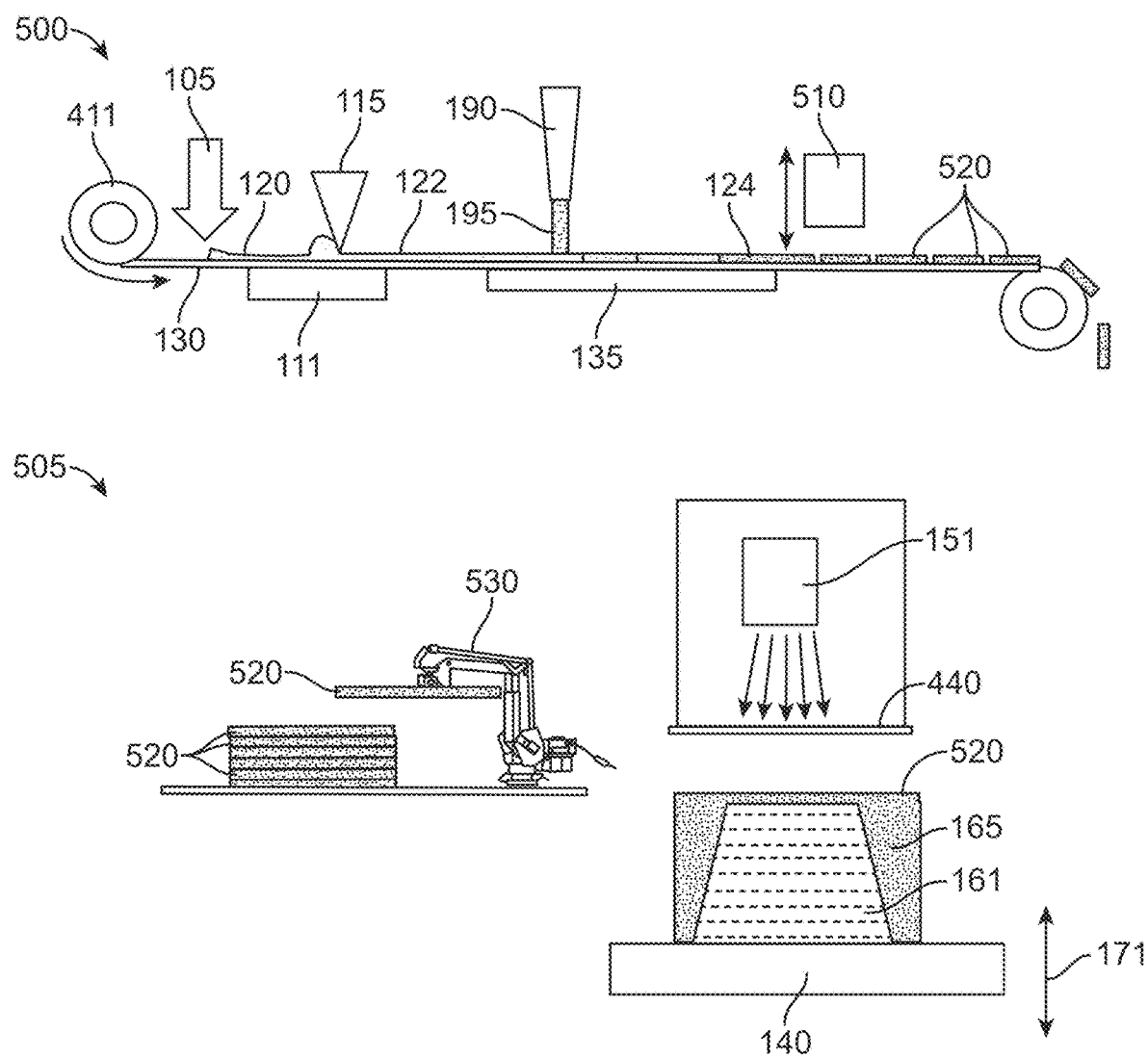
FIG. 9 illustrates an embodiment of a system configured to control temperature during the formation of a printed object wherein cut sheets of resin are formed in a resin-forming step and the sheets of resin are used to form a printed object in a printing step.

In some embodiments the particulate dispenser is configured to apply an optical absorber to the resin. In some embodiments, the particulate dispenser is configured to apply the optical absorber as well as any of the particulates described above (e.g., an adhesion promoter and/or an adhesive monomer). In some embodiments the optical absorber is applied as a thin layer. In some embodiments (as non-limiting examples, when sheets of uncured resin are made (e.g., as illustrated in FIG. 9) and/or when rolls of uncured resin are formed (e.g., as illustrated in FIG. 8)), at least one side of the uncured resin comprises an optical absorber. In some embodiments, both sides of the uncured resin comprise an optical absorber. In some embodiments the optical absorber is applied as a thin film, for example through use of the particulate dispenser. In some embodiments the optical absorber is applied with an adhesion promoter and/or with adhesive monomers.

In some embodiments of the systems disclosed herein, uncured and cooled resin comprises at least one of an adhesion resistor, an adhesion promoter, and an optical absorber applied to at least one side of the resin. In some embodiments, the uncured and cooled resin comprises at least two of an adhesion resistor, an adhesion promoter, and an optical absorber applied to at least one side of the resin. In some embodiments, the uncured and cooled resin comprises an adhesion resistor and an optical absorber applied to one side of the resin. In some embodiments, the uncured and cooled resin comprises an adhesion promoter and an optical absorber applied to one side of the resin.

In some embodiments of the systems disclosed herein, uncured and cooled resin comprises at least one of an adhesion resistor, an adhesion promoter, and an optical absorber applied to at least two sides of the resin (e.g., on both sides, such as the top and bottom of a sheet of resin). In some embodiments, the uncured and cooled resin comprises at least two of an adhesion resistor, an adhesion promoter, and an optical absorber applied to at least two sides of the resin. In some embodiments, the uncured and cooled resin comprises an adhesion resistor and an optical absorber applied to two sides of the resin. In some embodiments, the uncured and cooled resin comprises an adhesion promoter and an optical absorber applied to two sides of the resin.

Figure 5:
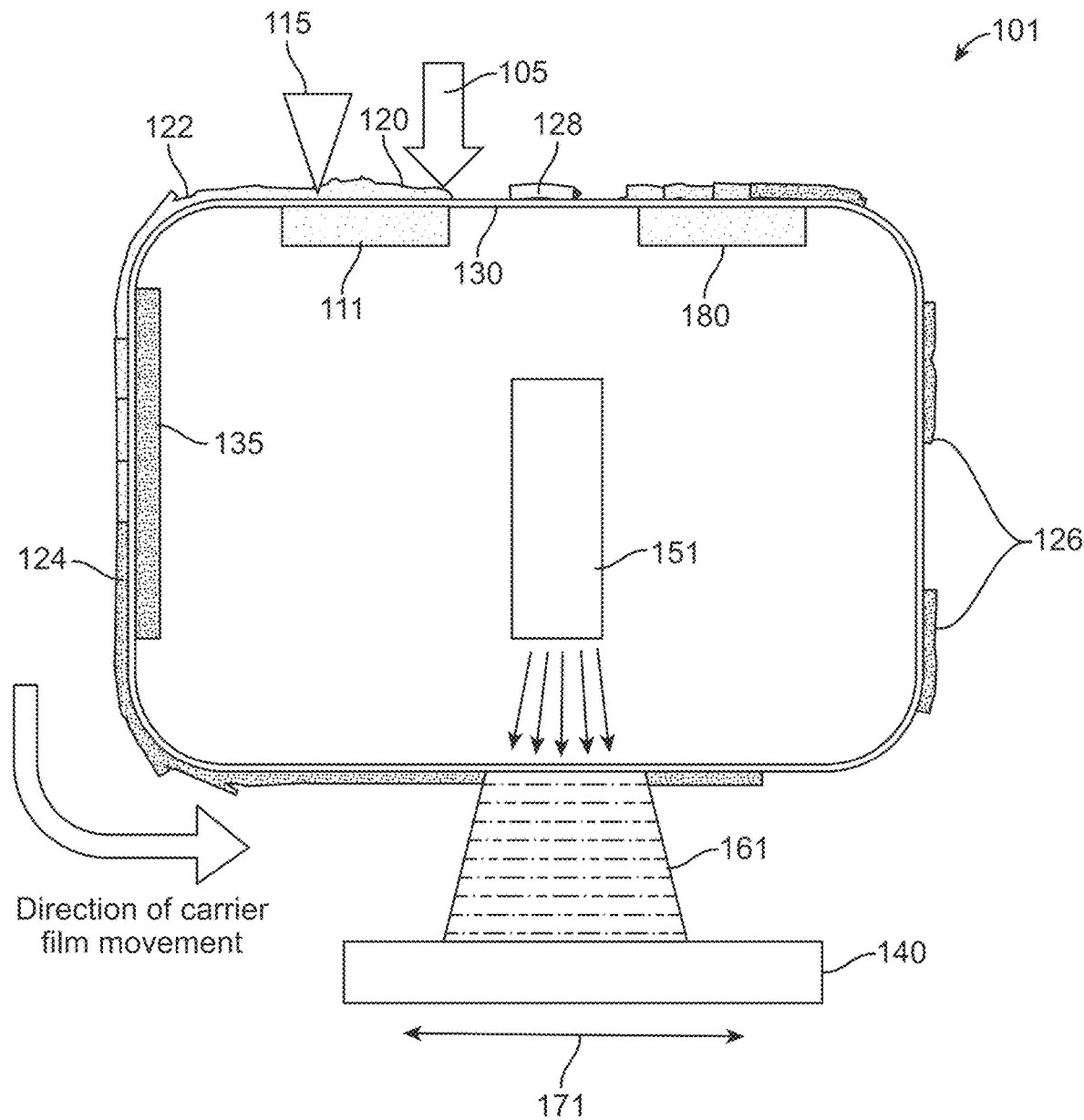
FIG. 5 illustrates an embodiment of a system configured to control temperature during the formation of a printed object wherein unused uncured resin is carried away from the built object.

In some embodiments of the systems disclosed herein, uncured and cooled resin is transported to the build platform and source of light, whereupon a portion of the resin is cured to form a 3D printed object. In some embodiments there remains uncured resin (e.g., the portion of the resin that is not cured during production of the 3D printed object). In some embodiments of the systems disclosed herein, unused and uncured resin is recycled or reused. In some embodiments of the systems disclosed herein, unused and uncured resin is recycled for use in forming, e.g., another layer of resin material or in the production of another printed 3D object. In some embodiments the carrier platform (e.g., carrier film) is configured to transport uncured resin from the build platform toward the resin injector. A non-limiting example of a system including a carrier film configured to transport uncured resin from the build platform toward the resin injector is illustrated at FIG. 5. In some embodiments the carrier platform (e.g., carrier film) is configured to transport the uncured resin from the build platform to a re-melter, and from the re-melter to the resin injector. The re-melter is configured to apply heat to the uncured resin, thereby forming a hot resin. In some embodiments the resulting hot resin is substantially similar to the resin introduced by the resin injector and/or to the resin heated by the first heating element, and thus is incorporated into the system in the same manner (i.e., is recycled). In some embodiments the unused resin is recycled automatically or in an automated process (e.g., as illustrated in FIG. 5 and FIG. 6). In some embodiments, recycled automatically means the unused resin does not need to be handled prior to its reuse in the process or system. As a non-limiting example, as illustrated in FIGS. 5-6, unused resin is automatically carried through the system to be re-used during the formation of another layer of resin (i.e., is an automated process).

Figure 7:
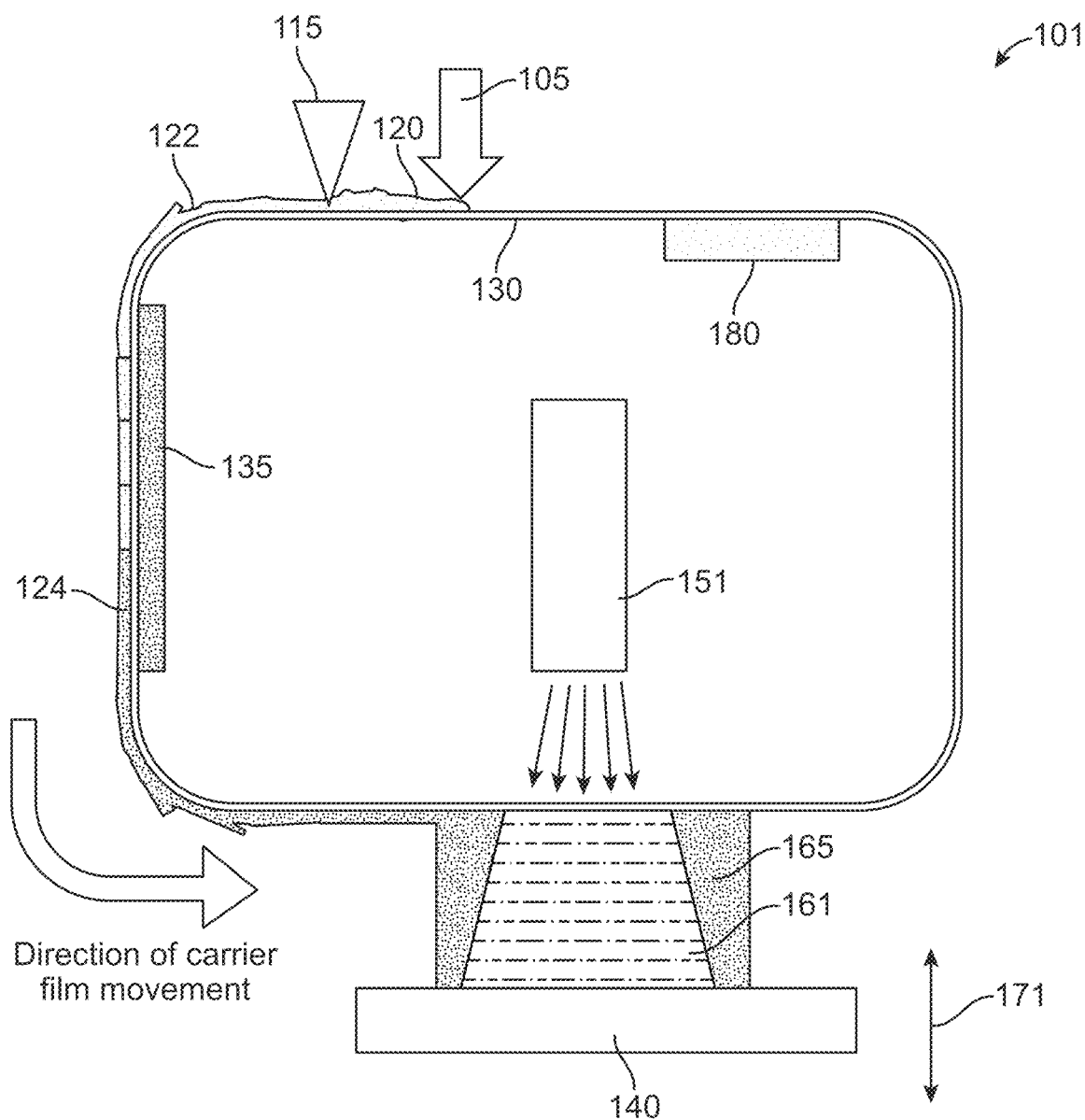
FIG. 7 illustrates an embodiment of a system configured to control temperature during the formation of a printed object wherein unused uncured resin is deposited with the built object.

In some embodiments of the systems disclosed herein, the carrier platform (e.g., carrier film) is configured to move along a horizontal plane. In some embodiments, the build platform is configured to move along a vertical plane. In some embodiments, the carrier platform is configured to move along a horizontal plane and the build platform is configured to move along a vertical plane. As a non-limiting example, FIG. 7 illustrates a carrier platform configured to move along a horizontal plane (e.g., when in proximity to the build platform) and the build platform is configured to move along a vertical plane (e.g., for deposition of the resin to the build platform or otherwise to previous layer(s) of resin material deposited to the build platform during formation of the 3D printed object). In some embodiments, the carrier platform is configured to move along a vertical plane. In some embodiments, the carrier platform is configured to move vertically (e.g., along a vertical plane) in proximity to the build platform (e.g., in some embodiments the build platform is configured to remain stationary while the system including the carrier platform (e.g., carrier film) is configured to move vertically to deposit resin toward the build platform).

In some embodiments of the systems disclosed herein, the system comprises a first feed roll (e.g., a carrier film feed roll). In some embodiments the first feed roll is configured to dispense the carrier platform absent the resin. In some embodiments, the system further comprises a first take up reel. In some embodiments the first take up reel is configured to receive the carrier platform carrying uncured resin. In some embodiments, the system comprises a first feed roll configured to dispense the carrier platform absent the resin, and a first take up reel configured to receive the carrier platform carrying uncured resin. As a non-limiting example, FIG. 8 illustrates an embodiment wherein a first feed roll is configured to dispense the carrier platform absent the resin, and a first take up reel configured to receive the carrier platform carrying uncured resin. In some embodiments the first take up reel is configured to receive the carrier platform carrying the uncured resin and forms a roll comprising the carrier platform (e.g., carrier film) and resin (for example, roll (430) as illustrated in FIG. 8).

In some embodiments the resin injector and the first temperature-controlling device are positioned between the first feed roll and the first take up reel. In some embodiments the first cooling device is positioned between the first feed roll and the first take up reel. In some embodiments the first heating device is positioned between the first feed roll and the first take up reel. In some embodiments, a second temperature-controlling device, a particulate dispenser, a layer thickness controller, or any combination thereof are positioned between the first feed roll and the first take up reel.

In some embodiments of the systems disclosed herein, the system comprises a second feed roll and a second take up reel. In some embodiments the second feed roll is the roll formed by the first take up reel. As a non-limiting example, FIG. 8 illustrates a first take up reel configured to receive the carrier platform carrying uncured resin, thus forming a roll (430), and this roll (430) is used as the second feed roll (i.e., at 405). In some embodiments a first process (e.g., forming the roll with the first take up reel, such as the resin-forming step (401) illustrated in FIG. 8) and a second process (e.g., dispensing the roll, such as the printing step (405) illustrated in FIG. 8) are configured to be separable. In some embodiments, the first process and the second process can be configured to be separated by distance (e.g., each process can take place in separate locations or facilities). In some embodiments the first process and the second process can be configured to be separated by time (e.g., the roll can be formed in advance of its use in the second phase). Advantageously, the roll (e.g., comprising the resin and carrier platform) can be configured to be transportable (e.g., shipped to a manufacturing location) or can be configured to be stored until ready for use.

In some embodiments of the systems disclosed herein, such as those comprising a second feed roll and a second take up reel, the build platform is configured to receive the resin from the carrier platform (e.g., carrier film). In some embodiments the light source and the build platform are positioned between the second feed roll and the second take up reel. As a non-limiting example, FIG. 8 second phase (405) illustrates a configuration wherein the light source and build platform are positioned between the second feed roll and the second take up reel. In some embodiments of the systems described herein, the system further comprises a window positioned between the light source and the build platform. In some embodiments the system further comprises an infrared heating element positioned between the second feed roll and the second take up reel. The use of infrared heating elements to, e.g., heat regions and/or surfaces of resin and/or the 3D printed object are further described herein.

In some embodiments of the systems disclosed herein, the system further comprises a cutting device. In some embodiments the cutting device comprises a die cutter, a laser cutter, a knife blade, or other cutting means or another cutting mechanism. In some embodiments the cutting device is a die cutter, a laser cutter, or a knife blade. In some embodiments the cutting device is configured to cut uncured resin into a plurality of uncured resin sheets. As a non-limiting example, FIG. 9 illustrates a cutting device (e.g., cutting device (510)) configured to cut uncured resin into uncured resin sheets (e.g., sheets (520)). In some embodiments the system further comprises a robotic arm configured to move at least some of the plurality of uncured resin sheets. In some embodiments the robotic arm is configured to move at least some of the plurality of uncured resin sheets to the build platform. In some embodiments the system further comprises a storage device configured to store the plurality of uncured resin sheets. In some embodiments a plurality of the uncured resin sheets are stored in a cartridge. In some embodiments a plurality of the uncured resin sheets are stored in a stack.

In some embodiments of the systems disclosed herein, the system further comprises a mask. In some embodiments the mask is placed between the light source and the carrier platform (e.g., carrier film). In some embodiments the mask is placed between the light source and the resin. In some embodiments the mask is configured to provide a patterned exposure to the resin.

In some embodiments of the systems disclosed herein, the resin is cured (e.g., photopolymerized) to form a 3D printed object. The 3D printed object comprises polymeric material formed from the resin. In some embodiments, the 3D printed object (also referred to herein as the "printed object" or "object") is an orthodontic appliance. In some embodiments, the orthodontic appliance is an aligner, an expander, or a spacer. In some embodiments the orthodontic appliance comprises a plurality of tooth receiving cavities configured to reposition teeth from a first configuration toward a second configuration. In some embodiments the orthodontic appliance is one of a plurality of orthodontic appliances configured to reposition the teeth from an initial configuration toward a target configuration. In some embodiments the orthodontic appliance is one of a plurality of orthodontic appliances configured to reposition the teeth from an initial configuration toward a target configuration according to a treatment plan. In some embodiments the orthodontic appliance is an aligner.

Provided herein are exemplary processes and systems concerning the present disclosure. A skilled artisan will understand these embodiments to be non-limiting and their features to be combinable, substitutable, and/or separable. As a non-limiting example, and as described further below, while FIG. 6 illustrates an embodiment including a device (190) configured to apply an additional component to resin as well as an infrared heater (155), a skilled artisan will understand a system applying just one of the two elements may be used in some situations. As another non-limiting example, while FIG. 8 illustrates an embodiment without, e.g., an infrared heater (155), a skilled artisan will understand a device applying such an element may be used in some situations. As another non-limiting example, while FIG. 8 illustrates an embodiment wherein movement of the build platform (140) translates vertically, a skilled artisan will understand horizontal movement, or a combination of horizontal and vertical movements may be used in some situations.

A skilled artisan will thus understand there are various manners in which the aspects and features of the disclosures and embodiments herein are combinable and are not limited to the exemplary embodiments provided herein.

Cyclical Process and System with Automated Resin Reuse

In some embodiments of the processes disclosed herein, a resin is heated and formed to create a thin layer (e.g., as a film). The film is cooled to a desired temperature at a desired rate to control material properties within the resin or the resulting material cured from the resin. The cooled film is transported to a built platform and deposited thereon then exposed to light (e.g., photopolymerized). In some embodiments specific regions of the resin are exposed to light (e.g., through use of a mask) thus the layer of resin comprises cured regions and uncured regions. In some embodiments uncured resin is removed leaving behind only the light-exposed region(s) (e.g., the 3D object formed of polymerized material). This process is repeated until all layers of the 3D object are created and the 3D object is formed. Remaining uncured resin attached to the object can be removed by, e.g., heating the object to a temperature above a melting point of the uncured resin but below a melting temperature of the cured resin, and/or by washing the 3D object with a solvent (e.g., to dissolve uncured resin while the cured material remains intact). In some embodiments the object is post-processed (e.g., by cleaning). In some embodiments, the 3D object is post-cured with light and/or with heat.

In some embodiments described herein, the 3D object (e.g., 3D printed object) is configured to stand on its own as it is being built. For example, in embodiments described herein where the uncured resin remains attached to, e.g., a carrier platform (such as a carrier film), the green strength of the object is high and the resin is supported by the carrier platform until cured. Thus in some embodiments the processes and methods described herein require fewer than typical support structures, or otherwise do not require the use of support structures during the formation of 3D objects.

FIG. 5 illustrates an embodiment of a system and first process described herein. The printer (101) is equipped with a resin injector (105) that introduces resin (120) to the printer. In some embodiments, the resin injector introduces the resin to the printer in a heated state as a hot resin (122). The printer (101) includes a carrier film (130). The resin injector (105) introduces the resin (120) or hot resin (122) to printer by application of the material to the carrier film (130). In some embodiments, the printer (101) includes a heating plate (111) to heat the introduced resin (120) to a heated state or to maintain the heated state of the hot resin (122).

In some embodiments, the printer (101) includes a layer thickness controller (115). In some embodiments, the layer thickness controller (115) is a doctor blade. The layer thickness controller (115) is a device to control the thickness of the resin (120) or hot resin (122) on the carrier film (130). The carrier film (130) transports the resin materials through the printer (101). The hot resin (122) is transported proximate to a cooling plate (135) which is configured to cool the temperature of the hot resin (122) to a cold resin (124). In some embodiments, the cooling plate (135) is connected to a chiller, a thermoelectric cooler, or another cooling mechanism.

The cooled resin (124) is transported to a build platform (140). The cooled resin (124) is deposited onto the build platform (140) and is exposed to light from a light source (151), curing the resin. Layers of the cooled resin (124) are successively deposited and cured through exposure to light from the light source (151). In this manner, a printed object (161) comprising a plurality of cured polymer layers is formed. The printer (101) also includes means for moving the build platform relative to the unit including the carrier film (171). In some embodiments, the movement (171) is horizontal, or otherwise substantially similar to the movement of the proximal carrier film (130). In some embodiments, the movement (171) of the build platform (140) matches the rate of movement of the carrier film (130) such that each layer of cooled resin (124) is sequentially deposited onto the build platform (140) and/or the printed object (161).

In some embodiments, uncured resin (126) remains adhered to the carrier film (130) following the curing of proximate cooled resin (124). Cooled uncured resin (126) remains on the carrier film (130) while photo-cured resin stays with the printed object (161). The uncured resin (126) can be recycled. In some embodiments, the uncured resin (126) is transported proximate to a re-melter (180) which is configured to heat uncured resin (126) and prepares it to be mixed with introduced resin (120). In some embodiments, the re-melter (180) includes a heating plate. In some embodiments, the re-melter (180) includes an infrared emitter configured to heat the uncured resin (126), e.g., from above by exposing the uncured resin (126) to infrared light. The re-heated resin (128) is transported to the resin injector (105), and the resin injector (105) introduces new resin (120), e.g., heated resin (122) to the carrier film (130) to replace the amount of resin lost while printing the printed object (161). In some embodiments, the re-melter comprises a heated plate. In certain embodiments, the re-heated resin is mixed at the doctor blade due to movement of the carrier film.

Turning to FIG. 6, in some embodiments the printer (101) includes a device (190) configured to apply an additional component to the resin, such as a solid particulate or a liquid spray. In some embodiments the device (190) is configured to apply an adhesion promoter (195). In some embodiments, the device (190) is a hopper or a sprayer. In some embodiments, the adhesion promotor (195) promotes the adhesion of resin layers in the printed object (161). In some embodiments, the adhesion promoter is a liquid adhesion promotor. In some embodiments, the adhesion promoter is a powdered adhesion promoter. The adhesion promoter (195) is spread onto the surface of the hot resin (122). In some embodiments, the adhesion promoter and/or other additive is added to the resin while the resin is at least partially cooled. In some embodiments, the adhesion promoter and/or other additive is added to the resin while the resin is fully cooled.

In some embodiments, the printer (101) also includes an infrared heater (155) configured to warm the surface of the cold resin (124). Warming the surface of the cold resin (124) in some embodiments promotes layer-to-layer adhesion as the printed object (161) is built. For example, in FIG. 6, the infrared heater (155) is illustrated as being located at the bottom of the cold resin (124) (e.g., configured to heat the surface of the cold resin that will be in contact with the build platform (140) or printed object (161)). In some embodiments, the printer (101) includes an infrared heater (155) configured to irradiate and heat the top of the printed object (161) to which the cold resin (124) is applied (e.g., the infrared heater (155) can be located above the printed object (161)).

Cyclical Process and System with Resin Support

In some embodiments of the processes disclosed herein, a resin is heated and formed to create a thin layer (e.g., as a film). The film is cooled to a desired temperature at a desired rate to control material properties within the resin or the resulting material cured from the resin. The cooled film is transported to a build platform and deposited thereon then exposed to light (e.g., photopolymerized). In some embodiments specific regions of the resin are exposed to light (e.g., through use of a mask) thus the layer of resin comprises cured regions and uncured regions. In some embodiments a portion of uncured resin remains with the light-exposed region(s) (e.g., the 3D object formed of polymerized material) and additional layer(s) of uncured resin are added thereon. This process is repeated until all layers of the 3D object are created and the 3D object is formed. In some embodiments, the formed 3D object is substantially surrounded, encased, or encompassed by uncured resin (e.g., can comprise a plurality of layers wherein each sheet of resin comprises a portion of the 3D object surrounded by uncured resin). In some embodiments, when the 3D object has been formed, remaining uncured resin attached to the object can be removed by, e.g., heating the object to a temperature above a melting point of the uncured resin but below a melting temperature of the cured resin, and/or by washing the 3D object with a solvent (e.g., to dissolve uncured resin while the cured material remains intact). In some embodiments the object is post-processed (e.g., by cleaning). In some embodiments, the 3D object is post-cured with light and/or with heat.

In some embodiments described herein, a solid block of material comprising both cured polymeric material (e.g., photopolymerized resin) and uncured resin is built up as the 3D object is constructed. In some embodiments, it is preferable to form such solid blocks of material when the resin is semisolid, substantially solid, or solid during the period of time wherein the resin layer is being deposited onto the build platform or onto previous layers of resin applied to the build platform. In some embodiments the build platform is absent support structures—for example, uncured resin as in a solid block as described herein can act to support the 3D object, thus additional support structures on the build platform are not necessary. Uncured resin can then be collected from the 3D object following its formation (e.g., by melting or washing with solvent as further described herein) to be recycled back to the heating element that melts the resin for injection to the printer.

FIG. 7 illustrates an embodiment of a system and second process described herein. In some embodiments the printer (101) is configured to deposit cold resin (124) onto the build platform (140) or printed object (161) as deposited uncured resin (165). The deposited uncured resin (165) is deposited successively in layers with the cured printed object (161). The printer (101) also includes means for moving the build platform relative to the unit including the carrier film (171). In some embodiments, the movement (171) is vertical, or otherwise substantially perpendicular to the proximal carrier film (130). In some embodiments, the movement (171) is of the build platform (140). In some embodiments, the movement (171) is of the carrier film unit. Support structures for the 3D printed object (161) are not needed, thus in some embodiments the build platform (140) is free from support elements. The deposited uncured resin (165) can act to support the printed object (161). The deposited uncured resin (165) can be recycled. As a non-limiting example, the deposited uncured resin (165) can be removed from the 3D printed object (161) upon completion of the building of the printed object, and can be re-heated and deposited into the printer (101) via the resin injector (105). In some embodiments, the printer (101) includes a re-melter (180) that can be activated if needed (e.g., to remove or heat residual uncured resin attached to the carrier film (130)).

Process and System with Resin Forming and Printing Steps

In some embodiments of the processes disclosed herein, the process includes two distinct phases that can be separated by distance and/or by time. In some embodiments a resin is heated and formed to create a thin layer (e.g., as a film). The film is cooled to a desired temperature at a desired rate to control material properties within the resin or the resulting material cured from the resin. In some embodiments the layer of resin can be configured to be stored, transported, or otherwise used in a separate step (e.g., by rolling the resin with the carrier platform, or by cutting the layers of resin into individual pieces). The cooled film is transported to a build platform and deposited thereon then exposed to light (e.g., photopolymerized). In some embodiments specific regions of the resin are exposed to light (e.g., through use of a mask) thus the layer of resin comprises cured regions and uncured regions. In some embodiments uncured resin is removed leaving behind only the light-exposed region(s) (e.g., the 3D object formed of polymerized material). In some embodiments uncured resin remains with the layer of cured resin. This process is repeated until all layers of the 3D object are created and the 3D object is formed. Remaining uncured resin attached to the object can be removed by, e.g., heating the object to a temperature above a melting point of the uncured resin but below a melting temperature of the cured resin, and/or by washing the 3D object with a solvent (e.g., to dissolve uncured resin while the cured material remains intact). In some embodiments the object is post-processed (e.g., by cleaning). In some embodiments, the 3D object is post-cured with light and/or with heat.

In some embodiments forming the layer of uncured resin comprises extruding the uncured resin. In some embodiments forming the layer of uncured resin comprises casting the uncured resin. In some embodiments the uncured resin is cooled into a solid or a substantially solid form and is cut into a plurality of pieces. In some embodiments the plurality of pieces are configured to be used to form a 3D printed object. In some embodiments a pick and place robot is used to place the individual pieces onto the build platform.

FIG. 8 illustrates an embodiment of a system and third process described herein. As with the second process described above, a solid block of material (e.g., deposited uncured resin (165) and cured resin to form the printed object (161)) is built as the 3D printed object (161) is constructed. In some embodiments, a roll (430) of uncured cooled resin (124) and carrier film (130) is formed in a first phase (401), and is then used in a second phase (405) during the formation of the 3D printed object (161). The first process (401) and second process (405) can be separated by distance (e.g., each process can take place in separate locations or facilities) and/or can be separated in time (e.g., the roll (430) can be formed in advance of its use in the second phase). In this manner, the solid resin (e.g., on roll (430)) can be transportable (e.g., shipped to a manufacturing location) or stored until ready for use.

The first phase (401) adheres uncured resin to a carrier film (130) and the second phase (405) manufactures the 3D printed object (161). As with the first process, the third process applies a carrier film (130) to convey the resin materials. The carrier film (130) is supplied by a carrier film feed roll (411). The first phase (401) includes a resin injector (105) that introduces resin (120) to the printer. In some embodiments, the resin injector introduces the resin to the carrier film (130) in a heated state as a hot resin (122). In some embodiments, the first phase (401) includes a heating plate (111) to heat the introduced resin (120) to a heated state or to maintain the heated state of the hot resin (122).

In some embodiments, the first phase (401) includes a layer thickness controller (115). In some embodiments, the layer thickness controller (115) is a doctor blade. The layer thickness controller (115) is a device to control the thickness of the resin (120) or hot resin (122) on the carrier film (130). In some embodiments, the hot resin (122) is transported proximate to a cooling plate (135) which is configured to cool the temperature of the hot resin (122) to a cold resin (124). In some embodiments, the cooling plate (135) is connected to a chiller, a thermoelectric cooler, or another cooling mechanism. In some embodiments, the hot resin (122) is transported proximate to an air fan, a water bath, or another cooling mechanism configured to cool the temperature of the hot resin (122) to a cold resin (124). The cooled resin (124) is taken up by a take-up reel (420), forming a roll (430) of uncured resin and carrier film.

Some embodiments the first phase (401) includes a device (190) configured to apply an adhesion promoter (195). In some embodiments, the device (190) configured to apply the adhesion promoter (195) is a hopper or a sprayer. In some embodiments, the adhesion promotor (195) promotes the adhesion of resin layers in the printed object (161). In some embodiments, the adhesion promoter is a liquid adhesion promoter. In some embodiments, the adhesion promoter is a powdered adhesion promoter. In some embodiments, device (190) configured to apply an adhesion promoter is also configured to apply a material to prevent two layers of the resin from sticking together on the roll. In some embodiments, the adhesion promoter (195) prevents the resin from sticking together on the roll. The adhesion promoter (195) is spread onto the surface of the hot resin (122) or cooled resin.

In the second phase (405), the roll (430) of uncured resin and carrier film is unrolled and the carrier film (130) transports the resin toward a take-up reel (450). The cooled resin (124) is transported to a build platform (140). The cooled resin (124) is deposited onto the build platform (140) and is exposed to light from a light source (151), curing the resin. Optionally, the second phase includes a window (440) between the light source (151) and the carrier film (130). Layers of the cooled resin (124) are successively deposited and cured through exposure to light from the light source (151). In this manner, a printed object (161) comprising a plurality of cured polymer layers is formed. Deposited uncured resin (165) is deposited successively in layers with the cured printed object (161). The second phase (405) also includes means for moving the build platform relative to the unit including the carrier film (171). In some embodiments, the movement (171) is vertical, or otherwise substantially perpendicular to the movement of the proximal carrier film (130). In some embodiments, the movement (171) is of the build platform (140). In some embodiments, the movement (171) is of the carrier film unit. Support structures for the 3D printed object (161) are not needed, thus in some embodiments the build platform (140) is free from support elements. The deposited uncured resin (165) can act to support the printed object (161). The deposited uncured resin (165) can be recycled. As a non-limiting example, the deposited uncured resin (165) can be removed from the 3D printed object (161) upon completion of the building of the printed object, and can be re-heated and deposited into the first phase (401) via the resin injector (105). In some embodiments, the take-up reel (450) includes unused cooled resin (124).

FIG. 9 illustrates an embodiment of the third process including a cutting device (510). The first phase (500) of FIG. 9 is substantially similar to the first phase (401) illustrated in FIG. 8, mutatis mutandis. In some embodiments, such as that illustrated by FIG. 9, the first phase (500) comprises a cutting device (510) that cuts portions of the cooled resin (124). The cutting device (510) can be a die cutter, a laser cutter, a knife blade, or any other cutting device or mechanism. The cut pieces of solid resin (520) are collected and provided to the subsequent process step.

In some embodiments, the individual pieces of solid resin (520) are collected by a robotic arm. In some embodiments, the individual pieces of solid resin (520) are sorted by stacking. In certain embodiments, the stacked individual pieces of solid resin (520) include a separating layer (e.g., a release liner) between pieces of solid resin (520) to prevent the layers from sticking together. In certain embodiments, the adhesion promoter (195) also prevents adhesion of pieces of solid resin (520) to one another, for example, when stacked (e.g., by using an adhesion promoter that is a powder). In some embodiments, the pieces of solid resin (520) are sorted by placing into a cartridge.

The pieces of solid resin (520) are formed in the first phase (500), and are then used in a second phase (505) during the formation of the 3D printed object (161). The first process (500) and second process (505) can be separated by distance (e.g., each process can take place in separate locations or facilities) and/or can be separated in time (e.g., the pieces of solid resin (520) can be formed in advance of its use in the second phase). In this manner, the pieces of solid resin (520) can be transportable (e.g., shipped to a manufacturing location) or stored until ready for use.

A plurality of pieces of solid resin (520), e.g., in a stack or cartridge, are formed from the pieces of solid resin (520) formed in the first phase. In some embodiments, an adhesion promoter is applied between the pieces of solid resin or is applied to the pieces of solid resin after placement onto the build platform (140) or printed object (161). In the second phase (505), the uncured pieces of solid resin (520) are placed onto the build platform (140) or subsequently placed in layers building on top of the previous resin layer (e.g., the 3D printed object (161) and deposited uncured resin (165)). In some embodiments, a pick and place robot arm (530) is configured to place a piece of solid resin (520) onto the build platform (140) or on top of the previous resin layer (e.g., the 3D printed object (161) and deposited uncured resin (165)).

In embodiments of the second phase (505), a piece of solid resin (520) is exposed to light from a light source (151), curing the resin. Optionally, the second phase includes a window (440) between the light source (151) and the piece of solid resin (520). In some embodiments, a window is not needed (e.g., if the pieces of solid resin are flat and there is high adhesion of the layers). Layers of the cooled pieces of solid resin (520) are successively deposited and cured through exposure to light from the light source (151). In this manner, a printed object (161) comprising a plurality of cured polymer layers is formed. Deposited uncured resin (165) is deposited successively in layers with the cured printed object (161). The second phase (405) also includes means for moving the build platform relative to the unit including the carrier film (171). In some embodiments, the movement (171) is vertical. In some embodiments, the movement (171) is of the build platform (140). Support structures for the 3D printed object (161) are not needed, thus in some embodiments the build platform (140) is free from support elements. The deposited uncured resin (165) can act to support the printed object (161). The deposited uncured resin (165) can be recycled. As a non-limiting example, the deposited uncured resin (165) can be removed from the 3D printed object (161) upon completion of the building of the printed object, and can be re-heated and deposited into the first phase (500) via the resin injector (105).

In some embodiments, the surface of pieces of solid resin (520) and/or the surface of the 3D printed object (161) are heated (e.g., with application of infrared light or exposure to a heating element, such as those further described herein) to improve adhesion of layers of the resin. In some embodiments, the adhesion of layers is improved with application of an adhesive. In some embodiments, the pieces of solid resin (520) have a low melting temperature. In some embodiments, the low melting temperature is low relative to the surrounding air temperature. In certain embodiments, the pieces of solid resin (520) have a low melting temperature such that pressure applied to the resin (e.g., pressure from the window (440) pressing against the piece of solid resin (520) during movement (171) of the building platform (140) causes the resin to partially melt and thus adhere to the previously-deposited layer prior to light exposure.

Process and System with a Printhead

In some embodiments of the systems and processes described herein, heated resin is applied as a layer directly onto the surface of the build platform, or otherwise onto a layer of resin previously applied onto the build platform during the formation of the 3D object. For example, in some embodiments heated resin is applied directly onto the build platform and/or onto previous layers applied to the build platform by extrusion or by a melt and leveling mechanism. In some embodiments, the layer of resin is cooled to a desired temperature at a desired rate. In some embodiments the resin is then exposed to light in selected regions thus forming cured regions (e.g., photopolymerized material of the 3D object) and uncured regions of resin. As described further herein, when all layers of the object are formed, in some embodiments the uncured resin is removed by application of heat, solvent, centrifuge, ultrasonic bath, or other methods to remove said uncured resin.

In certain embodiments, the uncured resin supports the 3D object thus additional support structures from the build platform are not needed. In some embodiments, interlayer adhesion between layers of resin is enhanced because melted or otherwise hot resin is applied directly onto the previous layers of resin. In some embodiments, the cooling of the resin can occur directly on the solid block of formed material (e.g., the previous layers of 3D printed object and uncured resin) or otherwise directly on the build platform. In some embodiments the thin layer of resin is cooled as each layer is deposited. In some embodiments the applied layer of resin is configured to be cooled quickly, e.g., by having the layer of resin applied as a thin layer. In some embodiments the thin layer of resin is cooled in less than 60 seconds, less than 30 seconds, less than 20 seconds, less than 10 seconds, or less than 5 seconds.

In some embodiments, the present disclosure provides a system for forming an object, the system comprising:
 a printhead comprising:
 a resin injector configured to dispense a resin;
 a first temperature-controlling element; and
 a source of light; and
 a build platform configured to hold the object.

As described further herein, in some embodiments the printhead is configured to dispense the resin onto the build platform, thereby forming a deposited layer. In some embodiments, the printhead is further configured to dispense the resin onto the deposited layer, thus forming iteratively stacked layers of material. In some embodiments, the resin is exposed to the source of light prior to, during, or following application of each deposited layer of resin to the build platform or to the previous deposited layer. In some embodiments, the heating element provides spatial control of light energy with control of light intensity and/or control of dose.

In some embodiments, the printhead comprises more than one resin injector (i.e., a plurality of resin injectors). In certain embodiments, each of the plurality of resin injectors is configured to dispense an individual and/or different resin. As a non-limiting example, a printhead comprising three resin injectors can be configured to dispense three different resins.

In some embodiments, the printhead further comprises an infrared heating element. The infrared heating element can heat the dispensed resin by exposing it to infrared light. In this manner, the characteristics of the dispensed resin, and the characteristics of the polymeric material formed therefrom, can be adjusted. In some embodiments, the infrared heating element is located such that it is configured to apply heat to at least a region of the resin before it is cured. In some embodiments, the infrared heating element is located such that it is configured to apply heat to at least a region of the resin immediately before it is cured (i.e., within 10 seconds, within 5 seconds, or within 1 second of polymerization). In some embodiments, the infrared heating element is an infrared laser. In some embodiments, the infrared heating element is an infrared lamp. In some embodiments, the infrared heating element is an infrared lamp with a digital mirror device. In some embodiments, the infrared heating element is a scanning infrared laser. In some embodiments, the infrared heating element is an infrared diode array. In some embodiments, the infrared heating element is another controllable infrared light source.

In some embodiments, the system includes a printhead that is configured to move horizontally. In certain embodiments, the printhead is configured to move horizontally in a two-dimensional plane. For example, a printhead can be configured to move in an X,Y plane while the build platform is located below it (along the Z-axis). In some embodiments, the printhead is configured to move vertically. In yet further embodiments, the printhead is configured to move spatially in three dimensions. In some embodiments, the system includes a build platform that is configured to move horizontally. In certain embodiments, the build platform is configured to move horizontally in a two-dimensional plane. For example, a build platform can be configured to move in an X,Y plane while the printhead is located above it (along the Z-axis). In some embodiments, the build platform is configured to move vertically. In yet further embodiments, the build platform is configured to move spatially in three dimensions.

Figure 10:
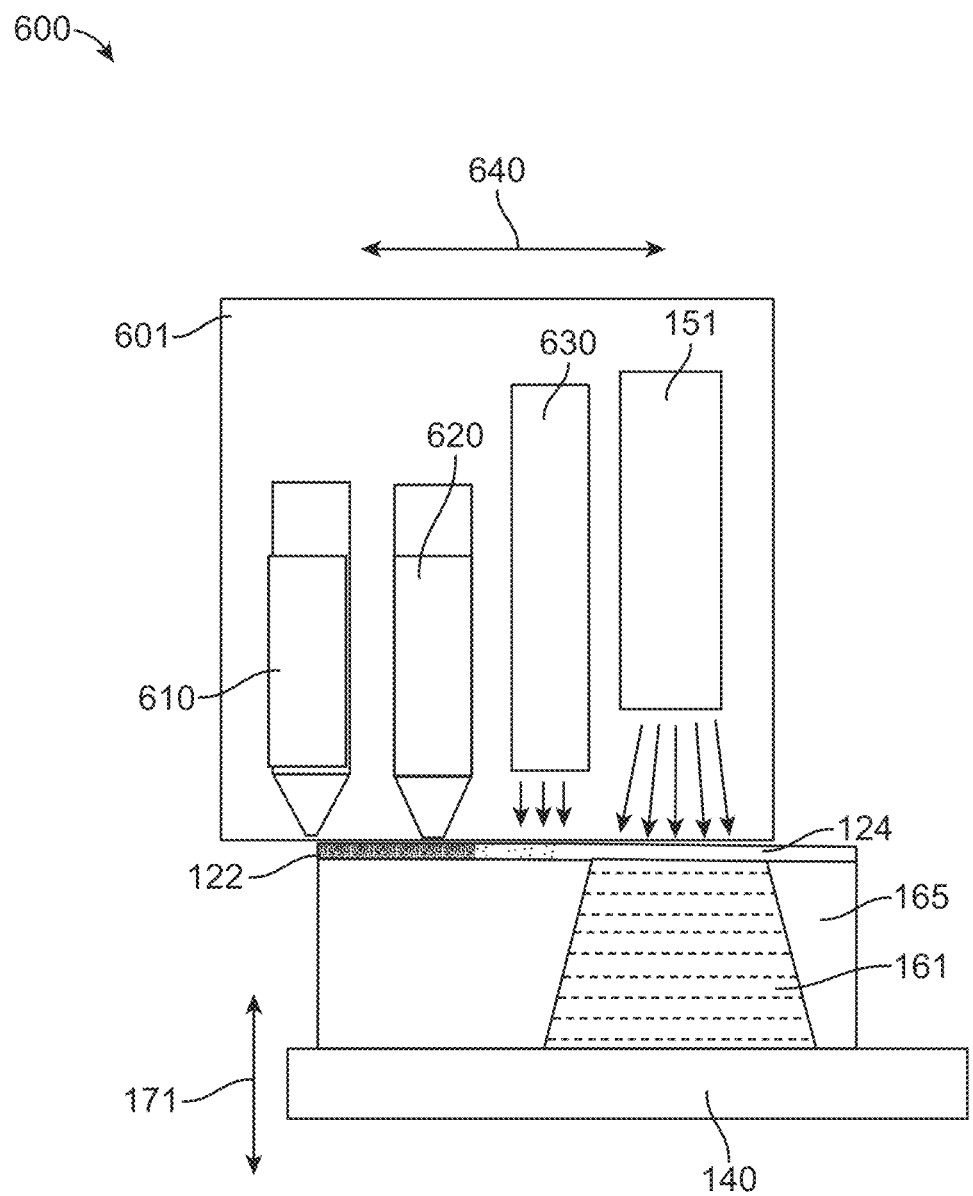
FIG. 10 illustrates an embodiment of a system configured to control temperature during the formation of a printed object wherein multiple processes are controlled using a printhead.

FIG. 10 illustrates an embodiment of a system and fourth process described herein. In the third process (e.g., system 600 illustrated in FIG. 10), a printhead (601) is used to build the 3D printed object (161) without use of a carrier film or support structures at the build platform. Unused resin can be recycled, and this embodiment can be configured for the production individual layers comprising more than one material (i.e., the formation of multimaterial single layers). The printhead (601) includes an extruder (610), and a light source (151). In some embodiments, the printhead (601) includes a heater (630). In some embodiments, the printhead comprises a chiller (620). In some embodiments, the extruder (610) is configured to extrude film. In certain embodiments described herein, extruded films are produced. In some embodiments, a die extruded film is produced.

As illustrated in FIG. 10, the printhead (601) is configured to extrude hot melted resin (122) from the extruder (610) (e.g., extrudes hot resin in a similar manner as the resin injector (105) extruding hot resin (122) in FIGS. 5-9). In embodiments described herein, the hot melted resin (122) is a photopolymerizable resin. In some embodiments, the printhead (601) includes a plurality of extruders (610). In some embodiments, the plurality of extruders are configured to allow for multiple materials to be deposited (e.g., at least two extruders extruding different materials).

In the embodiments described herein, the extruded resin is applied directly to the build platform (140) for the first layer, and subsequently on top of the previous layer (i.e., 2-n) for all other layers. For example, the second layer is built on top of the first, the third layer is built on top of the second, the further layer is built on top of the third, and so on. In some embodiments, the present disclosure provides multilayer films formed using a solid printer. In certain embodiments, the present disclosure provides thin films (e.g., having layers less than or equal to 100 microns) comprising more than one type of material. As a non-limiting example, a material film can be formed comprising a first layer of a first material, a second layer of the first material, and a second material placed between the first and second layers of the first material. Following exposure to a source of light to photopolymerize and adhere the layers together thereby forming an object as described further herein. The thermoplastic layer and uncured resin can be removed (e.g., melted or dissolved away). Thus an object can be built layer-by-layer, each layer having a separate process dependent upon the material layer.

As illustrated in FIG. 10, in some embodiments the applied hot resin (122) is cooled with the chiller (620). In certain embodiments, cooling the resin with the chiller (620) forms a cooled resin (124) which has distinct material properties when cured (as compared to the hot resin when cured). In certain embodiments, the chiller (620) is used to form a phase separated material. In some embodiments, the chiller (620) is a cold blown air, a cold blown inert gas, a sprayed liquid that rapidly evaporates and causes cooling (e.g., butane, liquid nitrogen, or $CO_2$ snow). In some embodiments, the chiller (620) can be contact with a cold roller. In some embodiments, the chiller (620) is a cooling plate (135).

In some embodiments the printhead (601) comprises a heater (630). In some embodiments, the resin is heated with the heater (630) prior to exposure to the source of light (151). In certain embodiments, the heater (630) is an infrared heater configured to heat the resin with application of infrared irradiation. In some embodiments, heating the resin with the heater (630) changes the properties of the resin and the resulting photopolymerized material.

The extruded resin is photopolymerized with exposure to the light source (151). In some embodiments, exposing the resin to the light source (151) described herein comprises digital light processing (DLP). In some embodiments, exposing the resin to the light source (151) described herein comprises stereolithography (SLA).

In the fourth process, layers of the resin (e.g., cooled resin 124) are successively deposited and cured through exposure to light from the light source (151). In this manner, a printed object (161) comprising a plurality of cured polymer layers is formed. Deposited uncured resin (165) is deposited successively in layers with the cured printed object (161). The deposited uncured resin (165) can be recycled. As a non-limiting example, the deposited uncured resin (165) can be removed from the 3D printed object (161) upon completion of the building of the printed object, and can be re-heated and deposited into the extruder (610).

As illustrated in FIG. 10, in some embodiments the system (600) also includes means for moving (171) the build platform (140) vertically relative to the printhead (601). In some embodiments, the movement (171) is of the build platform (140). In some embodiments, the movement (171) is of the printhead (601). In some embodiments, the system (600) also includes means for moving (640) the printhead (601) horizontally relative to the build platform (140). In some embodiments, the movement (640) is of the build platform. In this manner, the printhead (601) and/or the build platform (140) can be configured to move vertically (up and down) while the build platform moves horizontally (e.g., left and right, and/or forward and backward). In some embodiments described herein, the printhead (601), the build platform (640), or any combination thereof can move in 1 spatial direction, 2 spatial directions (e.g., in a planar movement), or 3 spatial directions.

Advantageously, as described above and with the processes and methods disclosed herein, in some embodiments uncured resin is recovered and reused (e.g., recycled and redeposited into the hot resin material). Some embodiments of the processes and methods described herein are compatible with standalone machines that can be configured to be small and fast. For example, the processes and methods described herein can be used in a doctor's office or other clinical setting to produce ready-to-handle 3D objects (e.g., parts) following printing. In some embodiments, such printed objects are not cleaned of uncured resin (e.g., wherein the uncured resin is bioinert or otherwise harmless to a user).

Methods for Forming Multiphase Materials

The present disclosure provides methods for forming a cured polymeric material (e.g., 3D printed objects). Beneficially, resins photocured in the methods and processes described herein (e.g., photocured while in a cooled or other temperature-controlled state) can undergo physical changes that enable the formation of two or more phase systems. For example, the resin may undergo physical changes when being cooled down (e.g., increased viscosity, solidification, phase separation, or crystallization). In many embodiments, the changes involved with the cooling down of the material involve the creation of two or more phases in the system, and in some embodiments such phases are retained during the photopolymerization to form the 3D object. Thus the photocured 3D object is, in some embodiments, comprised of a material having at least 2 phases. In some embodiments, the photocured 3D object comprises 2 phases, 3 phases, 4 phases, 5 phases, or more than 5 phases. In some embodiments the size of the domains of the phases is controlled by one or more of temperature, temperature cooling rate, material additives (e.g., resin additives as described further herein), thickness of the layer of resin, or other variables. In some embodiments the multiphase 3D objects formed from the processes and systems described herein have enhanced composite-like properties (e.g., through the control and/or presence of multiple phases).

In some embodiments, the present disclosure provides methods for forming the cured polymeric material using a system as described herein. In some embodiments, the present disclosure provides a method of forming a cured polymeric material, the method comprising using the systems described herein. In some embodiments, the present disclosure provides a method of forming the cured polymeric material, the method comprising:

heating a resin;

applying the resin to a carrier platform (e.g., a carrier film);

adjusting the temperature of the applied resin with a first temperature-controlling element;

applying the resin onto a receiving component; and curing at least a portion of the resin to form the cured polymeric material.

In some embodiments the resin is heated to a flowable temperature. In some embodiments, the resin is heated to a flowable temperature and is deposited onto the carrier platform with use of a resin injector as described further herein. In certain embodiments the resin injector comprises an additional temperature controlling element (e.g., a heating element). In some embodiments, the resin injector is configured to heat the resin to a flowable temperature and deposit the flowable resin to the carrier platform (e.g., carrier film). In some embodiments applying the resin to the carrier platform comprises using a resin injector to apply the resin to the carrier platform.

In some embodiments adjusting the temperature of the applied resin with the first temperature-controlling element comprises cooling the resin. First temperature-controlling elements are described further herein. In some embodiments, the first temperature-controlling unit is a first cooling element (e.g., when a resin injector applies hot resin to the carrier platform). In some embodiments, the first temperature-controlling unit is a first heating element (e.g., when a resin injector applies resin to the carrier platform wherein the resin is not hot).

In some embodiments, the receiving component is a build platform. In some embodiments, the receiving component is a layer of resin deposited onto the build platform. As a non-limiting example, when a 3D printed object is built up a plurality of resin layers are iteratively placed onto the build platform. The previous layer deposited during the formation of the object can thus act as the receiving component for the next resin layer. Thus in some embodiments the receiving component comprises the build platform, the 3D printed object, the previous layer of deposited resin, or any combination thereof.

In some embodiments of the methods disclosed herein, curing at least a portion of the resin comprises exposure of the resin to a source of light. Sources of light are further described herein. In some embodiments, curing at least a portion of the resin comprises heating the resin. In some embodiments, curing at least a portion of the resin comprises heating the resin and exposing the resin to a source of light. In some embodiments curing at least a portion of the resin comprises photopolymerization.

In some embodiments of the methods disclosed herein, the methods further comprise transporting the resin from a resin injector toward the first temperature-controlling element, transporting the resin from the first temperature-controlling element toward the build platform, from the first temperature-controlling element toward the light source, or any combination thereof. As a non-limiting example, the system illustrated in FIG. 5 illustrates transportation of the resin from the resin injector to a first temperature-controlling element, from the first temperature-controlling element to the build platform, and from the first temperature-controlling element to the light source.

In some embodiments of the methods disclosed herein, the method further comprises transporting an uncured portion of the resin from the light source and/or from the build platform to a second temperature-controlling device. In some embodiments the second temperature-controlling device is a re-melter as described further herein. In some embodiments, the second temperature-controlling element is a second heating element (e.g., when the resin injector comprises a heating element). As a non-limiting example, the system illustrated in FIG. 5 shows uncured resin transported from the light source and build platform to a second temperature-controlling device (e.g., the re-melter). In some embodiments the second temperature-controlling device heats the uncured portion of the resin to melt the uncured portion of the resin. In this manner the uncured resin can be applied to forming another layer of resin (e.g., recycled).

In some embodiments the present disclosure provides a method of polymerizing a resin, the method comprising:

applying a first temperature to the resin;
applying a second temperature to the resin; and
curing at least a portion of the resin to form a cured polymeric material.

In some embodiments of the methods disclosed herein, the methods further comprise fabricating an object. In some embodiments, fabricating the object comprises printing the resin with a 3D printer. In some embodiments, fabricating the object comprises stereolithography, digital light processing, two photon-induced photopolymerization, inkjet printing, multijet printing, fused deposition modeling, or any combination thereof. In some embodiments, fabricating the object comprises using the systems described further herein. In some embodiments the object is a 3D printed object. In some embodiments the object is an orthodontic appliance as further described herein (e.g., an aligner, an expander, or a spacer).

In some embodiments of the methods disclosed herein, a first portion of the resin is cured at a first temperature. In some embodiments, a second portion of the resin is cured at a second temperature. In some embodiments the first portion of the resin is cured at the first temperature and the second portion of the resin is cured at the second temperature. In some embodiments, curing portions of the resin at different temperature results in the formation of portions of the cured material having differing polymer properties and/or material properties (e.g., as non-limiting examples, elongation at break, modulus, melt temperature). Thus regional control of temperature and curing can be configured to provide cured polymeric material (e.g., the objects described herein) having regional differences in polymeric and/or material properties (e.g., a first region and a second region) while said regions comprise the same base resin. Such regional differences and temperature control are described further herein.

In some embodiments the methods described herein further comprise placing a first layer of the resin on top of a second layer of the resin. As a non-limiting example, a layer of resin can be placed onto a build platform and a first layer of resin can then be placed on top of the previously placed layer of resin (i.e., the second layer of the resin). Such embodiments are illustrated in, e.g., FIGS. 5-10. In some embodiments the method further comprises applying a pressure to at least one of the first layer of the resin or the second layer of the resin. Such application of pressure can, in some embodiments, heat the material sufficiently to facilitate adherence of the first layer to the second layer. In some embodiments, applying the pressure adheres the first layer of the resin to the second layer of the resin. In some embodiments of the methods described herein, the method further comprises iteratively building layers of the resin.

In some embodiments of the methods described herein, the 3D printed object is in contact with a portion of the uncured resin. In some embodiments, the printed object is substantially surrounded by uncured resin (as a non-limiting example, as illustrated in FIGS. 7-10). In some embodiments, the printed object is encompassed by uncured resin (e.g., as illustrated in FIGS. 7-10). In some embodiments, the printed object is substantially free from contact with uncured resin (as a non-limiting example, as illustrated in FIGS. 5-6, wherein contact is limited to, e.g., additional sheets of uncured resin to be applied to the printed object).

In some embodiments of the methods described herein, the method further comprises removing the uncured resin from the printed object. As a non-limiting example, the printed object encompassed by uncured resin illustrated in FIG. 8 can be obtained and the uncured resin can be removed. In some embodiments, removing the uncured resin comprises heating the object. In some embodiments, the printed object has a higher melting temperature than the uncured resin, thus heating the object encompassed in uncured resin to a temperature above the melting temperature of the uncured resin but below the melting temperature of the polymer material of the printed object results in the uncured resin melting away from the printed object. In this manner, the printed object can be free from, or substantially free from uncured resin following application of heat. In some embodiments, removing the uncured resin comprises heating the object. In some embodiments, heating the object comprises applying heat to a temperature above the melting point of the uncured resin but below the melting temperature of the cured resin. In some embodiments, removing the uncured resin comprises application of microwave energy.

In some embodiments, removing the uncured resin comprises use of a solvent. For example, a solvent can be used to wash the printed object in contact with the uncured resin, and such solvent can be configured to dissolve or otherwise wash away the uncured resin while the cured polymeric material remains intact. Thus in some embodiments removing the uncured resin comprises washing the object with a solvent. In some embodiments, removing the uncured resin comprises use of ultrasonication (e.g., with an ultrasonic bath). In some embodiments, removing the uncured resin comprises the use of ultrasonication with a solvent and/or with a heated centrifuge.

Methods of Forming 3D Objects with Controlled Temperature

The present disclosure provides methods for forming a cured polymeric material (e.g., 3D objects). In some embodiments, the methods apply systems described herein. In some embodiments, the methods use systems other than those described herein. In some embodiments, varying temperature of a photopolymerizable resin (e.g., by selectively changing temperature) tunes or changes the mechanical properties of the resin and/or the polymer formed from the resin upon photopolymerization. Polymerizing different sections or regions of the resin (e.g., layers or cross sections) having distinct temperatures or temperature histories leads to a polymerized material having regions with distinct properties. In some embodiments the distinct properties are each associated with the regional temperature, as described further herein. In some embodiments at least one of the regions are heated and/or cooled shortly before and/or during polymerization (e.g., photopolymerization). In some embodiments at least one region is heated with an infrared light source.

Beneficially, the methods described herein are configurable to be used in 3D printing (e.g., as described further herein) and can enable the formation of two or more phase systems, as further described herein. Such phase separated systems (e.g., multiphase materials as described herein) also provide morphological control, thus in some embodiments the present disclosure provides methods and materials that control morphology of the resin and/or cured polymer material.

In some embodiments, the present disclosure provides polymeric materials and methods of forming the polymeric materials as described herein. In some embodiments, the present disclosure provides a method comprising the steps of:
  providing a resin, as disclosed further herein; and
  controlling a temperature of the resin, the resin comprising:
    a first region having a first temperature; and
    a second region having a second temperature; and
    curing the resin to form a polymeric material.

In some embodiments, curing the resin comprises exposing the resin to light, thereby forming the cured polymeric material. In some embodiments exposing the resin to light comprises exposing the resin to infrared light. In some embodiments exposing the resin to light uses a source of light as further described herein. In some embodiments the resin is cured while the resin comprises the first region having the first temperature and the second region having the second temperature.

In some embodiments, the controlling of the temperature of the resin is spatially controlled. In some embodiments, the spatial control of the resin comprises controlling the temperature on an x-y dimension (i.e., x-y plane). As referred to herein, the x-y dimension (or plane) is perpendicular to the photocuring light source (which is in the z-dimension). For example, FIG. 5 illustrates a build platform (140) onto which layers of resin are placed, forming an x-y plane of resin. Illumination from the light source (e.g., FIG. 5 element (151)) is substantially perpendicular to the build platform (i.e., is in the z-dimension). Thus, in some embodiments the temperature is controlled on the x-y plane (e.g., while the resin is being polymerized, such as when placed on the build platform). In certain embodiments, controlling the temperature comprises spatially controlling the temperature in the x-z dimension. In some embodiments, controlling the temperature comprises spatially controlling the temperature in the y-z dimension. In some embodiments the temperature of the resin is controlled in the x, y, and z dimensions (i.e., is spatially controllable in 3 dimensions). In some embodiments, the systems described herein control temperature of the resin as described herein.

As described further herein, in some embodiments the resin and/or polymeric material comprises more than one phase (i.e., is a multiphase material). For example, in some embodiments the polymeric material comprises a first polymerized region and a second polymerized region. In some embodiments the resin comprises a first region and a second region. In certain embodiments the first resin region and the second resin region have at least one characteristic different (i.e., distinct) from one another. In some embodiments, the at least one different characteristic is selected from the group consisting of elongation at break, storage modulus, tensile modulus, stress remaining, glass transition temperature, water uptake, hardness, color, transparency, hydrophobicity, lubricity, surface texture, percent crystallinity, phase composition ratio, phase domain size, phase domain morphology, and any combination thereof. In some embodiments the difference in surface texture includes, for example, a matte region and a glossy region. Additional textures can be formed using the methods and systems described herein.

In some embodiments the resin comprises a crystalline material. In certain embodiments, one of the first region or the second region comprises the crystalline material in melted form. In some embodiments, one of the first region or the second region comprises the crystalline material in crystal form. In some embodiments, one of the first region or the second region comprises the crystalline material in melted form and the other of the first region or the second region comprises the crystalline material in crystal form.

In some embodiments the composition of the resin is homogenous. In some embodiments the composition of the polymerized material is homogenous. For example, the resins and polymers described herein can be formed of a single material and regional variations to the resin or polymer can be due to differences in e.g., temperature control. In this manner a single resin can be used to form the 3D objects described herein having desired characteristics.

In some embodiments of the methods disclosed herein, curing the resin to form the polymeric material (i.e., polymerizing the polymeric material) further comprises producing a first polymerized region and a second polymerized region thereby forming a cure material wherein each region has a distinct material property. In some embodiments, each region comprises one or more phases. A region is a spatial dimension of the resin affected by a temperature, a second region being affected by another temperature (e.g., through application of a cold plate, an air blower, a heat lamp, an infrared laser, and so forth). In some embodiments, a temperature affects a region's final cured properties relative to other regions cured at other temperatures. In some embodiments, polymerizing the polymeric material further comprises producing 2, 3, 4, 5, or more than 5 regions in a given layer, each with its own distinct material properties, and each comprises one or more phases. In certain embodiments, the plurality of phases are present prior to polymerization. Exemplary and non-limiting phases include solid, liquid, semisolid, ordered, unordered, and variations in compositions. In some embodiments, the first polymerized region has at least one characteristic different from the second polymerized region. In some embodiments, the first polymerized region has at least one phase different from the second polymerized region. As a non-limiting example, a first region can be a cooled region and can comprise crystallized material (i.e., a solid phase) and amorphous material, while a second region can be at ambient temperature and consist of amorphous material In some embodiments, each of the polymerized regions comprise at least one characteristic different from the other polymerized regions. In some embodiments, at least one different characteristic is selected from the group consisting of one or more of elongation at break, storage modulus, tensile modulus, stress remaining, glass transition temperature, water uptake, hardness, color, transparency, hydrophobicity, lubricity, surface texture, percent crystallinity, phase composition ratio, phase domain size, phase domain morphology, and any combination thereof. In some embodiments the difference in surface texture includes, for example, a matte region and a glossy region. Additional textures can be formed using the methods and systems described herein.

Beneficially, the methods and materials described herein can be fine-tuned to form objects with small and distinct features. In some embodiments it is beneficial to accurately form features during the production of polymeric materials, such as when forming orthodontic appliances, thus fine control of element or dimension size is important in certain embodiments. Using the systems and processes described herein, it is possible to selectively and precisely change the temperature of regions of a layer of resin, and thus materials can be made with high contrast and/or gray-scale blended material property changes from one spatial location of the material to a second spatial location of the material. In some embodiments, the materials formed herein include high contrast material properties between multiple phases or regions. In some embodiments, the materials formed herein include gray-scale blended material property changes between multiple phases or multiple regions. In some embodiments fine control of region size (e.g., dimension size of the region) can be applied to provide composite-like properties from a single material (e.g., forming a multi-phase material from a single resin having multiple narrow or small distinct regions providing composite-like properties to the polymerized material). In some embodiments the plurality of regions (e.g., the plurality of regions in the resin or the plurality of regions in the polymerized material) comprise a size of meters to micrometers, or a size of meters to nanometers. In some embodiments, the plurality of regions comprise a size that depends on the size of the object being printed, and/or on the need for spatial control of the distinct material properties needed in the printed object. In some embodiments, the size of the region is dictated by the combination of what properties the printed object needs and the technology available to create the region. As a non-limiting example, regions larger than a few centimeters (x and y dimensions) can be accomplished with temperature controlled plates, spray jets (e.g., air or liquid), irradiation (e.g., infrared light, microwave), ultrasonic energy (e.g., placement of ultrasonic transducers or wands) and other technologies. As another nonlimiting example, control of regions on size scales less than a few centimeters (x and y dimensions) can be accomplished with digital light processing (DLP) of infrared light, lasers, LEDs, or small thermally conductive temperature controlled plates/pins. For heating nanometer-sized regions (x and y dimensions) multiphoton absorption is used in some embodiments. In some embodiments, the region is an x and y dimension and a z dimension that is less than the layer height. In some embodiments, the control of the region (x and y dimensions) comprises at least one size dimension less than 100 cm, less than 100 cm, less than 10 cm, less than 1 cm, less than 5000 µm, less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, less than 10 µm, or less than 1 µm. In some embodiments the size of a phase domain comprises at least one size dimension less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, less than 10 µm, less than 5 µm, less than 1 µm, less than 500 nm, less than 100 nm, less than 10 nm, or less than 1 nm. In such embodiments, the dimension size is 1-dimensional, 2-dimensional, or 3-dimensional. In some embodiments, the size of a domain is determined through use of any one of light scattering, x-ray, optical microscope, or any combination thereof. In some embodiments, the size of a domain is determined using another measuring method. In certain embodiments, the size of the domain is measured in real time (e.g., during polymerization). In some embodiments, the control of temperature is adjusted to control the domain size.

In some embodiments, the dimension size is 3-dimensional, such as with a voxel. In certain embodiments, the resin or polymeric material comprises a plurality of voxels, at least some of the plurality of voxels each representing a region of the resin or polymeric material as further described herein. In certain embodiments, the voxels have at least one dimension less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In certain embodiments, the voxels have one dimension less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In certain embodiments, the voxels have at least two dimensions less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In certain embodiments, the voxels have two dimensions less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm. In certain embodiments, the voxels have three dimensions less than 1000 µm, less than 500 µm, less than 250 µm, less than 200 µm, less than 150 µm, less than 100 µm, less than 90 µm, less than 80 µm, less than 70 µm, less than 60 µm, less than 50 µm, less than 40 µm, less than 30 µm, less than 20 µm, or less than 10 µm.

In some embodiments the resin separates into two or more phases (i.e., phase separates) before polymerization. In such embodiments, polymerizing the separated phases of the resin stage can anchor the phases so they do not mix with one another or further change in domain size. In some embodiments the resin phase separates upon a change in temperature. For example, in some embodiments a homogenous resin comprising a singular phase is exposed at a first region to a first temperature and at a second region to a second temperature, and thereafter each of the first and second regions have different phase characteristics associated with the given regions. In some embodiments the resin phase separates during polymerization (e.g., during photopolymerization). In some embodiments the resin phase separates after polymerization (e.g., following photopolymerization).

In some embodiments controlling the temperature comprises heating the resin at the first region to the first temperature. In some embodiments controlling the temperature comprises cooling the resin at the first region to the first temperature. In some embodiments controlling the temperature comprises heating the resin at the second region to the second temperature. In some embodiments controlling the temperature comprises cooling the resin at the second region to the second temperature. In some embodiments cooling the resin at the first and/or second region comprises cooling the resin with a cooling element as further described herein. In some embodiments heating the resin at the first and/or second region comprises heating the resin with a heating element as further described herein. In certain embodiments, heating the resin at the first region and/or heating the resin at the second region comprises exposing the resin to a light source. In certain embodiments, the light source is an infrared light source.

In some embodiments the difference between the first temperature and the second temperature is 5° C. or greater, 10° C. or greater, 15° C. or greater, 20° C. or greater, 30° C. or greater, 40° C. or greater, 50° C. or greater, 60° C. or greater, 70° C. or greater, 80° C. or greater, 90° C. or greater, or 100° C. or greater. In some embodiments, the difference between the first temperature and the second temperature is greater than or equal to 5° C. and less than or equal to 50° C., greater than or equal to 5° C. and less than or equal to 100° C., greater than or equal to 10° C. and less than or equal to 100° C., greater than or equal to 20° C. and less than or equal to 100° C., greater than or equal to 50° C. and less than or equal to 100° C., greater than or equal to 50° C. and less than or equal to 200° C., or greater than or equal to 100° C. and less than or equal to 200° C. In certain embodiments the difference between the first temperature and the second temperature is greater than or equal to 5° C. and less than or equal to 100° C. In certain embodiments (e.g., with use of high temperature to anneal a material to induce and/or further crystallize, or reach an upper solubility temperature), the difference between the first temperature and the second temperature is greater than 100° C., such as 101° C. to 200° C., 150° C. to 300° C., or greater than 300° C. In some embodiments, temperature is measured in real-time (e.g., during polymerization).

In some embodiments polymerizing the resin comprises photopolymerization (e.g., with a photopolymerizable resin). In certain embodiments, the method further comprises providing a mask. The use of a mask allows for spatial control of irradiation. For example, in some embodiments a mask is used during the application of infrared light to selectively heat exposed regions of the resin while the other regions of the resin remain at a different temperature. In some embodiments a mask is used during the application of the curing light to selectively cure exposed regions of the resin to form polymerized material while the other (i.e., unexposed) regions of the resin remain uncured.

In some embodiments the method further comprises thermally curing the polymeric material. Thermal curing of a polymeric material can, for example, increase crosslinking or otherwise adjust material properties during the formation of a 3D object. In some embodiments, the method further comprises a step of photo-curing the polymeric material, e.g., following the photopolymerization. For example, in some embodiments the polymeric material formed during the polymerization is exposed to a source of light to further cure (e.g., crosslink) the formed object. In some embodiments, this operation is performed after the print is complete. In some embodiments, this operation is performed outside of the printer (which can be referred to as post-curing, which comprises heat, light, or other sources of energy).

In some embodiments the resin is applied to a substrate (e.g., the carrier platforms described further herein). In some embodiments the substrate is a glass sheet. Glass acts as a heat sink, so in some embodiments it is preferable to use a material other than glass. In some embodiments the substrate is a fluoropolymer substrate, such as a fluoropolymer film. In some embodiments the substrate is translucent, transparent, substantially translucent, or substantially transparent. In some embodiments the fluoropolymer substrate is translucent, transparent, substantially translucent, or substantially transparent. In some embodiments, the substrate is a silicon film and/or a polyester film. In some embodiments, the selection of a carrier material is based on resin compatibility, strength, ease of separation of the cured material, any combination thereof, all of these factors, and/or other factors known in the art.

In some embodiments the method further comprises fabricating an object. In some embodiments, the object is an appliance (e.g., orthodontic appliance) as further described herein. In some embodiments, the object is an aligner, an expander, or a spacer. In some embodiments, fabricating the object comprises printing the resin with a 3D printer. In some embodiments, fabricating the object comprises using a process and/or system as further described herein. In some embodiments, fabricating the object comprises stereolithography, digital light processing, two photon-induced photopolymerization, inkjet printing, multijet printing, fused deposition modeling, or any combination thereof.

In some embodiments the resin comprises a plurality of monomers. In certain embodiments, the majority of the plurality of monomers copolymerize at the first temperature and homopolymerize at the second temperature. In some embodiments, the majority of the plurality of monomers will copolymerize at the second temperature and will homopolymerize at the first temperature. Thus in some embodiments forming a homopolymer region and a copolymer region can be controlled through application or other control of temperature. In some embodiments controlling the temperature of the resin initiates a secondary chemical reaction. In certain embodiments the secondary chemical reaction comprises an ionic thermal reaction, an epoxide polymerization, an ionic thermal polymerization, a bond breaking reaction, a bond forming reaction, activation of a catalyst, or any combination thereof.

In some embodiments, the processes and systems described herein form 3D objects comprising: a first region comprising a first plurality of monomers, the first region characterized by a first set of physical properties; and a second region comprising a second plurality of monomers, the second region characterized by a second set of physical properties. In some embodiments, the first plurality of monomers and the second plurality of monomers are similar, and the first set of physical properties and the second set of physical properties are different. In certain embodiments, the first plurality of monomers and the second plurality of monomers are substantially the same. For example, in some embodiments the object is formed from a single resin. In some embodiments the single resin is homogenous. Thus as described further herein, at least some of the processes and systems provided herein are configured to produce an object having a first region and a second region having different material properties (i.e., having multiple phases as further described herein) while being produced from a single resin (e.g., a homogenous resin). As further described herein, control of the material properties is conferred by application of temperature control and polymerization.

In some embodiments, the 3D object is a device (e.g., an oral appliance as further described herein) having a relatively higher modulus at the palatal region and a relatively lower modulus and higher elongation at break at the tooth-engaging regions. In some embodiments, the 3D object is a device (e.g., for an aligner or retainer) having different material properties for the base and the walls. In some embodiments, the 3D object is a device (e.g., for an aligner or retainer) having different material properties within the walls.

In some embodiments the object further comprises a third region comprising a third plurality of monomers and characterized by a third set of physical properties (e.g., a third phase of a multiphase system). In some embodiments the first plurality of monomers, the second plurality of monomers, and the third plurality of monomers are similar, and the first set of physical properties, the second set of physical properties, and the third set of physical properties are different from one another. In some embodiments, the first plurality of monomers, the second plurality of monomers and the third plurality of monomers are substantially the same. In some embodiments, the third region is more amorphous (i.e., less crystalline) than the first region and/or the second region.

In some embodiments, the resin comprises a crystalline material. In certain embodiments, the physical and/or polymer properties of the regions are controlled with use of a resin comprising a crystalline material (i.e., a resin having crystalline domains). As a non-limiting example, a resin comprising a crystalline material is a resin that, when cooled, comprises at least one crystalline domain. In certain embodiments, the resin with the crystalline material is heated. In certain embodiments, the resin with the crystalline material is heated to the point that at least some of the crystals melt. In some embodiments described herein, the application of heat to, e.g., melt the crystals is applied selectively to regions of the resin. In this manner, control of crystallized and melted regions of the resin can be established. In certain embodiments, a crystalline resin comprising crystalline regions and melted regions is polymerized (e.g., photopolymerized). The polymerized crystalline domains tend to have higher modulus in comparison to the melted regions. The polymerized melted regions tend to be more amorphous with increase elasticity in comparison to the regions comprising crystalline domains. In some embodiments, the type of crystalline phase present is controlled through the use of temperature and control thereof, in addition to the light intensity, exposure time, photoinitiator concentration, thermal history of the resin, or any combination thereof. Non-limiting examples of crystalline phases include nematic, smectic, discotic, columnar, cholesteric, lamellar, micellar, micellar cubic, hexagonal, and various bicontinuous phases. Addition of a filler such as amorphous silica or titania or talc, is considered as its own phase (e.g., considered as a discontinuous phase relative to the rest of the material).

In some embodiments, the resin is configured to have a thermally-controlled trigger. In certain embodiments, the resin is configured to be a homogenous mixture at a first temperature, but a phase-separated resin comprising two or more phases at a second temperature. In some embodiments the phase-separation of the resin occurs prior to polymerization, such that the resulting photopolymerized material includes the multiple phases. In some embodiments, curing the material while phase-separated provides different physical properties compared to regions that are not phase-separated or that phase-separated to a different degree, as described further herein. In some embodiments, the phase separation is induced upon application of the polymerization (e.g., by photopolymerizing the material).

In such embodiments, the resin is thermally-controlled (i.e., at a first temperature the resin is cured to form a homogenous material) but the second temperature alone does not induce the formation of additional phases—rather, while the resin is at the second temperature, curing the resin (e.g., with photopolymerization) triggers phase separation of the resin as further described herein. Thus, in certain embodiments, the resin is configured to have a thermally-controlled trigger and a cure-controlled trigger.

In some embodiments, the resin is configured to have thermal differences in curing kinetics. For example, in some embodiments the resin comprises monomers that efficiently copolymerize at a first temperature, but at a second temperature they homopolymerize. The difference of curing kinetics in some embodiments leads to the formation of different physical properties of the formed polymeric material through thermal control.

In some embodiments, the resin is configured to undergo a secondary chemical reaction upon application of heat. As a non-limiting example, heat provided to a resin can be used to initiate a secondary chemical reaction such as epoxide polymerization, thermal radical polymerization, ionic thermal polymerization, the breaking of chemical bonds, the forming of chemical bonds, or the activation of a catalyst. In such resins, the properties of the polymeric material are controllable by controlling the heat applied prior to or during polymerization, resulting in differing material properties.

Crystallizable resins and materials can warp if they are subjected to thermal gradients. For example, during the printing process of a resin that contains crystallizable material, if the printed part is allowed to cool during the printing process, then the part will warp and change shape during the printing process. This can be avoided by, e.g., heating the air or environment around the printed part to keep the part above its crystallization temperature. Another method is to use a top-down vat printer whereby the printed part is submerged into the resin during print (thus keeping it isothermal during the print). After the print is complete the part can be cleaned and then allowed to cool all at once or not cleaned and allowed to cool all at once, both of which help prevent large differences in crystallization shrinkage and subsequent warpage. In some embodiments, printing while the crystalline material is crystalline prevents the crystallization shrinkage induced warping.

Polymeric Materials
Materials Formed with Temperature Control

In some embodiments, the processes and systems described herein form polymeric materials (e.g., forming the 3D printed object) and the features of the processes and systems affect the material properties. For example, in some embodiments the temperature control in the processes and systems described herein (e.g., the cooling of the solid resin layer, the reheating of the solid resin layer (e.g., through use of infrared heater to heat a surface of the resin), or any combination thereof) controls the domain size in systems comprising more than one phase (i.e., multiphase systems). Thus as described herein, in some embodiments the cured polymeric material comprises two or more phases. In some embodiments, the two or more phases are present prior to the cool down step (i.e., before the resin passes the first cooling element). In some such embodiments the cool down step is configured to prevent changes in the sizes of the domains of the phases. In some embodiments, the two or more phases are absent prior to the cool down step and are present during and/or following the cool down step (i.e., are formed during the cool down step).

In some embodiments the uncured resin or photocured resin comprises at least one liquid phase. In some embodiments the uncured resin or photocured resin comprises at least one viscous liquid phase. In some embodiments the uncured resin or photocured resin comprises at least one crystalline phase. In some embodiments the uncured resin or photocured resin comprises at least one amorphous solid and continuous phase. In some embodiments the uncured resin or photocured resin comprises at least one phase that is a complex mixture of phases. In some embodiments at least one of the phases is continuous. In some embodiments a plurality of the phases are continuous. In some embodiments, at least two of the phases are continuous (i.e., have a domain that is continuous across the material layer in a direction).

In some embodiments, the processes and systems described herein have reduced shrinkage during photopolymerization in comparison to shrinkage stress typically observed with otherwise comparable materials. For example, because in many embodiments described herein polymerization occurs in a solid or semisolid state, the polymerization shrinkage stress is reduced in comparison to similar materials polymerized in hot resin (e.g., melted) form. In some embodiments, the reduced polymerization shrinkage stress confers improved characteristics of the polymerized resin in comparison to similar materials formed through traditional means. In certain embodiments, the materials formed with the processes and systems described herein (e.g., cured in a semisolid or solid form) have improved elongation at break, elongation at yield, and modulus properties when compared with the same resin cured at an elevated temperature. In some embodiments, the final printed object or part is heated and/or irradiated to reach a final property that is different from the property present just after printing.

In some embodiments, the processes and systems described herein are used with crystalline resin materials. Typically, a crystallizable resin material that crystallizes following polymerization will shrink which can thus generate defects or inaccuracy of the printed object. For example, in traditional crystallizable materials that are photopolymerized in a hot state, then cooled, form crystals upon cooling, locally contracting and shrinking. In many of the systems and embodiments described herein, semisolid or solid resin layers are used, and in certain embodiments such semisolid or solid resin layers comprise crystallized regions. By polymerizing the resin layer in a crystalline state, shrinkage associated with formation of the crystals is avoided. Thus, in some embodiments, by polymerizing the crystallizable material in a crystalline state, the shape of the 3D object is better preserved and the accuracy of the printed object is higher than if the polymerization occurred at an elevated temperature and the material was allowed to cool and crystallize. In some embodiments, polymerization of a crystallized system confers shape memory qualities to the printed part such that the part can be twisted or bent out of shape (e.g., beyond its yield point), but upon heating (e.g., above the melting temperature of some or all of the crystalline domains), the printed shape is restored. In some cases, the crystalline domains have a much higher melting temperature after polymerization that before polymerization leading to further stabilized printed parts.

Evaluation of Polymeric Materials

In certain embodiments, the present disclosure provides polymeric materials formed from the methods and/or systems described herein. Polymeric materials disclosed herein have properties that are favorable for numerous applications and for the production of various devices. As a non-limiting example, the polymeric materials described herein are useful for production of orthodontic appliances, such as aligners. Orthodontic appliances require toughness and resilience to move a patient's teeth, while maintaining durability for use. In some embodiments, the polymeric material has a high glass transition temperature, a low creep, and a low stress relaxation.

In some embodiments described herein, the polymeric materials have properties that are measured following placement of the material in an aqueous environment for 24 hours at 37° C. Property values of the polymeric material can be determined, for example, by using the following methods:

stress relaxation properties can be assessed using an RSA-G2 instrument from TA Instruments, with a 3-point bending, according to ASTM D790; stress relaxation can be measured at 30° C. and submerged in water, and reported as the remaining load after 24 hours, or as the percent (%) of initial load;

storage modulus can be measured at room temperature and/or at 37° C. and is reported in MPa; $T_g$ of the cured polymeric material can be assessed using dynamic mechanical analysis (DMA) and is provided herein as the tan δ peak when run at 1 hz with a temperature ramp of 3° C. a minute, sample thickness in the range of 1 mm to 600 micrometers;

tensile strength at yield, tensile modulus, elongation at break, elongation at yield, tensile strength, and Young's modulus can be assessed according to ASTM D1708; and flexural stress relaxation remaining after 24 hours in wet environment at 37° C. ("flexural stress remaining") can be assessed according to ASTM E328. In some embodiments the sample measurements are taken using a 1 mm thick sample and a span distance of 16 mm, a strain rate of 32 mm/min, and a strain of 5%. Other methods can be used to characterize the materials described herein, and the above methods provide exemplary methods.

As described further herein, some embodiments polymeric materials formed using the methods and systems described herein have more than one region or phase (e.g., multiphase polymers). In some embodiments such materials have more than one phase with determinable characteristics that differ from each other. In such embodiments, the polymeric material can have more than one (e.g., 2, 3, 4, 5, or more) of the below-described polymeric material characteristics. For example, in some embodiments a polymeric material having 2 phases is a material wherein the first phase is characterized by a first tensile stress-strain curve, the second phase is characterized by a second tensile stress-strain curve, and the aggregate material (i.e., the polymer material as a combination of the phases) is characterized by a third tensile stress-strain curve. In some embodiments the first, second, and third stress-strain curves are not identical. As described further herein, in some embodiments the material properties of the polymeric material (e.g., the aggregate material of multiple phases) are determined. In some embodiments the material properties of individual regions of a material (that have distinct properties created by different curing conditions and/or thermal history before curing) are determined. In some embodiments, the thermal history (also referred to as the spatial-thermal history) of the material defines the properties within the material (e.g., within a given layer of the material).

In some embodiments, the physical properties of a region of a polymeric material are determined by forming comparable materials comprising or consisting of the phases and determining the physical properties therefrom. As a non-limiting example, a resin photopolymerized having multiple regions alternating between two temperatures can be formed and the material properties of the aggregate (i.e., the polymeric material) can be determined directly from the formed material, while samples of polymeric material formed at solely the first temperature and solely the second temperature can be used to determine the properties of each corresponding phase. In some embodiments, the properties of the polymeric material and the properties of at least one or at least two of the regions of the polymeric material can be determined directly from the polymeric material (e.g., can be directly measured without forming individual samples representing each region).

In embodiments, the polymeric material, a first region of the polymeric material, and/or a second region of the polymeric material is characterized by a tensile stress-strain curve that displays a yield point after which the test specimen continues to elongate, but there is no increase in load. The yield stress is determined at the yield point. In embodiments, the modulus is determined from the initial slope of the stress-strain curve or as the secant modulus at 1% strain (e.g. when there is no linear portion of the stress-strain curve). The elongation at yield is determined from the strain at the yield point. The mechanical properties can depend on the temperature at which they are measured. The test temperature may be below the expected use temperature for a dental appliance such as 35° C. to 40° C. In some embodiments, the test temperature is 23±2° C. For some applications, the test temperature is higher than 40° C. For some applications, the test temperature is lower than 23° C.

In some embodiments, the polymeric materials, a first region of the polymeric materials, and/or a second region of the polymeric materials are characterized by one or more of: an elongation at break greater than or equal to 5%; a storage modulus greater than or equal to 500 MPa; a tensile modulus greater than or equal to 500 MPa; a stress remaining greater than or equal to 0.01 MPa; and a flexural modulus greater than or equal to 60 MPa after 24 hours soaking in water at ambient temperature (e.g., at 37° C.). In some embodiments, the polymeric materials, a first region of the polymeric materials, and/or a second region of the polymeric materials are characterized by an elongation at break greater than or equal to 5%. In some embodiments, the polymeric materials, a first region of the polymeric materials, and/or a second region of the polymeric materials are characterized by a storage modulus greater than or equal to 500 MPa. In some embodiments, the polymeric materials, a first region of the polymeric materials, and/or a second region of the polymeric materials are characterized by a tensile modulus greater than or equal to 500 MPa. In some embodiments, the polymeric materials, a first region of the polymeric materials, and/or a second region of the polymeric materials are characterized by a stress remaining greater than or equal to 0.01 MPa. In some embodiments, the polymeric materials, a first region of the polymeric materials, and/or a second region of the polymeric materials are characterized by a flexural modulus greater than or equal to 60 MPa after 24 hours soaking in water at ambient temperature (e.g., at 37° C.). In some embodiments, the polymeric materials, a first region of the polymeric materials, and/or a second region of the polymeric materials are characterized by two or more of: an elongation at break greater than or equal to 5%; a storage modulus greater than or equal to 500 MPa; a tensile modulus greater than or equal to 500 MPa; a stress remaining greater than or equal to 0.01 MPa; and a flexural modulus greater than or equal to 60 MPa after 24 hours soaking in water at ambient temperature (e.g., at 37° C.). In some embodiments, the polymeric materials, a first region of the polymeric materials, and/or a second region of the polymeric materials are characterized by: an elongation at break greater than or equal to 5%; a storage modulus greater than or equal to 500 MPa; a tensile modulus greater than or equal to 500 MPa; a stress remaining greater than or equal to 0.01 MPa; and a flexural modulus greater than or equal to 60 MPa after 24 hours soaking in water at ambient temperature (e.g., at 37° C.).

In some embodiments, the polymeric materials, a first region of the polymeric materials, and/or a second region of the polymeric materials are characterized by one or more of: a tensile modulus greater than or equal to 100 MPa after being placed in an aqueous environment for 24 hours at 37° C.; a tensile strength at yield greater than or equal to 5 MPa after being placed in an aqueous environment for 24 hours at 37° C.; a storage modulus greater than or equal to 500 MPa after being placed in an aqueous environment for 24 hours at 37° C.; a flexural stress remaining ("stress remaining") of greater than or equal to 1.5 MPa remaining after 24 hours after being placed in an aqueous environment for 24 hours at 37° C.; a hardness from 60 Shore A to 85 Shore D after being placed in an aqueous environment for 24 hours at 37° C.; and an elongation at break greater than or equal to 15% before and/or after being placed in an aqueous environment for 24 hours at 37° C. In some embodiments, the polymeric materials, a first region of the polymeric materials, and/or a second region of the polymeric materials are characterized by a tensile modulus greater than or equal to 100 MPa after being placed in an aqueous environment for 24 hours at 37° C. In some embodiments, the polymeric materials, a first region of the polymeric materials, and/or a second region of the polymeric materials are characterized by a tensile strength at yield greater than or equal to 5 MPa after being placed in an aqueous environment for 24 hours at 37° C. In some embodiments, the polymeric materials, a first region of the polymeric materials, and/or a second region of the polymeric materials are characterized by a storage modulus greater than or equal to 500 MPa after being placed in an aqueous environment for 24 hours at 37° C. In some embodiments, the polymeric materials, a first region of the polymeric materials, and/or a second region of the polymeric materials are characterized by a flexural stress remaining ("stress remaining") of greater than or equal to 1.5 MPa remaining after 24 hours after being placed in an aqueous environment for 24 hours at 37° C. In some embodiments, the polymeric materials, a first region of the polymeric materials, and/or a second region of the polymeric materials are characterized by a hardness from 60 Shore A to 85 Shore D after being placed in an aqueous environment for 24 hours at 37° C. In some embodiments, the polymeric materials, a first region of the polymeric materials, and/or a second region of the polymeric materials are characterized by an elongation at break greater than or equal to 15% before and/or after being placed in an aqueous environment for 24 hours at 37° C. In some embodiments, the polymeric materials, a first region of the polymeric materials, and/or a second region of the polymeric materials are characterized by: a tensile modulus greater than or equal to 100 MPa after being placed in an aqueous environment for 24 hours at 37° C.; a tensile strength at yield greater than or equal to 5 MPa after being placed in an aqueous environment for 24 hours at 37° C.; a storage modulus greater than or equal to 500 MPa after being placed in an aqueous environment for 24 hours at 37° C.; a flexural stress remaining ("stress remaining") of greater than or equal to 1.5 MPa remaining after 24 hours after being placed in an aqueous environment for 24 hours at 37° C.; a hardness from 60 Shore A to 85 Shore D after being placed in an aqueous environment for 24 hours at 37° C.; and an elongation at break greater than or equal to 15% before and/or after being placed in an aqueous environment for 24 hours at 37° C.

In some embodiments, the polymeric material, a first region of the polymeric material, and/or a second region of the polymeric material is characterized by a tensile modulus after 24 hours testing in a wet environment at 37° C. from 100 MPa to 3000 MPa, from 100 MPa to 2500 MPa, from 100 MPa to 2000 MPa, from 500 MPa to 3000 MPa, from 500 MPa to 2500 MPa, from 500 MPa to 2000 MPa, from 750 MPa to 3000 MPa, from 750 MPa to 2500 MPa, from 750 MPa to 2000 MPa, or from 800 MPa to 2000 MPa. In some embodiments, the polymeric material, a first region of the polymeric material, and/or a second region of the polymeric material has a tensile modulus of greater than or equal to 500 MPa after 24 hours in a wet environment at 37° C. In some embodiments, the polymeric material, a first region of the polymeric material, and/or a second region of the polymeric material is characterized by a tensile modulus greater than or equal to 800 MPa after 24 hours in a wet environment at 37° C. In some embodiments, tensile modulus is assessed according to ISO-527-2 5B.

In some embodiments, the polymeric material, a first region of the polymeric material, and/or a second region of the polymeric material has a tensile strength at yield from 1 MPa to 100 MPa, from 5 MPa to 85 MPa, from 10 MPa to 75 MPa, from 15 MPa to 65 MPa, from 20 MPa to 55 MPa, or from 25 MPa to 45 MPa. In some embodiments, the polymeric material, a first region of the polymeric material, and/or a second region of the polymeric material has a tensile strength at yield from 30 MPa to 60 MPa. In some embodiments, the polymeric material, a first region of the polymeric material, and/or a second region of the polymeric material is characterized by a tensile strength at yield greater than or equal to 0.1 MPa, greater than or equal to 0.5 MPa, greater than or equal to 1 MPa, greater than or equal to 10 MPa, greater than or equal to 30 MPa, greater than or equal to 40 MPa, greater than or equal to 50 MPa, greater than or equal to 60 MPa, greater than or equal to 70 MPa, greater than or equal to 80 MPa, greater than or equal to 90 MPa, or greater than or equal to 100 MPa. In some embodiments, the polymeric material, a first region of the polymeric material, and/or a second region of the polymeric material is characterized by a tensile strength at yield greater than or equal 30 MPa. In some embodiments, tensile strength is assessed according to ISO-527-2 5B.

In some embodiments, the polymeric material, a first region of the polymeric material, and/or a second region of the polymeric material is characterized by a storage modulus from 0.1 MPa to 4000 MPa, from 50 MPa to 2750 MPa, from 100 MPa to 2500 MPa, from 200 MPa to 2250 MPa, from 300 MPa to 3000 MPa, from 500 MPa to 3000 MPa, from 750 MPa to 3000 MPa, or from 1000 MPa to 3000 MPa after 24 hours in a wet environment at 37° C. In some embodiments, the polymeric material, a first region of the polymeric material, and/or a second region of the polymeric material is characterized by a storage modulus after 24 hours testing in a wet environment at 37° C. of 0.1 MPa to 4000 MPa, a storage modulus of 300 MPa to 3000 MPa, or a storage modulus of 750 MPa to 3000 MPa. In some embodiments, the polymeric material, a first region of the polymeric material, and/or a second region of the polymeric material is characterized by a storage modulus greater than or equal to 300 MPa, greater than or equal than 400 MPa, greater than or equal than 500 MPa, greater than or equal to 600 MPa, greater than or equal to 700 MPa, greater than or equal to 800 MPa, greater than or equal to 900 MPa, or greater than or equal to 1000 MPa. In some embodiments, storage modulus is assessed using dynamic mechanical analysis (DMA) as described further herein.

It is advantageous for polymeric materials, a first region of the polymeric materials, and/or a second region of the polymeric materials to have a flexural stress remaining of 5% or greater after 24 hours testing in a wet environment at 37° C. In some embodiments, the flexural stress remaining is 5% or greater, 10% or greater, 15% or greater, 20% or greater, 25% or greater, 30% or greater, 35% or greater, 40% or greater, 50% or greater, 60% or greater, or 70% or greater. In some embodiments, the polymeric material, a first region of the polymeric material, and/or a second region of the polymeric material is characterized by a flexural stress remaining greater than 10% at 24 hours testing in a wet environment at 37° C. In some embodiments, the polymeric material, a first region of the polymeric material, and/or a second region of the polymeric material is characterized by a flexural stress remaining greater than 20% at 24 hours testing in a wet environment at 37° C. In some embodiments, the polymeric material, a first region of the polymeric material, and/or a second region of the polymeric material is characterized by a flexural stress remaining greater than 25% at 24 hours testing in a wet environment at 37° C. In some embodiments, the polymeric material, a first region of the polymeric material, and/or a second region of the polymeric material is characterized by a flexural stress remaining from 5% to 50%, from 10% to 50%, from 15% to 50%, from 20% to 50%, from 25% to 50%, or from 30% to 50% of the initial load after 24 hours in a wet environment at 37° C. In some embodiments, the polymeric material, a first region of the polymeric material, and/or a second region of the polymeric material is characterized by a flexural stress remaining from 5% to 100%, from 10% to 100%, from 15% to 100%, from 20% to 100%, from 25% to 100%, from 30% to 100%, from 40% to 100%, from 50% to 100%, from 60% to 100%, from 70% to 100%, from 80% to 100%, or from 90% to 100% of the initial load after 24 hours in a wet environment at 37° C. In some embodiments, the polymeric material, a first region of the polymeric material, and/or a second region of the polymeric material is characterized by a flexural stress remaining from 20% to 45% of the initial load after 24 hours in a wet environment at 37° C. In some embodiments, the polymeric material, a first region of the polymeric material, and/or a second region of the polymeric material is characterized by a flexural stress remaining greater than 50% of the initial load after 24 hours in a wet environment at 37° C. In some embodiments the flexural stress remaining is measured using a sample that is 1 mm thick. In some embodiments, flexural stress remaining is assessed according to ASTM E328.

In some embodiments, the polymeric material, a first region of the polymeric material, and/or a second region of the polymeric material is characterized by a flexural stress remaining from 0.01 MPa to 15 MPa, from 0.05 MPa to 15

MPa, from 0.1 MPa to 15 MPa, from 0.5 MPa to 15 MPa, from 1 MPa to 15 MPa, from 2 MPa to 15 MPa, from 3 MPa to 15 MPa, from 4 MPa to 15 MPa, from 5 MPa to 15 MPa, or from 10 MPa to 15 MPa after 24 hours in a wet environment at 37° C. In some embodiments, the polymeric material, a first region of the polymeric material, and/or a second region of the polymeric material is characterized by a flexural stress remaining from 2 MPa to 15 MPa after 24 hours in a wet environment at 37° C. In some embodiments, the polymeric material, a first region of the polymeric material, and/or a second region of the polymeric material is characterized by a flexural stress of greater than or equal to 0.1 MPa, greater than or equal to 0.5 MPa, greater than or equal to 1 MPa, greater than or equal to 1.5 MPa, greater than or equal to 2 MPa, greater than or equal to 2.5 MPa, greater than or equal to 3 MPa, greater than or equal to 4 MPa, greater than or equal to 5 MPa, greater than or equal to 6 MPa, greater than or equal to 7 MPa, greater than or equal to 8 MPa, greater than or equal to 9 MPa, greater than or equal to 10 MPa, or greater than or equal to 15 MPa remaining after 24 hours in a wet environment at 37° C. In some embodiments, the polymeric material, a first region of the polymeric material, and/or a second region of the polymeric material is characterized by a flexural stress of greater than or equal to 1.5 MPa remaining after 24 hours in a wet environment at 37° C. In some embodiments, flexural stress is assessed according to ASTM E328.

In some embodiments, the polymeric material, a first region of the polymeric material, and/or a second region of the polymeric material has a stress relaxation measurement determined by ASTM D790 with 5% deflection on a 3-point bending test. In some embodiments, the stress relaxation can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature is 37±2° C. at 100% relative humidity or a temperature of 37±2° C. in water. Stress relaxation properties may be assessed using an RSA-G2 instrument from TA Instruments, with a 3-point bending, 5% strain method. The stress relaxation is typically measured at 37° C. and 100% relative humidity and reported as the remaining load after 2 hours, as either the percent (%) of initial load or in MPa). In some embodiments, the polymeric material, a first region of the polymeric material, and/or a second region of the polymeric material has a stress remaining of greater than or equal to 5% of the initial load. In some embodiments, the polymeric material, a first region of the polymeric material, and/or a second region of the polymeric material is characterized by a stress remaining of 5% to 45% of the initial load. In certain aspects, the polymeric material, a first region of the polymeric material, and/or a second region of the polymeric material is characterized by a stress remaining of 20% to 45% of the initial load. In certain embodiments, the polymeric material, a first region of the polymeric material, and/or a second region of the polymeric material is characterized by a stress remaining of greater than or equal to 20% or greater than or equal to 35% of the initial load. In some embodiments, the stress relaxation measurement of the polymeric material has a value at 24 hours in 30° C. water that is greater than 10% of the initial stress. In some embodiments, the stress relaxation measurement of the polymeric material, a first region of the polymeric material, and/or a second region of the polymeric material has a value at 24 hours in 30° C. water that is greater than 15%, greater than 20%, greater than 25%, greater than 30%, greater than 35%, greater than 40%, greater than 45%, or greater than 50% of the initial stress. In some embodiments, the polymeric material, a first region of the polymeric material, and/or a second region of the polymeric material has a stress remaining greater than or equal to 0.01 MPa. In certain embodiments, the polymeric material, a first region of the polymeric material, and/or a second region of the polymeric material is characterized by a stress remaining of 0.01 MPa to 15 MPa. In certain aspects, the polymeric material, a first region of the polymeric material, and/or a second region of the polymeric material is characterized by a stress remaining of 2 MPa to 15 MPa.

In some embodiments, the polymeric materials, a first region of the polymeric materials, and/or a second region of the polymeric materials are characterized by a stress remaining of 5% to 85% of the initial load, such as 5% to 45%, 15% to 85%, or 20% to 45% of the initial load. In some embodiments, the polymeric material, a first region of the polymeric material, and/or a second region of the polymeric material is characterized by a stress remaining of 0.01 MPa to 15 MPa, such as 2 MPa to 15 MPa. In some embodiments, the polymeric material, a first region of the polymeric material, and/or a second region of the polymeric material is characterized by a stress remaining of greater than or equal to 20% of the initial load. In some embodiments, stress remaining is assessed according to ASTM E328.

In certain embodiments, it is advantageous that the polymeric material, a first region of the polymeric material, and/or a second region of the polymeric material have a high flexural modulus, forming relatively stiff materials. In some embodiments, the polymeric material, a first region of the polymeric material, and/or a second region of the polymeric material has a flexural modulus remaining of 50 MPa or more, 60 MPa or more, 70 MPa or more, 80 MPa or more, 90 MPa or more, 100 MPa or more, 125 MPa or more, or 150 MPa or more. In some embodiments, the flexural modulus remaining is measured after 24 hours in a wet environment at a use temperature. In certain embodiments, the use temperature is 37° C. In some embodiments, flexural modulus is assessed according to ASTM D790.

In certain other embodiments, it is advantageous that the polymeric material, a first region of the polymeric material, and/or a second region of the polymeric material have a relatively low flexural stress remaining, forming materials that are not overly-stiff. In some embodiments, the polymeric material, a first region of the polymeric material, and/or a second region of the polymeric material has a flexural stress remaining of 80 MPa or less, 70 MPa or less, 60 MPa or less, 55 MPa or less, 50 MPa or less, or 45 MPa or less. In some embodiments, the flexural stress remaining is measured after 24 hours in a wet environment at a use temperature. In some embodiments, the use temperature is 37° C. In some embodiments, the polymeric material, a first region of the polymeric material, and/or a second region of the polymeric material is characterized by a stress remaining after 24 hours testing in a wet environment at 37° C. of 0.01 MPa to 15 MPa, or a stress remaining of 2 MPa to 15 MPa. In some embodiments, stress remaining is assessed according to ASTM E328.

In some embodiments, a polymeric material, a first region of the polymeric material, and/or a second region of the polymeric material will have a flexural stress remaining after a period of time of use. As a non-limiting example, an orthodontic appliance (e.g., an aligner) can be formed of a polymeric material having a high flexural stress, but following application of the appliance to the teeth of a patient, there can be a significant and fast decrease of flexural stress (e.g., over the course of minutes). Such decreases in flexural stress can follow an exponential curve of decrease leading towards an asymptote during the intended lifetime of the appliance (e.g., over the course of weeks for an orthodontic appliance such as an aligner). In some embodiments, the polymeric material, a first region of the polymeric material, and/or a second region of the polymeric material has a flexural stress remaining of 90 MPa or less, 85 MPa or less, 80 MPa or less, 75 MPa or less, 70 MPa or less, 65 MPa or less, 60 MPa or less, 55 MPa or less, or 50 MPa or less after a time period of use. In some embodiments, the polymeric material, a first region of the polymeric material, and/or a second region of the polymeric material has a flexural stress remaining of 80 MPa or less after a time period of use. In some embodiments, the time period of use is 1 minute, 5 minutes, 10 minutes, 30 minutes, 1 hour, 24 hours, 48 hours, 1 week, 2 weeks, 1 month, 2 months, 6 months, 1 year, 2 years, or more than 2 years. As a non-limiting example, an aligner composed of polymeric material placed onto a patient's teeth that is removed after 10 minutes and has a flexural stress of 70 MPa would have a polymeric material characterized by a flexural stress remaining of 70 MPa after a time period of use, wherein said time period is 10 minutes. In some embodiments, stress remaining is assessed according to ASTM E328.

In some embodiments, the polymeric material, a first region of the polymeric material, and/or a second region of the polymeric material is characterized by an elongation at break greater than 10%, an elongation at break greater than 20%, an elongation at break greater than 30%, an elongation at break of 5% to 250%, an elongation at break of 20% to 250%, or an elongation at break value between 40% and 250%. In certain embodiments, the elongation at break is measured in dry conditions (e.g., a dry environment). In some embodiments, the polymeric material, a first region of the polymeric material, and/or a second region of the polymeric material is characterized by an elongation at break after 24 hours testing in a wet environment at 37° C. greater than 10%, an elongation at break greater than 20%, an elongation at break greater than 30%, an elongation at break of 5% to 250%, an elongation at break of 20% to 250%, or an elongation at break value between 40% and 250%. In some embodiments, the polymeric material, a first region of the polymeric material, and/or a second region of the polymeric material is characterized by an elongation at break both in dry environment, and after 24 hours testing in a wet environment at 37° C., greater than 10%, an elongation at break greater than 20%, an elongation at break greater than 30%, an elongation at break of 5% to 250%, an elongation at break of 20% to 250%, or an elongation at break value between 40% and 250%. In some embodiments, the polymeric material, a first region of the polymeric material, and/or a second region of the polymeric material is characterized by an elongation at break greater than or equal to 5%, greater than or equal to 10%, greater than or equal to 20%, greater than or equal to 30%, greater than or equal to 40%, or greater than or equal to 50%. In some embodiments, elongation at break is assessed according to ASTM D1708-2 5B.

In some embodiments, the polymeric material, a first region of the polymeric material, and/or a second region of the polymeric material has an elongation at yield greater than 4%, greater than 5%, greater than 6%, greater than 7%, greater than 8%, greater than 9%, greater than 10%, greater than 11%, greater than 12%, greater than 13%, greater than 14%, or greater than 15%. In some embodiments, the polymeric material, a first region of the polymeric material, and/or a second region of the polymeric material has an elongation at yield of 4% to 10% or 5% to 15%. In certain embodiments, the elongation at yield is measured in dry conditions (e.g., a dry environment). In some embodiments, the polymeric material, a first region of the polymeric material, and/or a second region of the polymeric material has an elongation at yield greater than 4%, greater than 5%, greater than 6%, greater than 7%, greater than 8%, greater than 9%, greater than 10%, greater than 11%, greater than 12%, greater than 13%, greater than 14%, or greater than 15% after 24 hours testing in a wet environment at 37° C. In some embodiments, the polymeric material, a first region of the polymeric material, and/or a second region of the polymeric material has an elongation at yield of 4% to 10% or 5% to 15% after 24 hours testing in a wet environment at 37° C. In some embodiments, the polymeric material, a first region of the polymeric material, and/or a second region of the polymeric material has an elongation at yield greater than 4%, greater than 5%, greater than 6%, greater than 7%, greater than 8%, greater than 9%, greater than 10%, greater than 11%, greater than 12%, greater than 13%, greater than 14%, or greater than 15% both in dry environment, and after 24 hours testing in a wet environment at 37° C. In some embodiments, the polymeric material, a first region of the polymeric material, and/or a second region of the polymeric material has an elongation at yield of 4% to 10% or 5% to 15% both in a dry environment, and after 24 hours testing in a wet environment at 37° C. In some embodiments, elongation at yield is assessed according to ISO 527-2 5B.

In some embodiments, the polymeric material, a first region of the polymeric material, and/or a second region of the polymeric material has at least one glass transition temperature ($T_g$) $_{from}$ 0° C. to 150° C. In some embodiments, the polymeric material, a first region of the polymeric material, and/or a second region of the polymeric material has at least one glass transition temperature greater than 60° C. In some embodiments, the polymeric material, a first region of the polymeric material, and/or a second region of the polymeric material has at least one glass transition temperature greater than 75° C. In some embodiments, the at least one glass transition temperature is from 0° C. to 200° C., from 0° C. to 140° C., from 0° C. to 20° C., from 20° C. to 40° C., from 40° C. to 60° C., from 60° C. to 80° C., from 80° C. to 100° C., from 100° C. to 120° C., from 120° C. to 140° C., from 140° C. to 160° C., from 160° C. to 180° C., from 180° C. to 200° C., from 0° C. to 35° C., from 35° C. to 65° C., from 65° C. to 100° C., from 0° C. to 50° C., or from 50° C. to 100° C. In some embodiments, the polymeric material, a first region of the polymeric material, and/or a second region of the polymeric material has at least one glass transition temperature from 0° C. to 10° C., from 10° C. to 20° C., from 20° C. to 30° C., from 30° C. to 40° C., from 40° C. to 50° C., from 50° C. to 60° C., from 60° C. to 70° C., from 70° C. to 80° C., from 80° C. to 90° C., from 90° C. to 100° C., from 100° C. to 110° C., from 110° C. to 120° C., from 120° C. to 130° C., from 130° C. to 140° C., or from 140° C. to 150° C. In some embodiments, the polymeric material, a first region of the polymeric material, and/or a second region of the polymeric material has at least one glass transition temperature from −100° C. to 40° C., from −80° C. to 10° C., from −70° C. to 0° C., from −70° C. to −10° C., from −70° C. to −20° C., from −70° C. to −30° C., from −70° C. to −40° C., from −70° C. to −50° C., or from −80° C. to −40° C. In some embodiments, the polymeric material, a first region of the polymeric material, and/or a second region of the polymeric material has at least two glass transition temperatures. In some embodiments, the polymeric material, a first region of the polymeric material, and/or a second region of the polymeric material has a first $T_g$ less than 40° C. and a second $T_g$ greater than 60° C., a first $T_g$ less than 0° C. and a second $T_g$ greater than 60° C., a first $T_g$ less than 0° C. and a second $T_g$ greater than 75° C., or a first $T_g$ less than −20° C. and a second $T_g$ greater than 80° C. In some embodiments, glass transition temperature is assessed with dynamic mechanical analysis as the tan δ peak when run at 1 hz with a temperature ramp of 2° C. a minute.

In some embodiments, the polymeric material, a first region of the polymeric material, and/or a second region of the polymeric material has at least one melting temperature ($T_m$) (amorphous and/or crystalline) from 0° C. to 300° C. In some embodiments, the polymeric material, a first region of the polymeric material, and/or a second region of the polymeric material has at least one melt transition temperature greater than 60° C. In some embodiments, the polymeric material, a first region of the polymeric material, and/or a second region of the polymeric material has at least one melt transition temperature greater than 75° C. In some embodiments, the at least one melt transition temperature is from 0° C. to 300° C., from 0° C. to 140° C., from 0° C. to 20° C., from 20° C. to 40° C., from 40° C. to 60° C., from 60° C. to 80° C., from 80° C. to 100° C., from 100° C. to 120° C., from 120° C. to 140° C., from 140° C. to 160° C., from 160° C. to 180° C., from 180° C. to 200° C., from 0° C. to 35° C., from 35° C. to 65° C., from 65° C. to 100° C., from 0° C. to 50° C., or from 50° C. to 100° C.

In some embodiments, the polymeric material, a first region of the polymeric material, and/or a second region of the polymeric material is clear, substantially clear, mostly clear, or opaque. In certain embodiments, the polymeric material, a first region of the polymeric material, and/or a second region of the polymeric material is clear. In certain embodiments, the polymeric material, a first region of the polymeric material, and/or a second region of the polymeric material is substantially clear. In certain embodiments, the polymeric material, a first region of the polymeric material, and/or a second region of the polymeric material is mostly clear. In some embodiments, greater than 70%, greater than 80%, greater than 90%, greater than 95%, or greater than 99% of visible light passes through the polymeric material, a first region of the polymeric material, and/or a second region of the polymeric material. Transparency can be measured using a UV-Vis spectrophotometer. In some embodiments, the transparency is measured by measuring the passage of a wavelength of transparency. In some embodiments, greater than 70%, greater than 80%, greater than 90%, greater than 95%, or greater than 99% of the wavelength of transparency can pass through the polymeric material, a first region of the polymeric material, and/or a second region of the polymeric material. In some embodiments, the wavelength of transparency is in the visible light range (i.e., from 400 nm to 800 nm), is in the infrared light range, or is in the ultraviolet light range. In some embodiments, the polymeric material, a first region of the polymeric material, and/or a second region of the polymeric material does not have color. In other embodiments, the polymeric material, a first region of the polymeric material, and/or a second region of the polymeric material appears white, off-white, or mostly transparent with white coloring, as detected by the human eye.

In some embodiments, greater than 20%, greater than 30%, greater than 40%, greater than 50%, greater than 60%, greater than 70%, greater than 80%, greater than 90%, or greater than 95% of visible light passes through the polymeric material, a first region of the polymeric material, and/or a second region of the polymeric material, after 24 hours in a wet environment at 37° C. In some embodiments, greater than 70% of visible light passes through the polymeric material, a first region of the polymeric material, and/or a second region of the polymeric material, after 24 hours in a wet environment at 37° C.

In some embodiments, the material comprises more than one region wherein each region has distinct characteristic properties from one or more of the other regions. The differences in material character can form an overall material with a bulk characteristic that is different than the characteristics of the individual regions. As a non-limiting example, alternating layers of regions cured under different conditions can create a composite-like structure in the bulk property of the material. As another non-limiting example, within a given layer different regions can be created by controlling the curing conditions (and/or temperatures) as described herein. In many embodiments regions having very different and distinct material characteristics from each other are created. As a non-limiting example, a material can comprise one region having a $T_g$ and/or a $T_m$ greater than 80° C., while a separate region of the material has a $T_g$ less than 0° C. In some embodiments, properties within or between regions are grayscaled. As a non-limiting example, a region is exposed to a gradient in temperature such that across that region a varying amount of crystallinity is formed or is present after polymerization of that region. Such grayscale control of properties is advantageous. In some non-limiting embodiments, such grayscaling of a material across a region is accomplished with use of one or more of the following variables across the region: varying light intensity, varying light dose, varying resin temperature during cure, varying resin temperature before cure, varying pressure applied to the resin before and/or during cure, or any combination thereof. In some embodiments, grayscaling is accomplished in the z dimension by similar controls of variables, but also control of, e.g., light blocker concentration (or pigment concentration). In some embodiments, the use of a hopper or sprayer to add chemicals to the outside surface of each layer (e.g., top and/or bottom surface) also provides a mechanism for controlling properties in the x,y and z dimensions.

In some embodiments, the polymeric material, a first region of the polymeric material, and/or a second region of the polymeric material is biocompatible, bioinert, or a combination thereof.

In some embodiments, the polymeric material is formed using 3D printing (i.e., by additive manufacturing) using photopolymerization. In some embodiments, the polymeric material can be used in coatings, molds, injection molding machines, or other manufacturing methods that use or could use light during the curing process. In some embodiments, the polymeric material, a first region of the polymeric material, and/or a second region of the polymeric material is well suited for applications that require, e.g., solvent resistance, humidity resistance, water resistance, creep resistance, or heat deflection resistance.

Printable Resins

Polymeric materials disclosed herein can be formed from printable resins (e.g., uncured solid resin layers or sheets). As described further herein, systems and methods are provided that use printable resins, such as resin sheets, during the formation of 3D printed objects. As used herein, printable resins refer to uncured solid resin described herein (e.g., sheets, rolls, or layers of uncured resin) and also refer to liquid resin described herein (e.g., hot melted resin injected into the systems described herein prior to formation of the solid resins).

In some embodiments, the printable resins comprise an initiator. In some embodiments, the initiator is a photoinitiator. Photoinitiators may be useful for various purposes, including for curing of polymers, including those that can be activated with light and initiate polymerization of the polymerizable components of the formulation. In embodiments, the photoinitiator is a radical photoinitiator and/or a cationic initiator. In some embodiments, the photoinitiator is a Type I photoinitiator which undergoes a unimolecular bond cleavage to generate free radicals. In an additional embodiment the photoinitiator is a Type II photoinitiator which undergoes a bimolecular reaction to generate free radicals. Common Type I photoinitiators include, but are not limited to benzoin ethers, benzil ketals, α-dialkoxy-acetophenones, α-hydroxy-alkyl phenones and acyl-phosphine oxides. Common Type II photoinitiators include benzophenones/amines and thioxanthones/amines. Cationic initiators include aryldiazonium, diaryliodonium, and triarylsulfonium salts. In some embodiments, the photoinitiator comprises diphenyl (2,4,6-trimethylbenzoyl)-phosphine oxide, ethyl (2,4,6-trimethylbenzoyl) phenyl phosphinate, or a combination thereof. In certain embodiments, the photoinitiator comprises a radical photoinitiator, a cationic initiator, and/or a photobase generator. In some embodiments, the photoinitiator is a Type I photoinitiator which undergoes a unimolecular bond cleavage to generate free radicals, or a Type II photoinitiator which undergoes a bimolecular reaction to generate free radicals. In some embodiments, the Type I photoinitiator is a benzoin ether, a benzil ketal, an α-dialkoxy-acetophenone, an α-hydroxy-alkyl phenome, or an acyl-phosphine oxide. In some embodiments, the Type II photoinitiator is a benzophenone/amine, camphorquinone/amine, or a thioxanthone/amine. In some embodiments using a Type II photoinitiator, a donor other than amine is used (e.g., a borate salt). In some embodiments, the cationic initiators is an aryldiazonium, a diaryliodonium, or a triarylsulfonium salt. In certain embodiments, the photoinitiator undergoes Type I, Type II, electron transfer, and/or hydrogen abstraction.

In some embodiments, the photoinitiator initiates photopolymerization using light energy. In certain embodiments, the photoinitiator initiates photopolymerization with exposure to light energy from 800 nm to 250 nm, from 800 nm to 350 nm, from 800 nm to 450 nm, from 800 nm to 550 nm, from 800 nm to 650 nm, from 600 nm to 250 nm, from 600 nm to 350 nm, from 600 nm to 450 nm, or from 400 nm to 250 nm. In some embodiments, the photoinitiator initiates photopolymerization following absorption of two photons, which can use longer wavelengths of light to initiate the photopolymerization. In some embodiments, more than one photoinitiator is used, and each is activated at a different wavelength and or at a different time. As a non-limiting example, one photoinitiator can be activated during a print stage and a second photoinitiator can be activated during a post cure stage. In some embodiments wherein more than one initiator is used, they are activated at different wavelengths or they are activated using different energy sources (e.g. thermal, ultrasonic, infrared, radio-frequency heating); the activation of each initiator can occur simultaneously (e.g., both thermal and infrared activation at the same time) or at different times.

In some embodiments, the resin comprises more than one initiator (e.g., 2, 3, 4, 5, or more than 5 initiators). In some embodiments, the initiator is a thermal initiator. In certain embodiments, the thermal initiator comprises an organic peroxide. In some embodiments, the thermal initiator comprises an azo compound, an inorganic peroxide, an organic peroxide, or any combination thereof. In some embodiments, the thermal initiator is selected from the group consisting of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis (tert-butylperoxy)butane, 1,1-bis(tert-butylperoxy) cyclohexane, 2,5-bis(tert-butylperoxy 2,5-dimethylhexane, 2,5-bis(tert-butylperoxy)-2,5-dimethyl-3-hexyne, bis(1-(tert-butylperoxy)-3,3,5-trimethylcyclohexane, tert-butyl hydroxyperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, a derivative thereof, and a combination thereof. In some embodiments, the thermal initiator comprises azobisisobutyronitrile, 2,2'-azodi(2-methylbutyronitrile), benzoyl peroxide, or a combination thereof.

In some embodiments, the printable resin comprises 0.01-10 wt %, 0.02-5 wt %, 0.05-4 wt %, 0.1-3 wt %, 0.1-2 wt %, or 0.1-1 wt % of the initiator. In some embodiments, the printable resin comprises 0.1-2 wt % of the initiator. In some embodiments, the printable resin comprises 0.01-10 wt %, 0.02-5 wt %, 0.05-4 wt %, 0.1-3 wt %, 0.1-2 wt %, or 0.1-1 wt % of the photoinitiator. In some embodiments, the printable resin comprises 0.1-2 wt % of the photoinitiator. In some embodiments, the printable resin comprises from 0 to 10 wt %, from 0 to 9 wt %, from 0 to 8 wt %, from 0 to 7 wt %, from 0 to 6 wt %, from 0 to 5 wt %, from 0 to 4 wt %, from 0 to 3 wt %, from 0 to 2 wt %, from 0 to 1 wt %, or from 0 to 0.5 wt % of the thermal initiator. In some embodiments, the printable resin comprises from 0 to 0.5 wt % of the thermal initiator.

In some embodiments, the printable resin further comprises a reactive diluent, a crosslinking modifier, a light blocker, a solvent, a glass transition temperature modifier, a thermal initiator, a catalyst for activating the activatable unit, or a combination thereof. In certain embodiments, the reactive diluent, crosslinking modifier, light blocker, solvent, glass transition temperature modifier, thermal initiator, catalyst, or combination thereof is added to the resin by a device (e.g., device (190) of FIGS. 6, 8, and 9) such as a hopper or sprayer. In some embodiments, the resin further comprises at least one of a polymerization catalyst, an inhibitor, a plasticizer, a surface energy modifier, a pigment, a dye, a filler, a binder, a crystallization seed, a crystallization catalyst, a biological agent, a catalyst for selectively breaking bonds, or any combination thereof. In some embodiments, the polymerization catalyst, inhibitor, plasticizer, surface energy modifier, pigment, dye, filler, binder, crystallization seed, crystallization catalyst, biological agent, catalyst for selectively breaking bonds, or combination thereof is added to the resin by a device (e.g., device (190) of FIGS. 6, 8, and 9) such as a hopper or sprayer.

In some embodiments, the printable resin has a viscosity less than 60 Pa·s, less than 50 Pa·s, less than 40 Pa·s, less than 30 Pa·s, less than 20 Pa·s, less than 10 Pa·s, less than 9 Pa·s, less than 8 Pa·s, less than 7 Pa·s, less than 6 Pa·s, less than 5 Pa·s, less than 4 Pa·s, less than 3 Pa·s, less than 2 Pa·s, or less than 1 Pa·s at a printable temperature (i.e., the temperature at which an object is printed, such as when it is photopolymerized). In some embodiments, the printable temperature is at, above, or below room temperature. In some embodiments, the printable temperature is from 0° C. to 25° C., from 25° C. to 40° C., from 40° C. to 100° C., or from 25° C. to 150° C. In some embodiments, the resin has a viscosity from 0.5 Pa·s to 20 Pa·s at a printable temperature. In some embodiments, the printable temperature is from 70° C. to 110° C. In some embodiments, the printable temperature is 90° C. In certain embodiments, the printable resin has a viscosity from 0.5 Pa·s to 20 Pa·s at 90° C. In some embodiments, the printable resin has a viscosity from 20 Pa·s to 60 Pa·s at 90° C.

In some embodiments, the printable resin has a viscosity less than 60 Pa·s, less than 50 Pa·s, less than 40 Pa·s, less than 30 Pa·s, less than 20 Pa·s, less than 10 Pa·s, less than 9 Pa·s, less than 8 Pa·s, less than 7 Pa·s, less than 6 Pa·s, less than 5 Pa·s, less than 4 Pa·s, less than 3 Pa·s, less than 2 Pa·s, or less than 1 Pa·s at an injection temperature (e.g., the temperature at which the resin is injected into systems described herein). In some embodiments, the injection temperature is at, above, or below room temperature. In some embodiments, the injection temperature is from 0° C. to 25° C., from 25° C. to 40° C., from 40° C. to 100° C., or from 25° C. to 150° C. In some embodiments, the resin has a viscosity from 0.5 Pa·s to 20 Pa·s at an injection temperature. In some embodiments, the injection temperature is from 70° C. to 110° C. In some embodiments, the injection temperature is 90° C. In certain embodiments, the printable resin has a viscosity from 0.5 Pa·s to 20 Pa·s at 90° C. In some embodiments, the printable resin has a viscosity from 20 Pa·s to 60 Pa·s at 90° C.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. The viscosity of a composition described herein may be measured at 110° C. using a rheometer. For example, an MCR 301 rheometer from Anton Paar may be used for rheological measurement in rotation mode (PP-25, 50 s-1, 50-115° C., 3° C./min).

In some embodiments, the printable resin comprises a polymerization catalyst. In some embodiments, the polymerization catalyst comprises a tin catalyst, a platinum catalyst, a rhodium catalyst, a titanium catalyst, a silicon catalyst, a palladium catalyst, a metal triflate catalyst, a boron catalyst, a bismuth catalyst, or any combination thereof. Non-limiting examples of a titanium catalyst include di-n-butylbutoxychlorotin, di-n-butyldiacetoxytin, di-n-butyldilauryltin, dimethyldineodecanoatetin, dioctyldilauryltin, tetramethyltin, and dioctylbis(2-ethylhexylmaleate)tin. Non-limiting examples of a platinum catalyst include platinum-divinyltetramethyl-disiloxane complex, platinum-cyclovinylmethyl-siloxane complex, platinum-octanal complex, and platinum carbonyl cyclovinylmethylsiloxane complex. A non-limiting example of a rhodium catalyst includes tris(dibutylsulfide)rhodium trichloride. Non-limiting examples of a titanium catalyst includes titanium isopropoxide, titanium 2-ethyl-hexoxide, titanium chloride triisopropoxide, titanium ethoxide, and titanium diisopropoxide bis(ethylacetoacetate). Non-limiting examples of a silicon catalyst include tetramethylammonium siloxanolate and tetramethylsilylmethyl-trifluoromethanesulfonate. A non-limiting example of a palladium catalyst includes tetrakis(triphenylphosphine)palladium(0). Non-limiting examples of a metal triflate catalyst include scandium trifluoromethanesulfonate, lanthanum trifluoromethanesulfonate, and ytterbium trifluoromethanesulfonate. A non-limiting example of a boron catalyst includes tris(pentafluorophenyl)boron. Non-limiting examples of a bismuth catalyst include bismuth-zinc neodecanoate, bismuth 2-ethylhexanoate, a metal carboxylate of bismuth and zinc, and a metal carboxylate of bismuth and zirconium.

In some embodiments, the printable resin comprises a polymerization inhibitor in order to stabilize the composition and prevent premature polymerization. In some embodiments, the polymerization inhibitor is a photopolymerization inhibitor (e.g., oxygen). In some embodiments, the polymerization inhibitor is a phenolic compound (e.g., BHT). In some embodiments, the polymerization inhibitor is a stable radical (e.g., 2,2,4,4-tetramethylpiperidinyl-1-oxy radical, 2,2-diphenyl-1-picrylhydrazyl radical, galvinoxyl radical, or triphenylmethyl radical). In some embodiments, more than one polymerization inhibitor is present in the resin. In some embodiments, the polymerization inhibitor acts as a radical scavenger. In certain embodiments, the polymerization inhibitor is an antioxidant, a hindered amine light stabilizer (HAL), a hindered phenol, or a deactivated radical (e.g., a peroxy compound). In some embodiments, the polymerization inhibitor is selected from the group consisting of 4-tert-butylpyrocatechol, tert-butylhydroquinone, 1,4-benzoquinone, 6-tert-butyl-2,4-xylenol, 2-tert-butyl-1,4-benzoquinone, 2,6-di-tert-butyl-p-cresol, 2,6-di-tert-butylphenol, 1,1-diphenyl-2-picrylhydrazyl free radical, hydroquinone, 4-methoxyphenol, phenothiazine, any derivative thereof, and any combination thereof.

In some embodiments, the printable resin comprises a light blocker in order to dissipate UV radiation. In some embodiments, the light blocker absorbs a specific UV energy value and/or range. In some embodiments, the light blocker is a UV light absorber, a pigment, a color concentrate, or an IR light absorber. In some embodiments, the light blocker comprises a benzotriazole (e.g., 2-(2'-hydroxy-phenyl benzotriazole), a hydroxyphenyltriazine, an oxanilide, a benzophenone, or a combination thereof).

In some embodiments, the printable resin comprises a filler. In some embodiments, the filler comprises calcium carbonate (i.e., chalk), kaolin, metakolinite, a kaolinite derivative, magnesium hydroxide (i.e., talc), calcium silicate (i.e., wollastonite), a glass filler (e.g., glass beads, short glass fibers, or long glass fibers), a nanofiller (e.g., nanoplates, nanofibers, or nanoparticles), a silica filler (e.g., a mica, silica gel, fumed silica, or precipitated silica), carbon black, dolomite, barium sulfate, ATH $Al(OH)_3$, MDH $Mg(OH)_2$, diatomaceous earth, magnetite, halloysite, zinc oxide, titanium dioxide, cellulose, lignin, a carbon filler (e.g., chopped carbon fiber or carbon fiber), a derivative thereof, or a combination thereof.

In some embodiments, the printable resin comprises a pigment, a dye, or a combination thereof. A pigment is typically a suspended solid that may be insoluble in the resin. A dye is typically dissolved in the printable resin. In some embodiments, the pigment comprises an inorganic pigment. In some embodiments, the inorganic pigment comprises an iron oxide, barium sulfide, zinc oxide, antimony trioxide, a yellow iron oxide, a red iron oxide, ferric ammonium ferrocyanide, chrome yellow, carbon black, or aluminum flake. In some embodiments, the pigment comprises an organic pigment. In some embodiments, the organic pigment comprises an azo pigment, an anthraquinone pigment, a copper phthalocyanine (CPC) pigment (e.g., phthalo blue or phthalo green) or a combination thereof. In some embodiments, the dye comprises an azo dye (e.g., a diarylide or Sudan stain), an anthraquinone (e.g., Oil Blue A or Disperse Red 11), or a combination thereof.

In some embodiments, the printable resin comprises a surface energy modifier. In some embodiments, the surface energy modifier can aid the process of releasing a polymer from a mold. In some embodiments, the surface energy modifier can act as an antifoaming agent. In some embodiments, the surface energy modifier comprises a defoaming agent, a deaeration agent, a hydrophobization agent, a leveling agent, a wetting agent, or an agent to adjust the flow properties of the printable resin. In some embodiments, the surface energy modifier comprises an aloxylated surfactant, a silicone surfactant, a sulfosuccinate, a fluorinated polyacrylate, a fluoropolymer, a silicone, a star-shaped polymer, an organomodified silicone, or any combination thereof.

In some embodiments, the printable resin comprises a plasticizer. A plasticizer can be a nonvolatile material that can reduce interactions between polymer chains, which can decrease glass transition temperature, melt viscosity, and elastic modulus. In some embodiments, the plasticizer comprises a dicarboxylic ester plasticizer, a tricarboxylic ester plasticizer, a trimellitate, an adipate, a sebacate, a maleate, or a bio-based plasticizer. In some embodiments, the plasticizer comprises a dicarboxylic ester or a tricarboxylic ester comprising a dibasic ester, a phthalate, bis(2-ethylhexyl) phthalate (DEHP), bis(2-propylheptyl) phthalate (DPHP), diisononyl phthalate (DINP), di-n-butyl phthalate (DBP), butyl benzyl phthalate (BBzP), diisodecyl phthalate (DIDP), dioctyl phthalate (DOP), diisooctyl phthalate (DIOP), diethyl phthalate (DEP), diisobutyl phthalate (DIBP), di-n-hexyl phthalate, a derivative thereof, or a combination thereof. In some embodiments, the plasticizer comprises a trimellitate comprising trimethyl trimellitate (TMTM), tri-(2-ethylhexyl) trimellitate (TEHTM), tri-(n-octyl,n-decyl) trimellitate (ATM), tri-(heptyl,nonyl) trimellitate (LTM), n-octyl trimellitate (OTM), trioctyl trimellitate, a derivative thereof, or a combination thereof. In some embodiments, the plasticizer comprises an adipate comprising bis(2-ethylhexyl)adipate (DEHA), dimethyl adipate (DMAD), monomethyl adipate (MMAD), dioctyl adipate (DOA), Bis[2-(2-butoxyethoxy)ethyl] adipate, dibutyl adipate, diisobutyl adipate, diisodecyl adipate, a derivative thereof, or a combination thereof. In some embodiments, the plasticizer comprises a sebacate comprising dibutyl sebacate (DBS), Bis(2-ethylhexyl) sebacate, diethyl sebacate, dimethyl sebacate, a derivative thereof, or a combination thereof. In some embodiments, the plasticizer comprises a maleate comprising Bis(2-ethylhexyl) maleate, dibutyl maleate, diisobutyl maleate, a derivative thereof, or a combination thereof. In some embodiments, the plasticizer comprises a bio-based plasticizer comprising an acetylated monoglyceride, an alkyl citrate, a methyl ricinoleate, or a green plasticizer. In some embodiments, the alkyl citrate is selected from the group consisting of triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, a derivative thereof, or a combination thereof. In some embodiments, the green plasticizer is selected from the group consisting of epoxidized soybean oil, epoxidized vegetable oil, epoxidized esters of soybean oil, a derivative thereof, or a combination thereof. In some embodiments, the plasticizer comprises an azelate, a benzoate (e.g., sucrose benzoate), a terephthalate (e.g., dioctyl terephthalate), 1,2-cyclohexane dicarboxylic acid diisononyl ester, alkyl sulphonic acid phenyl ester, a sulfonamide (e.g., N-ethyl toluene sulfonamide, N-(2-hydroxypropyl) benzene sulfonamide, N-(n-butyl) benzene sulfonamide), an organophosphate (e.g., tricresyl phosphate or tributyl phosphate), a glycol (e.g., triethylene glycol dihexanoate or tetraethylene glycol diheptanoate), a polyether, a polymeric plasticizer, polybutene, a derivative thereof, or a combination thereof.

In some embodiments, the printable resin comprises a solvent. In some embodiments, the solvent comprises a nonpolar solvent. In certain embodiments, the nonpolar solvent comprises pentane, cyclopentane, hexane, cyclohexane, benzene, toluene, 1,4-dioxane, chloroform, diethyl ether, dichloromethane, a derivative thereof, or a combination thereof. In some embodiments, the solvent comprises a polar aprotic solvent. In certain embodiments, the polar aprotic solvent comprises tetrahydrofuran, ethyl acetate, acetone, dimethylformamide, acetonitrile, DMSO, propylene carbonate, a derivative thereof, or a combination thereof. In some embodiments, the solvent comprises a polar protic solvent. In certain embodiments, the polar protic solvent comprises formic acid, n-butanol, isopropyl alcohol, n-propanol, t-butanol, ethanol, methanol, acetic acid, water, a derivative thereof, or a combination thereof.

In some embodiments, the printable resin comprises a biologically significant chemical. In some embodiments, the biologically significant chemical comprises a hormone, an enzyme, an active pharmaceutical ingredient, an antibody, a protein, a drug, or any combination thereof. In some embodiments, the biologically significant chemical comprises a pharmaceutical composition, a chemical, a gene, a polypeptide, an enzyme, a biomarker, a dye, a compliance indicator, an antibiotic, an analgesic, a medical grade drug, a chemical agent, a bioactive agent, an antibacterial, an antibiotic, an anti-inflammatory agent, an immune-suppressive agent, an immune-stimulatory agent, a dentinal desensitizer, an odor masking agent, an immune reagent, an anesthetic, a nutritional agent, an antioxidant, a lipopolysaccharide complexing agent or a peroxide.

In some embodiments, the added component (i.e., a thermal initiator, a polymerization catalyst, a polymerization inhibitor, a light blocker, a plasticizer, a solvent, a surface energy modifier, a pigment, a dye, a filler, or a biologically significant chemical) is functionalized so that it can be incorporated into the polymer network so that it cannot readily be extracted from the final cured material. In certain embodiments, the thermal initiator, polymerization catalyst, polymerization inhibitor, light blocker, plasticizer, surface energy modifier, pigment, dye, and/or filler are functionalized to facilitate their incorporation into the cured polymeric material. A polymer network, as used herein, can refer to a polymer composition comprising a plurality of polymer chains wherein a large portion (e.g., >80%) and optionally all the polymer chains are interconnected to form a single polymer composition. In an embodiment, there is provided a radiopaque polymer in the form of a crosslinked network in which at least some of the crosslinks of the network structure are formed by covalent bonds.

In some embodiments, the polymeric materials formed from the resin have low levels of extractable materials (e.g., unreacted monomers from said photo-curable resin). The amount of extractable materials can be determined by weight loss of the polymeric material after soaking in water for 1 week, after soaking in ethanol for 48 hours, or after soaking in hexane for 48 hours. A general experiment for determining the amount of extractable material includes the steps of (i) weighing a dried sample of the polymeric material; (ii) soaking the sample in a solvent at a given temperature (e.g., 25° C.) for a period of time; (iii) refreshing the solvent until extraction is completed; (iv) drying the sample in an oven; (v) weighing the extracted sample; and (vi) calculating the weight loss. In some embodiments, the polymeric materials formed from the resin have less than 5 wt %, less than 4 wt %, less than 3 wt %, less than 2 wt %, less than 1 wt %, less than 0.75 wt %, less than 0.5 wt %, or less than 0.25 wt % extractable materials Methods of Making Polymeric Materials In some embodiments, the present disclosure provides a method of producing polymeric materials described herein generated from printable resins as described further herein. In some embodiments, the method comprises the steps of:

providing a printable resin, as disclosed further herein; and curing the printable resin, the curing comprising exposure to light, thereby forming a cured polymeric material.

In some embodiments, the method further comprises the step of fabricating a device using an additive manufacturing device, wherein said additive manufacturing device facilitates the curing. In some embodiments, the curing of the printable resin produces the polymeric material. In certain embodiments, the printable resin is cured using an additive manufacturing device to produce the polymeric material. In some embodiments, the method further comprises the step of cleaning the polymeric material. In certain embodiments, the cleaning of the polymeric material includes washing and/or rinsing the polymeric material with a solvent, which can remove monomers and undesired impurities from the polymeric material.

In some embodiments, the methods disclosed herein are part of a high temperature lithography-based photopolymerization process. In other embodiments, the methods disclosed herein are part of a cold polymerization of solids process. In still other embodiments, both hot lithography and cold polymerization of solids is used to make a material or printed part. Cold polymerization refers to the fact that the resin being cured does not flow at the time it is being polymerized (for example, below the resin melt temperature, below the shear stress needed to cause flow, and/or during a time frame the resin is being handled and readied for polymerization).

Photopolymerization occurs when suitable formulations (e.g., the printable resins disclosed herein) are exposed to radiation (e.g., UV or visible light) of sufficient power and of a wavelength capable of initiating polymerization. The wavelengths and/or power of radiation useful to initiate polymerization may depend on the photoinitiator used. "Light" as used herein includes any wavelength and power capable of initiating polymerization. Some wavelengths of light include ultraviolet (UV), visible, or infrared. UV light sources include UVA (wavelength about 400 nanometers (nm) to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous light, pulsed light, or both continuous and pulsed light during the process. Both the length of time the system is exposed to light and the intensity of the light can be varied to determine the ideal reaction conditions.

In some embodiments, the methods disclosed herein use additive manufacturing to produce a device comprising the polymeric material and/or the polymer composites disclosed herein. In certain embodiments, the methods disclosed herein use additive manufacturing to produce a device consisting essentially of the polymeric materials described herein. As described further herein, processes and systems are provided for additive manufacturing. Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate the appliances herein. In many embodiments, 3D printing involves jetting or extruding one or more materials (e.g., the resins disclosed herein) onto a build surface in order to form successive layers of the object geometry. In some embodiments, the resins described herein can be used in inkjet or coating applications. polymeric material may also be fabricated by "vat" processes in which light is used to selectively cure a vat or reservoir of the curable resin (e.g., the resins disclosed herein). Each layer of curable resin may be selectively exposed to light in a single exposure or by scanning a beam of light across the layer. Specific techniques include stereolithography (SLA), Digital Light Processing (DLP), holographic projection, and two photon-induced photopolymerization (TPIP).

In some embodiments, the methods disclosed herein use continuous direct fabrication to produce a device comprising the polymeric material. In certain embodiments, the methods disclosed herein use continuous direct fabrication to produce a device consisting essentially of the polymeric material. A non-limiting exemplary direct fabrication process can achieve continuous build-up of an object geometry by continuous movement of a build platform (e.g., along the vertical or Z-direction) during an irradiation phase, such that the hardening depth of the irradiated photopolymer (e.g., the irradiated resin, hardening during the formation of the polymeric material) is controlled by the movement speed. Accordingly, continuous polymerization of material (e.g., polymerization of the resin into the polymeric material) on the build surface can be achieved. Such methods are described in U.S. Pat. Nos. 7,892,474 and 10,162,264, the disclosures of which are incorporated herein by reference in their entireties. In yet another example, a continuous direct fabrication method utilizes a "heliolithography" approach in which the liquid resin (e.g., the printable resin) is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352) hereby incorporated by reference in its entirety for description of the process. Another example of continuous direct fabrication method can involve extruding a material composed of a polymeric material surrounding a solid strand. The material can be extruded along a continuous three-dimensional path in order to form the object. Such methods are described in U.S. Patent Publication No. 2014/0061974, the disclosure of which is incorporated herein by reference in its entirety.

In some embodiments, the methods disclosed herein use high temperature lithography to produce a device comprising the polymeric material. In certain embodiments, the methods disclosed herein use high temperature lithography to produce a device consisting essentially of the polymeric material. "High temperature lithography," as used herein, may refer to any lithography-based photopolymerization processes that involve heating photopolymerizable material(s) (e.g., curable resins disclosed herein). The heating may lower the viscosity of the photopolymerizable material(s) before and/or during curing. Non-limiting examples of high-temperature lithography processes include those processes described in WO 2015/075094, WO 2016/078838 and WO 2018/032022. In some implementations, high-temperature lithography may involve applying heat to material to temperatures between 50° C.-120° C., such as 90° C.-120° C., 100° C.-120° C., 105° C.-115° C., 108° C.-110° C., etc. The material may be heated to temperatures greater than 120° C. It is noted that other ranges may be used without departing from the scope and substance of the inventive concepts described herein.

In another embodiment, the methods disclosed herein comprise a continuous direct fabrication step. The continuous direct fabrication step can involve extruding a material composed of a curable liquid material (e.g., the printable resin) surrounding a solid strand. The liquid material can be extruded along a continuous three-dimensional path in order to form an object or device. Such methods are described in U.S. Patent Publication No. 2014/0061974, the disclosure of which is incorporated herein by reference in its entirety.

In some embodiments, the methods disclosed herein further comprises fabricating an object with the polymeric material. In certain embodiments, fabricating the object comprises additive manufacturing. In some embodiments, fabricating the object with the polymeric material comprises printing with a 3D printer. In some embodiments, fabricating the object with the polymeric material comprises digital light projection. In certain embodiments, fabricating the object with the polymeric material comprises using hot lithography.

In some embodiments, the object is an orthodontic appliance. In some embodiments, the orthodontic appliance is an aligner, expander or spacer. In some embodiments, the orthodontic appliance comprises a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration. In some embodiments, the orthodontic appliance is one of a plurality of orthodontic appliances configured to reposition the teeth from an initial configuration toward a target configuration according to a treatment plan. In some embodiments wherein the orthodontic appliance is an aligner.

Devices Comprising Polymeric Materials of the Present Disclosure

In some embodiments, the present disclosure provides devices comprising the polymeric materials generated from the printable resins as described further herein. In some embodiments, the present disclosure provides devices formed from the processes and systems described further herein. In some embodiments, the disclosures are used to create a device intended to be placed in the intraoral cavity of a human. Such devices can be, for example, aligners that help to move teeth to new positions. In some embodiments, the devices can be retainers that help to keep teeth from moving to a new position. In some embodiments, the device can be used to expand the palate, move the location of the jaw, or prevent snoring of a human.

In some embodiments, the present disclosure provides methods for producing the devices described herein, said devices comprising a polymeric material. In some embodiments, the method comprises a step of shaping a printable resin into a desirable shape prior to a step of curing the printable resin, thereby generating the polymeric material having said desirable shape. In some embodiments, the method comprises a step of shaping a printable resin into a desirable shape during a step of curing the printable resin, thereby generating the polymeric material having said desirable shape. In some embodiments, the method comprises a step of curing the printable resin, thereby forming the polymeric material, then shaping the polymeric material into a desirable shape. In some embodiments, the desirable shape is an orthodontic appliance. In some embodiments, the desirable shape is a device and/or object as disclosed herein. In some embodiments, the materials disclosed herein are shape memory materials.

Exemplary embodiments of devices that can be cured using the materials disclosed herein include dental appliances for use in humans. In some embodiments, such devices can be used as treatment systems for providing an orthodontic treatment. In some embodiments, the materials and methods described herein are useful in, e.g., the automotive industry, the aeronautical industry, spare parts industries, home hobbyist industries, the shoe industry, the boating industry. In some embodiments, the materials and methods described herein are useful in the printing of replacement parts for other devices and/or equipment.

In certain aspects, the present disclosure provides a method of making an orthodontic appliance comprising a polymeric material as described herein, the method comprising providing a printable resin as further described herein; and fabricating the polymeric material by a direct or additive fabrication process. The printable resin may be exposed to light in said direct or additive fabrication process. The process may further comprise an additional curing step following fabrication of the polymeric material.

In certain aspects, the present disclosure provides an orthodontic appliance comprising a polymeric material as further described herein. The orthodontic appliance may be an aligner, expander or spacer. In some embodiments, the orthodontic appliance comprises a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration, optionally according to a treatment plan. As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

The curable resins and cured polymeric materials according to the present disclosure exhibit favorable thermomechanical properties for use as orthodontic appliances, for example, for moving one or more teeth.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. In some cases, the reinforced composites can comprise a polymer matrix reinforced with ceramic or metallic particles, for example. The appliance can be shaped in many ways, such as with thermoforming or direct fabrication as described herein, for example. Alternatively or in combination, the appliance can be fabricated with machining such as an appliance fabricated from a block of material with computer numeric control machining. Preferably, the appliance is fabricated using a curable resin according to the present disclosure.

Turning now to the drawings, in which like numbers designate like elements in the various figures, FIG. 1A illustrates an exemplary tooth repositioning appliance or aligner (100) that can be worn by a patient in order to achieve an incremental repositioning of individual teeth (102) in the jaw, and comprises the cured polymeric material disclosed herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements (104) on teeth (102) with corresponding receptacles or apertures (106) in the appliance (100) so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
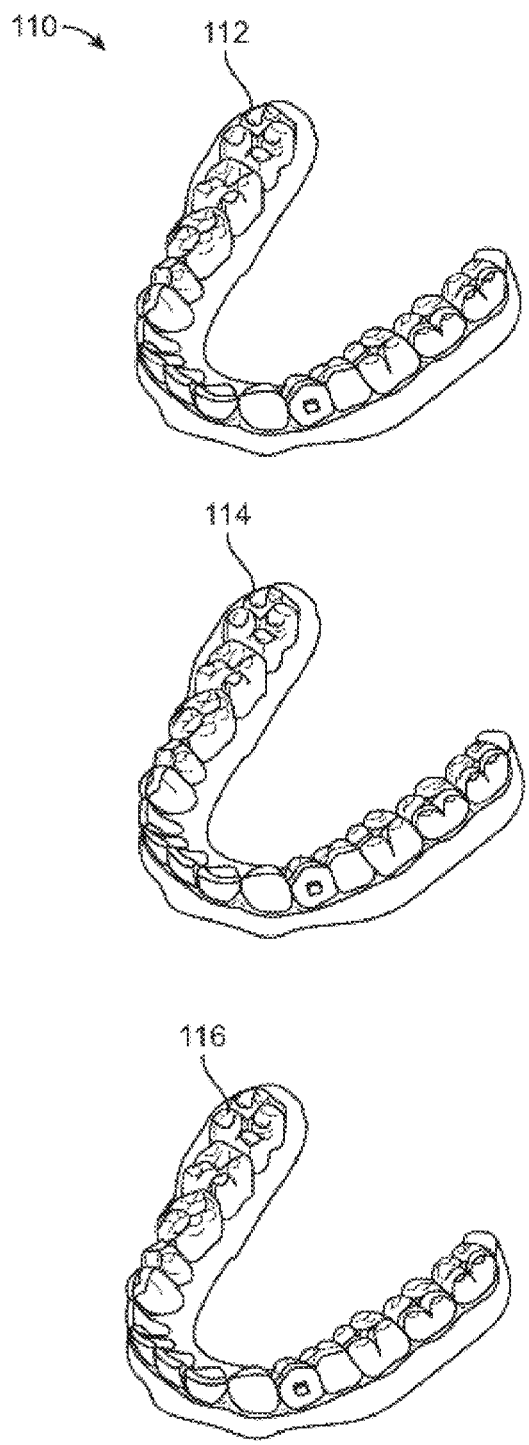
FIG. 1B illustrates a tooth repositioning system, in accordance with embodiments of the present disclosure.

FIG. 1B illustrates a tooth repositioning system (110) including a plurality of appliances (112), (114), (116). Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system (110) can include a first appliance (112) corresponding to an initial tooth arrangement, one or more intermediate appliances (114) corresponding to one or more intermediate arrangements, and a final appliance (116) corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
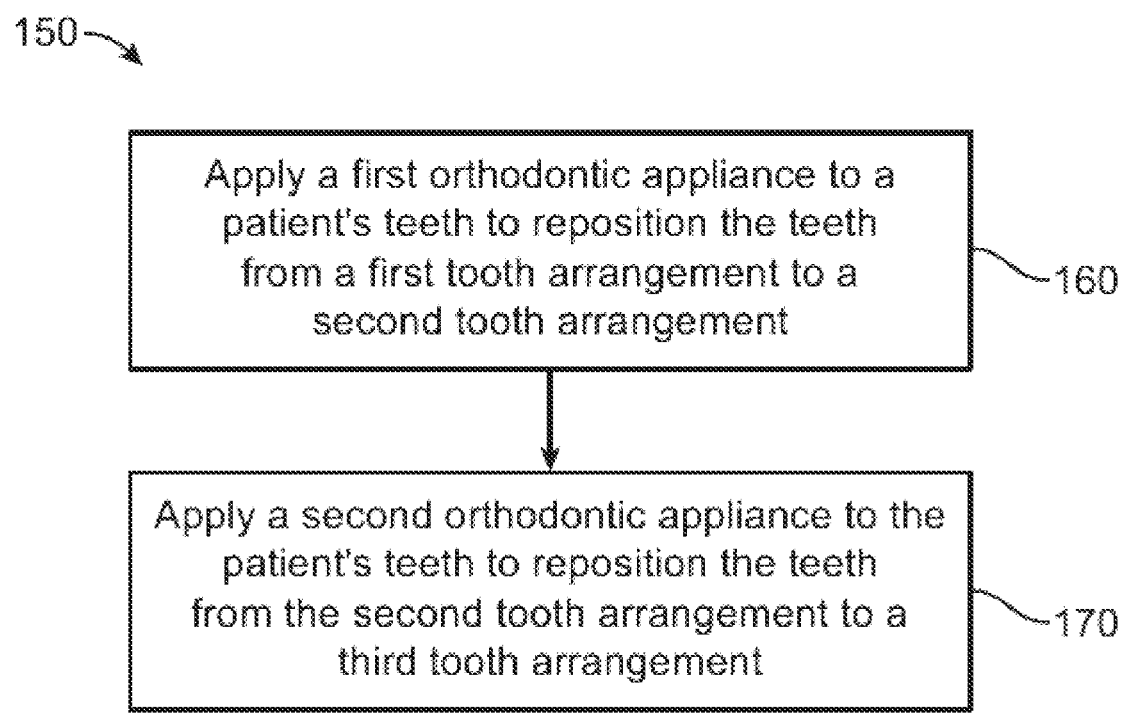
FIG. 1C illustrates a method of orthodontic treatment using a plurality of appliances, in accordance with embodiments of the present disclosure.

FIG. 1C illustrates a method (150) of orthodontic treatment using a plurality of appliances, in accordance with embodiments. The method (150) can be practiced using any of the appliances or appliance sets described herein. In step (160), a first orthodontic appliance is applied to a patient's teeth in order to reposition the teeth from a first tooth arrangement to a second tooth arrangement. In step (170), a second orthodontic appliance is applied to the patient's teeth in order to reposition the teeth from the second tooth arrangement to a third tooth arrangement. The method (150) can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

Machine parameters can include curing parameters. For digital light processing (DLP)-based curing systems, curing parameters can include light intensity, curing time, amount of material added by a hopper, sprayer, and/or ink jetter, the light intensity and dose of a second wavelength (e.g., infrared light), and/or grayscale of the full image(s). For laser-based curing systems, curing parameters can include light intensity, scan speed, beam size, beam shape and/or power distribution of the beam. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., light intensity, curing time, gray scale, etc.) to compensate for variability in material properties. By implementing process controls for the fabrication machine, reduced variability in appliance accuracy and residual stress can be achieved.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. In some embodiments, the direct fabrication techniques described herein can be used to produce appliances with substantially anisotropic material properties (e.g., having substantially different strengths along all directions). In some embodiments, the direct fabrication techniques described herein can produce an orthodontic appliance having a strength that varies by more than 10%, more than 15%, more than 20%, or more than 25% along all directions, but in a controlled manner. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 12 hours, about 8 hours, about 4 hours, about 2 hours, about 1 hour, about 30 minutes, about 25 minutes, about 20 minutes, about 15 minutes, about 10 minutes, about 5 minutes, about 4 minutes, about 3 minutes, about 2 minutes, about 1 minute, or about 30 seconds (which optionally includes time for any removal of supports, post-curing of the part, and/or removal of uncured resin, if any of these steps are needed). Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
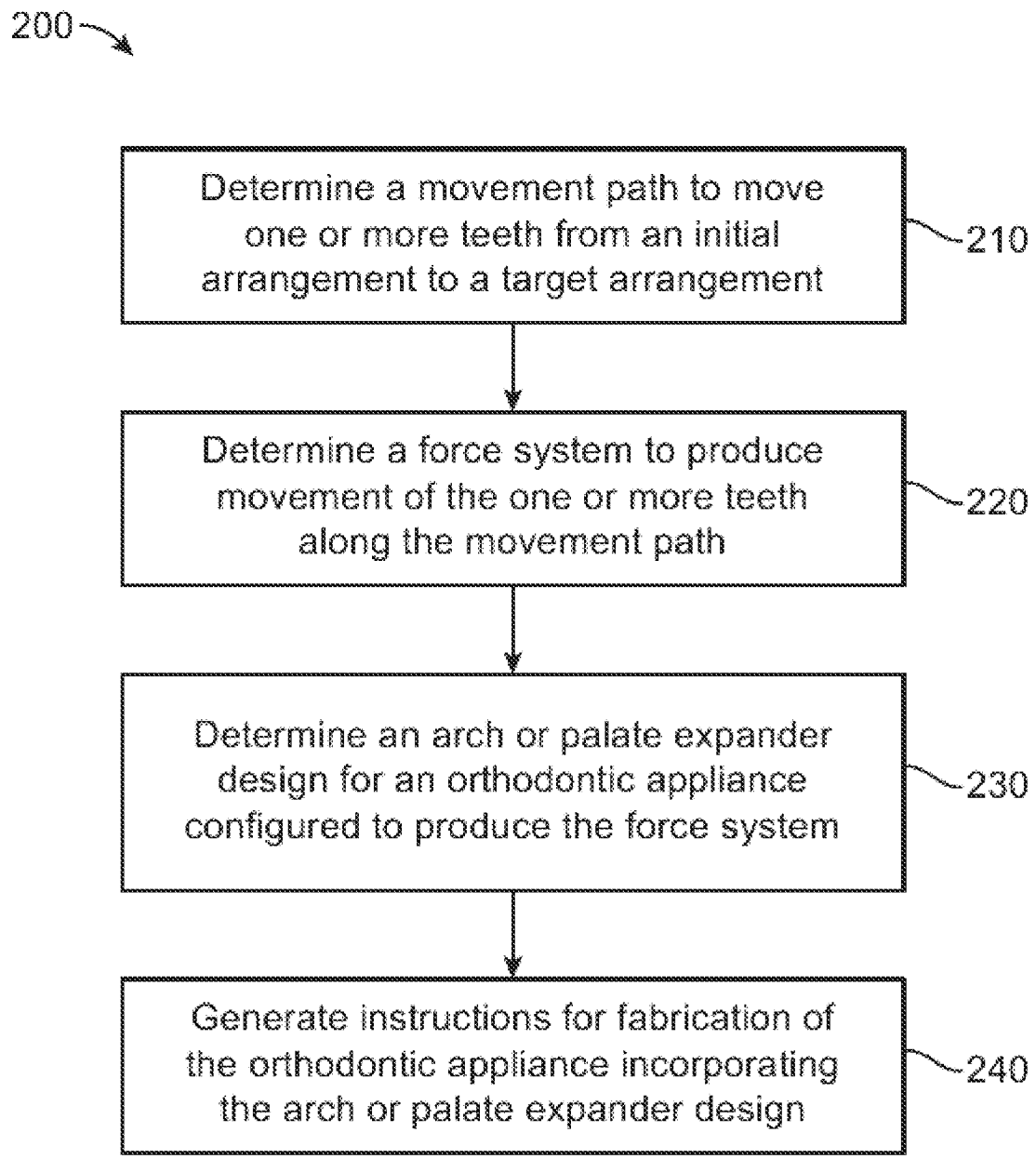
FIG. 2 illustrates a method for designing an orthodontic appliance, in accordance with embodiments of the present disclosure.

FIG. 2 illustrates a method (200) for designing an orthodontic appliance to be produced by direct fabrication, in accordance with embodiments. The method (200) can be applied to any embodiment of the orthodontic appliances described herein. Some or all of the steps of the method (200) can be performed by any suitable data processing system or device, e.g., one or more processors configured with suitable instructions.

In step (210), a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step (220), a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step (230), an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA(Abaqus) software products from Dassault Systémes of Waltham, Mass.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step (240), instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method (200) may comprise additional steps: 1) The upper arch and palate of the patient is scanned intraorally to generate three-dimensional data of the palate and upper arch; 2) The three-dimensional shape profile of the appliance is determined to provide a gap and teeth engagement structures as described herein.

Although the above steps show a method (200) of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method (200) may be performed with any suitable fabrication system or device, such as the embodiments described herein. Some of the steps may be optional, and the order of the steps can be varied as desired.

Figure 3:
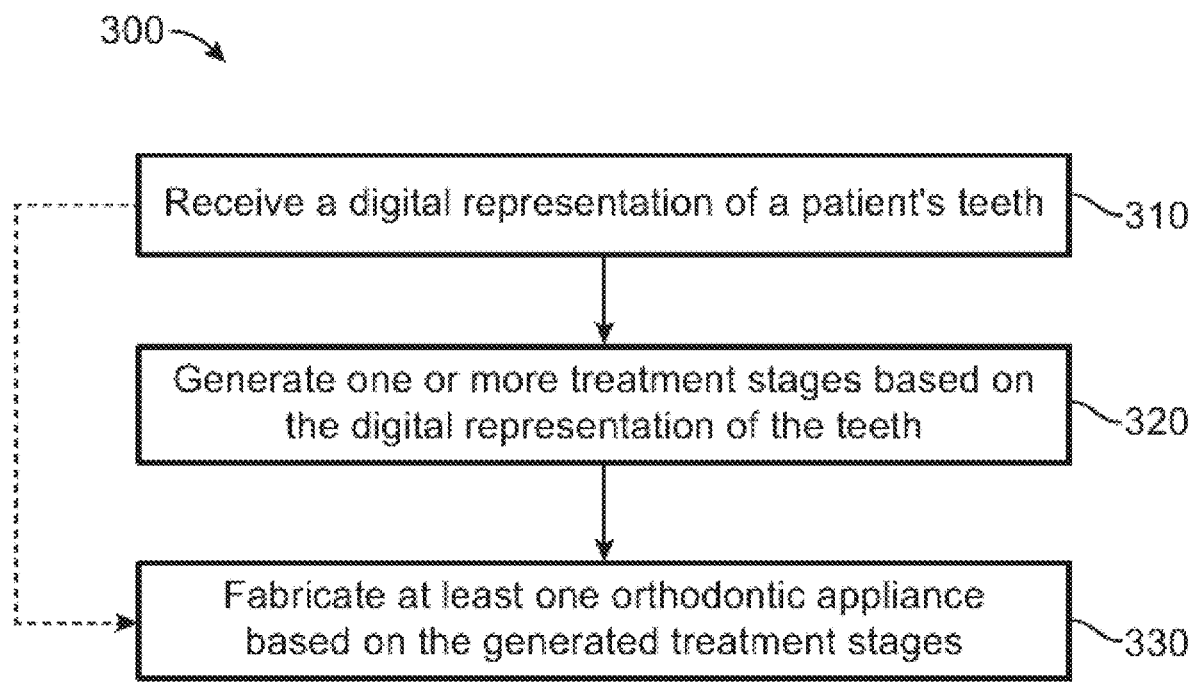
FIG. 3 illustrates a method for digitally planning an orthodontic treatment, in accordance with embodiments of the present disclosure.

FIG. 3 illustrates a method (300) for digitally planning an orthodontic treatment and/or design or fabrication of an appliance, in accordance with embodiments. The method (300) can be applied to any of the treatment procedures described herein and can be performed by any suitable data processing system.

In step (310), a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step (320), one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step (330), at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth (310)), followed by design and/or fabrication of an orthodontic appliance based on a representation of the patient's teeth in the arrangement represented by the received representation.

On-Track Treatment

In some embodiments, this disclosure provides a method for repositioning a patient's teeth, the method comprising applying an orthodontic appliance disclosed herein to at least one of a patient's teeth, and moving at least one of the patient's teeth toward an intermediate arrangement or a final tooth arrangement.

In some embodiments, this disclosure provides a method of repositioning a patient's teeth, the method comprising:

generating a treatment plan for a patient, the plan comprising a plurality of intermediate tooth arrangements for moving teeth along a treatment path from an initial arrangement toward a final arrangement;

producing a 3D printed orthodontic appliance comprising a material as further described herein; and moving on-track, with the orthodontic appliance, at least one of the patient's teeth toward an intermediate arrangement or a final tooth arrangement.

Figure 4:
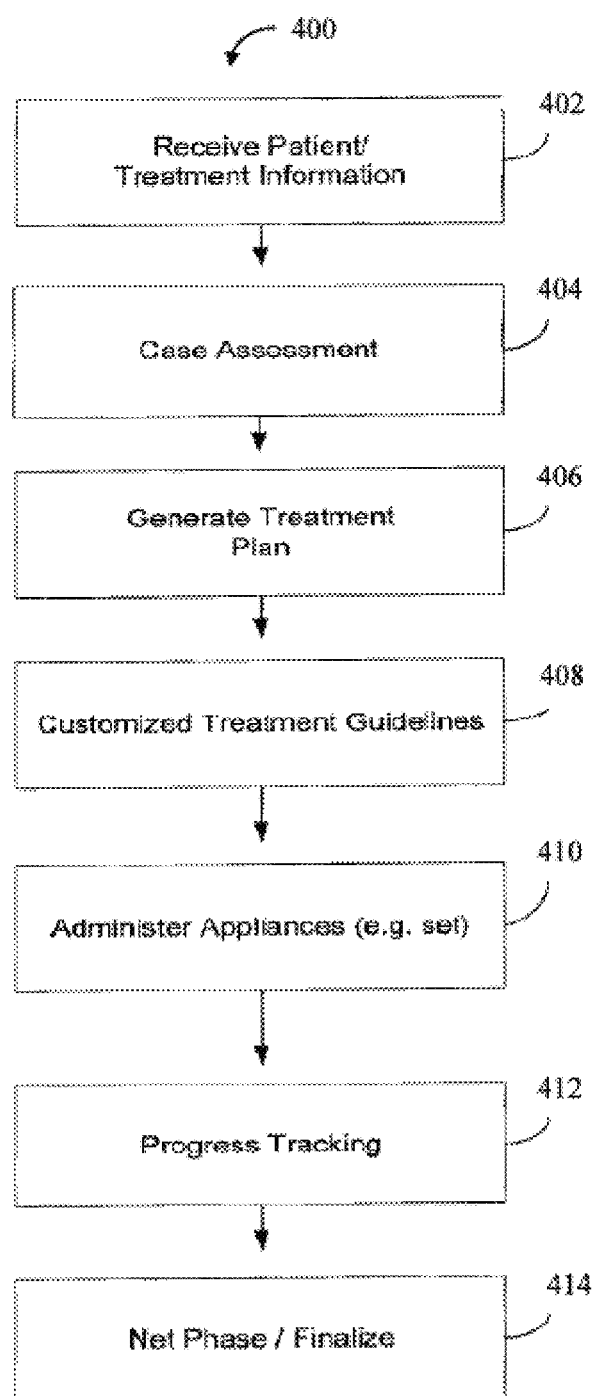
FIG. 4 illustrates generating and administering treatment according to an embodiment of the present disclosure.

Referring to FIG. 4, a process (400) according to the present disclosure is illustrated. Individual aspects of the process are discussed in further detail below. The process includes receiving information regarding the orthodontic condition of the patient and/or treatment information (402), generating an assessment of the case (404), and generating a treatment plan for repositioning a patient's teeth (406). Briefly, a patient/treatment information will include obtaining data comprising an initial arrangement of the patient's teeth, which typically includes obtaining an impression or scan of the patient's teeth prior to the onset of treatment and can further include identification of one or more treatment goals selected by the practitioner and/or patient. A case assessment can be generated (404) so as to assess the complexity or difficulty of moving the particular patient's teeth in general or specifically corresponding to identified treatment goals, and may further include practitioner experience and/or comfort level in administering the desired orthodontic treatment. In some cases, however, the assessment can include simply identifying particular treatment options (e.g., appointment planning, progress tracking, etc.) that are of interest to the patient and/or practitioner. The information and/or corresponding treatment plan will include identifying a final or target arrangement of the patient's teeth that is desired, as well as a plurality of planned successive or intermediary tooth arrangements for moving the teeth along a treatment path from the initial arrangement toward the selected final or target arrangement.

The process further includes generating customized treatment guidelines (408). The treatment plan typically includes multiple phases of treatment, with a customized set of treatment guidelines generated that correspond to a phase of the treatment plan. The guidelines will include detailed information on timing and/or content (e.g., specific tasks) to be completed during a given phase of treatment, and will be of sufficient detail to guide a practitioner, including a less experienced practitioner or practitioner relatively new to the particular orthodontic treatment process, through the phase of treatment. Since the guidelines are designed to specifically correspond to the treatment plan and provide guidelines on activities specifically identified in the treatment information and/or generated treatment plan, the guidelines are said to be customized. The customized treatment guidelines are then provided to the practitioner so as to help instruct the practitioner as how to deliver a given phase of treatment. As set forth above, appliances can be generated based on the planned arrangements and will be provided to the practitioner and ultimately administered to the patient (410). The appliances are typically provided and/or administered in sets or batches of appliances, such as 2, 3, 4, 5, 6, 7, 8, 9, or more appliances, but are not limited to any particular administrative scheme. Appliances can be provided to the practitioner concurrently with a given set of guidelines, or appliances and guidelines can be provided separately.

After the treatment according to the plan begins and following administration of appliances to the patient, treatment progress tracking, e.g., by teeth matching, is done to assess a current and actual arrangement of the patient's teeth compared to a planned arrangement (412). If the patient's teeth are determined to be "on-track" and progressing according to the treatment plan, then treatment progresses as planned and treatment progresses to the next stage of treatment (414). If the patient's teeth have substantially reached the initially planned final arrangement, then treatment progresses to the final stages of treatment (414). Where the patient's teeth are determined to be tracking according to the treatment plan, but have not yet reached the final arrangement, the next set of appliances can be administered to the patient.

The threshold difference values of a planned position of teeth to actual positions selected as indicating that a patient's teeth have progressed on-track are provided below in Table 1. If a patient's teeth have progressed at or within the threshold values, the progress is considered to be on-track. If a patient's teeth have progressed beyond the threshold values, the progress is considered to be off-track.

TABLE 1

| Type Movement | Difference Actual/Planned |
| --- | --- |
| Rotations | |
| Upper Central Incisors | 9 degrees |
| Upper Lateral Incisors | 11 degrees |
| Lower Incisors | 11 degrees |
| Upper Cuspids | 11 degrees |
| Lower Cuspids | 9.25 degrees |
| Upper Bicuspids | 7.25 degrees |
| Lower First Bicuspid | 7.25 degrees |
| Lower Second Bicuspid | 7.25 degrees |
| Molars | 6 degrees |

TABLE 1-continued

| Type Movement | Difference Actual/Planned |
| --- | --- |
| Extrusion | |
| Anterior | 0.75 mm |
| Posterior | 0.75 mm |
| Intrusion | |
| Anterior | 0.75 mm |
| Posterior | 0.75 mm |
| Angulation | |
| Anterior | 5.5 degrees |
| Posterior | 3.7 degrees |
| Inclination | |
| Anterior | 5.5 degrees |
| Posterior | 3.7 degrees |
| Translation | |
| BL Anterior | 0.7 mm |
| BL Posterior Cuspids | 0.9 mm |
| MD Anterior | 0.45 mm |
| MD Cuspids | 0.45 mm |
| MD Posterior | 0.5 mm |

The patient's teeth are determined to be on track by comparison of the teeth in their current positions with teeth in their expected or planned positions, and by confirming the teeth are within the parameter variance disclosed in Table 1. If the patient's teeth are determined to be on track, then treatment can progress according to the existing or original treatment plan. For example, a patient determined to be progressing on track can be administered one or more subsequent appliances according to the treatment plan, such as the next set of appliances. Treatment can progress to the final stages and/or can reach a point in the treatment plan where bite matching is repeated for a determination of whether a patient's teeth are progressing as planned or if the teeth are off track.

In some embodiments, as further disclosed herein, this disclosure provides methods of treating a patient using a 3D printed orthodontic appliance. In certain embodiments, the method of repositioning a patient's teeth (or, in some embodiments, a singular tooth) comprises: generating a treatment plan for the patient, the plan comprising tooth arrangements for moving teeth along a treatment path from an initial arrangement toward a final arrangement; producing a 3D printed orthodontic appliance; and moving on-track, with the orthodontic appliance, at least one of the patient's teeth toward an intermediate arrangement or a final tooth arrangement. In some embodiments, producing the 3D printed orthodontic appliance uses the printable resins disclosed further herein. On-track performance can be determined, e.g., from Table 1, above.

In some embodiments, the method further comprises tracking the progression of the patient's teeth along the treatment path after administration of the orthodontic appliance. In certain embodiments, the tracking comprises comparing a current arrangement of the patient's teeth to a planned arrangement of the teeth. As a non-limiting example, following the initial administration of the orthodontic appliance, a period of time passes (e.g., two weeks), a comparison of the now-current arrangement of the patient's teeth (i.e., at two weeks of treatment) can be compared with the teeth arrangement of the treatment plan. In some embodiments, the progression can also be tracked by comparing the current arrangement of the patient's teeth with the initial configuration of the patient's teeth. The period of time can be, for example, greater than 3 days, greater than 4 days, greater than 5 days, greater than 6 days, greater than 7 days, greater than 8 days, greater than 9 days, greater than 10 days, greater than 11 days, greater than 12 days, greater than 13 days, greater than 2 weeks, greater than 3 weeks, greater than 4 weeks, or greater than 2 months. In some embodiments, the period of time can be from at least 3 days to at most 4 weeks, from at least 3 days to at most 3 weeks, from at least 3 days to at most 2 weeks, from at least 4 days to at most 4 weeks, from at least 4 days to at most 3 weeks, or from at least 4 days to at most 2 weeks. In certain embodiments, the period of time can restart following the administration of a new orthodontic appliance.

In some embodiments, greater than 50%, greater than 55%, greater than 60%, greater than 65%, greater than 70%, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the patient's teeth are on track with the treatment plan after a period of time of using an orthodontic appliance as disclosed further herein. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

Material Properties

In some embodiments of the method disclosed above, the 3D printed orthodontic appliance has a retained repositioning force (i.e., the repositioning force after the orthodontic appliance has been applied to or worn by the patient over a period of time), and the retained repositioning force to at least one of the patient's teeth after the period of time is at least 10%, at least 20%, at least 30%, at least 40%, at least 50%, at least 55%, at least 60%, at least 65%, at least 70%, at least 75%, at least 80%, at least 85%, at least 90%, at least 95%, at least 96%, at least 97%, at least 98%, or at least 99% of the repositioning force initially provided to the at least one of the patient's teeth (i.e., with initial application of the orthodontic appliance). In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

In some embodiments, the orthodontic appliances disclosed herein can provide on-track movement of at least one of the patient's teeth. On-track movement has been described further herein, e.g., at Table 1. In some embodiments, the orthodontic appliances disclosed herein can be used to achieve on-track movement of at least one of the patient's teeth to an intermediate tooth arrangement. In some embodiments, the orthodontic appliances disclosed herein can be used to achieve on-track movement of at least one of the patient's teeth to a final tooth arrangement.

In some embodiments, prior to moving on-track, with the orthodontic appliance, at least one of the patient's teeth toward the intermediate arrangement or the final tooth arrangement, the orthodontic appliance comprises a first flexural stress; and after achieving on-track the movement of the at least one of the patient's teeth to the intermediate arrangement or the final tooth arrangement, the orthodontic appliance comprises a second flexural stress. In some embodiments, the second flexural stress is from 80 MPa to 0.5 MPa, from 70 MPa to 0.5 MPa, from 60 MPa to 1 MPa, from 50 MPa to 1 MPa, from 40 MPa to 1 MPa, from 30 MPa to 2 MPa, from 25 MPa to 2 MPa, from 20 MPa to 2 MPa, from 15 MPa to 2 MPa, or from 15 MPa to 0.01 MPa. In some embodiments, flexural stress is assessed according to ASTM E328. In some embodiments, the time period between an initial placement of the orthodontic appliance to the patient's teeth and achieving on-track the movement is 3 days, 4 days, 5 days, 6 days, 7 days, 8 days, 9 days, 10 days, 11 days, 12 days, 13 days, two weeks, or less than two weeks.

In some embodiments, prior to moving, with the orthodontic appliance, at least one of the patient's teeth toward an intermediate arrangement or a final tooth arrangement, the orthodontic appliance has characteristics which are retained following the use of the orthodontic appliance.

As provided herein, the methods disclosed can use the orthodontic appliances further disclosed herein. Said orthodontic appliances can be directly fabricated using, e.g., the resins disclosed herein. In certain embodiments, the direct fabrication comprises cross-linking the resin.

The appliances formed from the resins disclosed herein provide improved durability, strength, and flexibility, which in turn improve the rate of on-track progression in treatment plans. In some embodiments, greater than 60%, greater than 70%, greater than 80%, greater than 90%, or greater than 95% of patients treated with the orthodontic appliances disclosed herein (e.g., an aligner) are classified as on-track in a given treatment stage. In certain embodiments, greater than 60%, greater than 70%, greater than 80%, greater than 90%, or greater than 95% of patients treated with the orthodontic appliances disclosed herein (e.g., an aligner) have greater than 50%, greater than 55%, greater than 60%, greater than 65%, greater than 70%, greater than 75%, greater than 80%, greater than 85%, greater than 90%, or greater than 95% of their tooth movements classified as on-track.

EXAMPLES

The specific compositions, synthesis, formulations, and descriptions of any of the materials, devices, systems, and components thereof, of the present disclosure can be readily varied depending upon the intended application, as will be apparent to those of skill in the art in view of the disclosure herein. Moreover, it is understood that the examples and aspects described herein are for illustrative purposes only and that various modifications or changes in light thereof can be suggested to persons skilled in the art and are included within the spirit and purview of this application and scope of the appended claims. Numerous different combinations of aspects described herein are possible, and such combinations are considered part of the present disclosure. In addition, all features discussed in connection with any one aspect herein can be readily adapted for use in other aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

Example 1

Pressure Sensitive Adhesion

This example describes the application of pressure to layers of resin material to at least partially melt the layers, thereby laminating the layers.

Figure 11A:
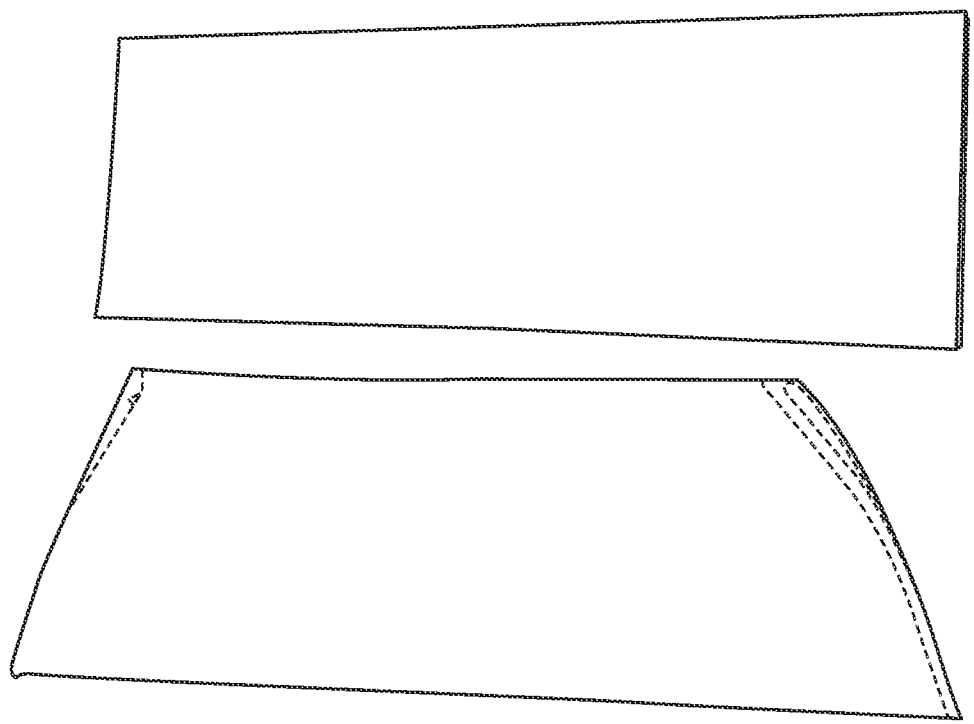
FIG. 11A illustrates two sheets of solid resin.
Figure 11B:
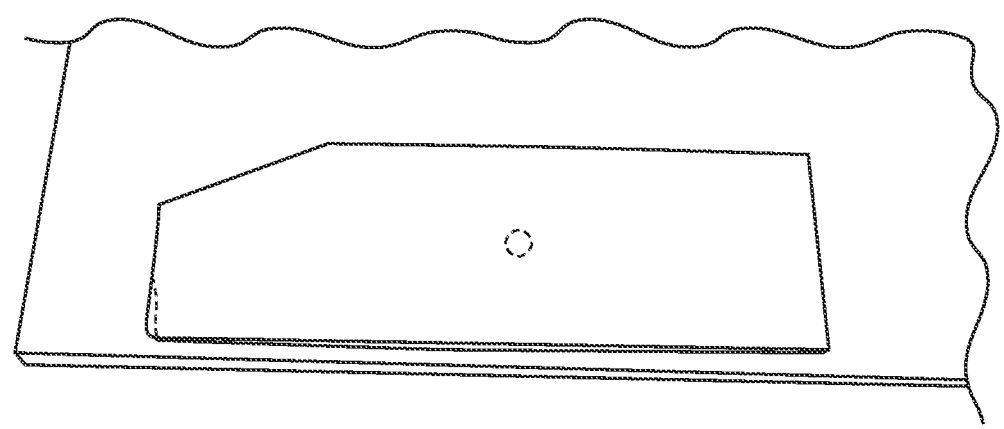
FIG. 11B illustrates the two sheets of resin adhered together with application of pressure.

Two solids strips of resin having a melting point from 50° C. to 60° C. were obtained, as illustrated in FIG. 11A. The strips of resin comprised 80 wt % Poly(caprolactone) diacrylate having about 10 k Mn, 19 wt % Tricyclodecanediol diacrylate, and 1 wt % TPO (photoinitiator). The resin was cast into sheets and allowed to solidify. A first solid strip of the resin was placed on top of a second solid strip of the resin. While the stacked layers of resin were at room temperature, pressure was applied to the central portion of the stacked sheets. As shown in FIG. 11B, at least partial melting of the resin was observed and the layers melded together where pressure was applied (e.g., the central region has at least some translucence).

This example showed that solid materials, such as the resins (and especially uncured resins) applied with the systems and methods herein can be laminated with application of pressure. When the solid resin layers are near their melting point, a small amount of pressure is sufficient to cause some melting (e.g., at the interface between the two layers) which laminates the two pieces of resin together. The closer the material is to its melting point, the lower the amount of force or time required to apply sufficient pressure to cause successful lamination. As described further herein, following lamination an exposure of the material to a source of light (e.g., to photopolymerize the material) will cause permanent adherence of the two layers.

Example 2

Adhering Solid Sheets of Resin

This example demonstrates layers of resin applied together and cured to form desired two adhered layers of material.

Figure 12A:
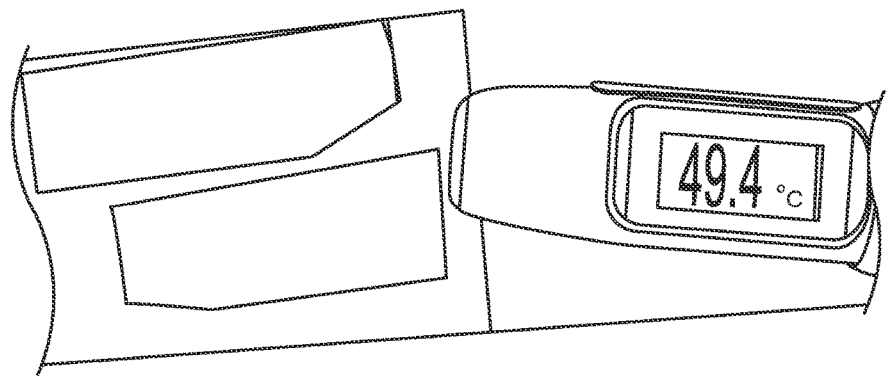
FIG. 12A illustrates two sheets of warmed solid resin.
Figure 12B:
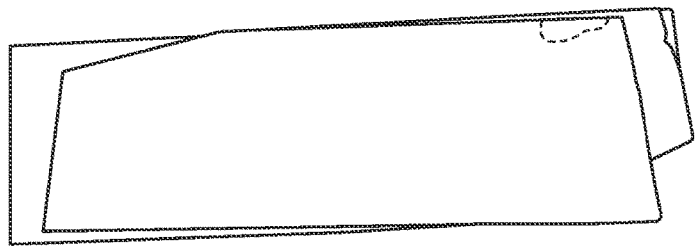
FIG. 12B illustrates the two sheets of resin adhered together.

Two solid strips of resin as described in Example 1 were obtained. The strips had a melting point from 50° C. to 60° C. and were heated to approximately 50° C. as shown in FIG. 12A. By warming the strips of resin close to their melting temperature, the lamination of the two solids was facilitated (e.g., by enabling lamination with application of a small amount of force). The solid strips of resin were stacked as shown in FIG. 12B and light even pressure was applied to adhere the two layers together (i.e., the layers were laminated).

Figure 12C:
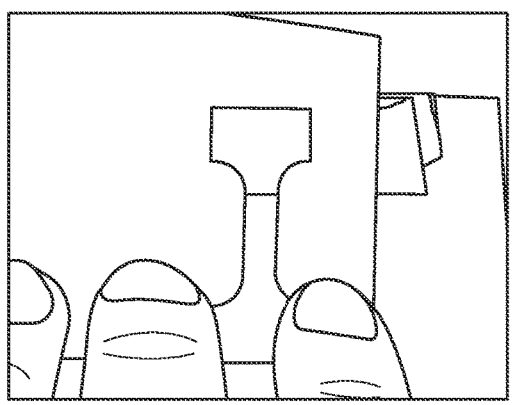
FIG. 12C illustrates a mask used during photopolymerization.
Figure 12D:
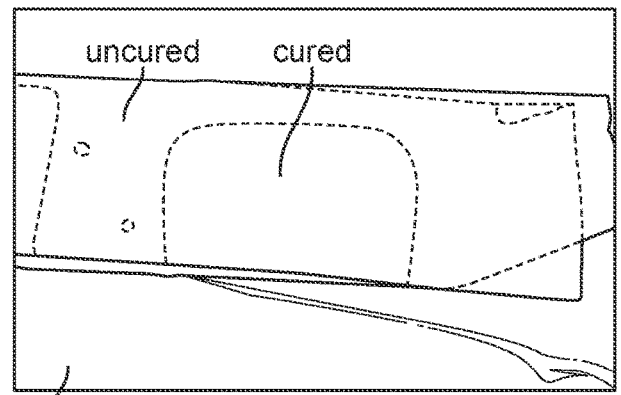
FIG. 12D illustrates the sample sheets of material, delineating the cured and uncured regions.

A mask was placed over the laminated layers of resin. The mask represents a projected image which can be applied in the materials and methods described herein. The sample was then irradiated with the mask in place, thus photopolymerizing the exposed region of the layered solid resin, as shown in FIG. 12C. The cured sample was then heated to 90° C. with a hot plate. As shown in FIG. 12D, the uncured resin melted away from the sample while the cured material (i.e., the portion photopolymerized through the exposed section of the mask) remained intact.

Figure 12E:
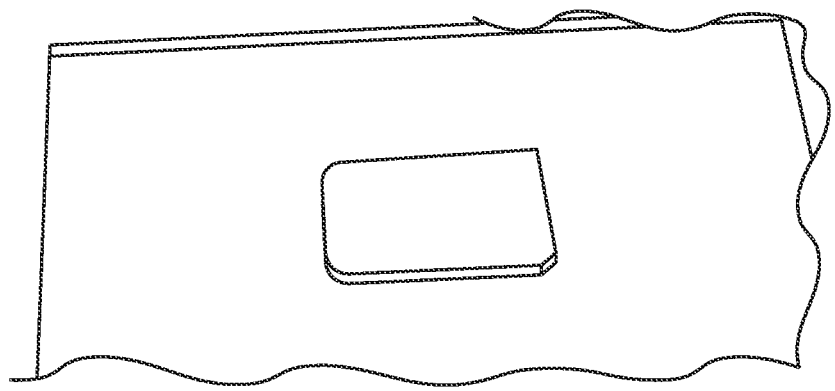
FIG. 12E illustrates the isolated sample of polymeric material.
Figure 12F:
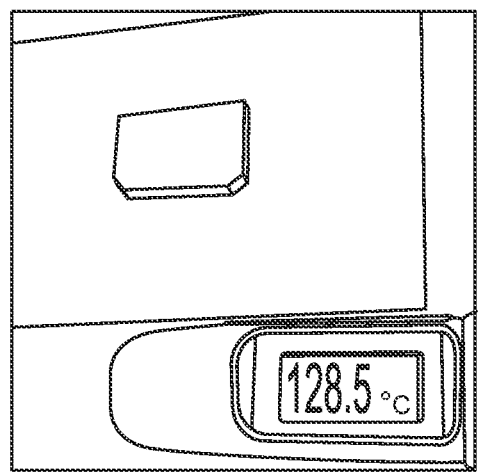
FIG. 12F illustrates the robustness of the polymeric material at high temperature.

The melted uncured resin was scraped away from the cured sample, leaving the clean cured section of the sample as shown in FIG. 12E. The photocured section of solid material was heated to 130° C. to show that the cured polymeric material does not melt at the same temperature range as the uncured resin (FIG. 12F).

Figure 12G:
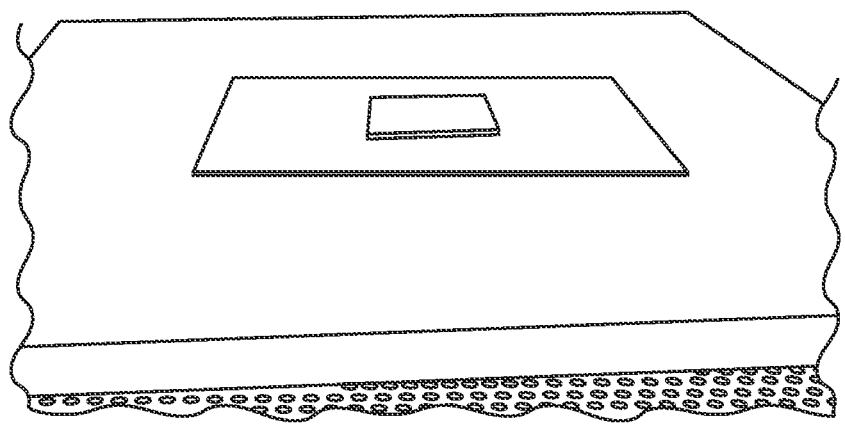
FIG. 12G illustrates the polymeric material being post-cured.

Following photopolymerization and removal of uncured resin, the sample was post-cured with light and heat as shown in FIG. 12G. Post-curing the material ensured the material was fully cured and had the final properties of the desired polymeric material. The final cured polymeric material acted as one solid piece (as opposed to two pieces of individual solid layers placed together). Attempts to pull the two layers apart were not successful. This shows the lamination and curing successfully formed a single material from multiple solid sheets of resin.

This example showed that solid sheets or layers of resin (e.g., uncured resin) can be laminated together and cured in a manner that is viable to produce 3D objects as further described herein. The example shows laminate printing can produce 3 dimensional parts with precision similar to stereolithography. This example also shows the potential that phase-separated materials can be formed with composite-like properties (e.g., through application of a mask during photopolymerization).

The uncured resin that was melted and removed from the cured sample was recast as solids and the experiment was repeated using the recycled material. The product produced from the recycled resin was substantially similar to the product produced from new material (i.e., in the first iteration of the experiment). This result demonstrated the recyclability of the resin, as described further in the systems and methods disclosed herein.

Example 3

Forming 3D Object from Solid Sheets of Resin

This example describes the formation of a 3D object from solid sheets of resin as described further herein.

A resin mixture comprising 99 wt % polycaprolactone diacrylate (10 k Mw) and 1 wt % Diphenyl(2,4,6-trimethylbenzoyl)phosphine oxide (TPO, photoinitiator) was heated to 90° C., forming a hot and flowable resin. The hot resin was applied as a thin layer to a polyester film (i.e., a carrier film) with a draw down bar. The resin was then transported to a cold metal plate (i.e., a cooling element) with the polyester film against the cold metal plate surface. The resin was cooled and the polycaprolactone diacrylate solidified via crystallization.

The solidified and cooled resin layer was transported and applied to a build platform with the polyester film positioned between the applied resin and a source of light. The layer of solid resin was selectively photocured in one or more regions with the source of light and the polyester film was removed. This process was repeated with iterative addition of successive layers of solid resin to build up a 3-dimensional object on the build platform. The resulting 3-dimensional object was substantially surrounded by uncured resin (i.e., for each layer, selectively photopolymerized regions formed the 3D object comprising polymerized material while non-photopolymerized regions contained uncured resin). The resulting built object was removed from the build block and heated to reduce viscosity of the uncured resin, causing the uncured resin to flow away from the photocured 3D object. The uncured resin was collected and reused.

In some cases, the photocured 3D object was washed with a solvent to dissolve or otherwise wash away uncured resin, and the object was centrifuged to facilitate the removal of uncured resin and/or solvent from the photocured object. In some cases, the cleaned 3D object was post-cured in a light box and/or heated oven.

The resulting 3D object had expected polymer material properties, and the detailed shape of the 3D object was controllable by, e.g., masking and controlling exposure to light during the photopolymerization step. This result demonstrated 3D objects could be formed using solid resin sheets as described further herein. This result also demonstrated the shape of such 3D object could be fine-tuned and the resulting material properties were controllable. Furthermore, this result demonstrated the uncured resin could be reused or recycled.

The layer-to-layer adhesion is dependent on the printing temperature. If the resin was too far below its melting point, very poor layer to layer adhesion was found. As the solid resin temperature was set to be just below or at the melting temperature of the resin, the layer to layer adhesion was greatly improved.

Additionally, the selective heating of the solid or semi-solid resin on either the prior printed (exposed or cured) layer or the uncured surface of the layer being deposited onto the printed surface using infrared light (or contact with, e.g., a hot plate) also gave good layer-to-layer adhesion after curing. Depending on the thickness of the layer, it was possible to obtain isolated surface heating in some samples, preserving the crystalline structure within a layer. Such surface heating could be exaggerated by the addition of a small amount of pigment material, e.g. carbon black (such as with the use of a sprayer onto the layer). In this latter case, the pigment material (e.g., carbon black) also served as a light blocker to prevent light from penetrating very far into the next layer.

Layer-to-layer adhesion could also be controlled in the x,y dimensions of each layer with selective heating using a mask (or DMD, digital micromirror device) and allowed for the creation of cured layers with both adhered and not-adhered features in a printed part, which effectively allowed for the creation of slip zones within the printed part (e.g., controlled delamination or slippage of layers when stressed) in some sections of the printed part but not in others. This is an advantageous design feature for controlling, e.g., where and/or what magnitude of stress causes failure of interlayer adhesion.

Example 4

Forming Multiphase Materials from Solid Resin

This example describes the formation of a multiphase polymer materials from a single solid resin sheet, which can be used to form the objects in the methods and systems as further described herein.

A resin was formed having 95 wt % polycaprolactone diacrylate (14 Mn), 4 wt % 3,3,5-trimethylcyclohexyl 2-(methacryloxy)benzoate (HSMA, a monofunctional methacrylate), and 1 wt % Diphenyl(2,4,6-trimethylbenzoyl) phosphine oxide (TPO, photoinitiator). The resin was heated to 80° C. to form a hot homogenous and clear liquid. A sample of the resin was prepared by pouring the resin onto a glass slide, and 1 mm spacers were provided before a second glass slide was placed on top of the resin to form a sandwich (i.e., resin positioned between two pieces of glass spaced 1 mm apart). The layer of resin was then cooled to room temperature by placing on a large metal plate, which acted as a heat sink. The resin sample phase-separated as some of the polycaprolactone formed a crystalline phase in the material during cooling, and it was observed that the resin sample turned from clear to white.

Figure 13A:
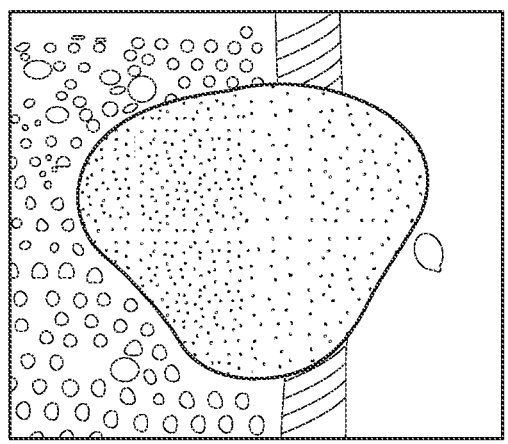
FIG. 13A illustrates an uncured resin sample having a relatively low temperature region (left) and a relatively high temperature region (right)

The sample solid resin layer was placed, evenly divided, between two metal plates. The first of the two metal plates was set to provide a temperature of 80° C. and the second of the two metal plates was set to provide a temperature of 30° C. (i.e., the resin was temperature controlled to have a first region at a first temperature and a second region at a second temperature). The first region of the solid resin (i.e., the region warmed to 80° C.) was clear while the second region of the solid resin (i.e., the region warmed to 30° C.) remained cloudy white, as shown in FIG. 13A. The region warmed to 80° C. appeared clear due to the polycaprolactone being in a melted phase, thus being free to mix and diffuse into the resin to become homogenous. In contrast, the region warmed to 30° C. was cloudy due to the crystals of polycaprolactone present in the region.

Figure 13B:
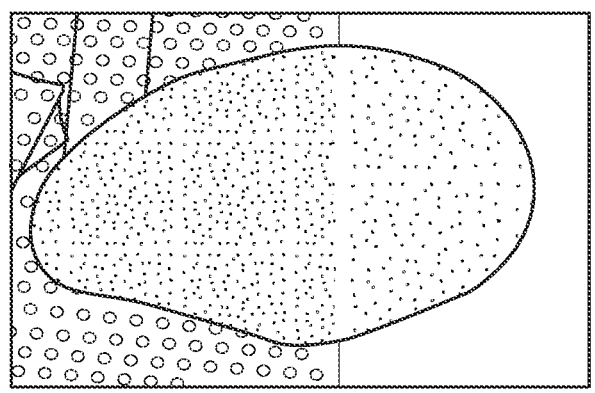
FIG. 13B illustrates an uncured resin including a filler and having a relatively low temperature region (left) and a relatively high temperature region (right)

A second sample of the resin was similarly prepared, with the addition of glass filler. The second sample was similarly warmed with a first region heated to 80° C. and a first region heated to 30° C. In the second sample comprising the glass filler, the region warmed to 80° C. was noticeably more translucent than the region warmed to 30° C., though both sides remained cloudy due to the presence of glass filler, as shown in FIG. 13B. The glass filler scatters light, thus retaining a cloudy visualization.

While the first sample was kept at the two temperatures (i.e., the first region being warmed to 80° C. and the second region being warmed to 30° C.), the layer comprising both regions of resin was photopolymerized for 30 seconds using a Dymax light source. The photopolymerized sample was then placed onto a hot plate and post-cured at 100° C. in a Dymax light cure box for 6 minutes. The polymerized sample was then cooled to room temperature, whereupon different optical and physical properties of the first and second regions corresponding with the first and second temperatures, respectively, were observed and determined. The modulus of the second region (i.e., the region photopolymerized at 30° C.) was 200 MPa higher than that of the modulus of the first region (i.e., the region photopolymerized at 80° C.). The second region (i.e., the region photopolymerized at 80° C.) was slightly transparent and much less cloudy than the first region (i.e., the region photopolymerized at 30° C.). This demonstrated the temperature at which regions of the resin were held during the curing process greatly affected the resulting physical characteristics of the polymerized material.

Figure 13C:
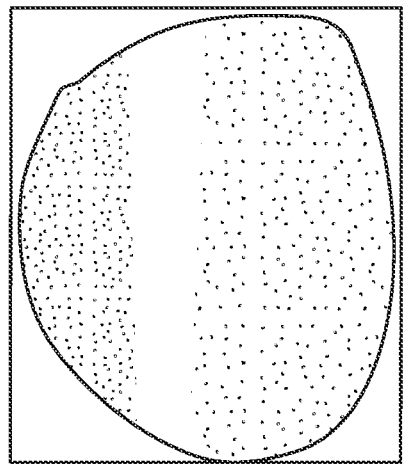
FIG. 13C illustrates a cured polymeric material that was cured while the resin had a relatively low temperature region (left), a relatively high temperature region (right), and an amorphous region between the two (off-center left).

A third sample of the resin was similarly prepared as the first, and a first region of the sample was cooled and allowed to crystallize while a second region was kept at 90° C. The second region was a clear solution because polycaprolactone melts at 60° C. (i.e., crystallization was not occurring in the heated region and the polycaprolactone was in a melted state). The entire sample was photopolymerized for 30 seconds using a Dymax light source and was then post-cured at 90° C. in a light box for 6 minutes. It was observed that, even during the post-cure wherein the entire sample was warmed to 90° C., the first region remained white, indicating that the crystallized polycaprolactone was locked into a phase-separated material and would not melt like it would as a hot resin. Following the post-cure and subsequent cooling to room temperature, the second region (i.e., the region photopolymerized at 90° C.) displayed crystallization of the polymerized polycaprolactone, as shown in FIG. 13C (the left side being the first region, photopolymerized while cool, and the right side being the second region, photopolymerized while heated). By controlling the temperature during the photopolymerization, the domain size for the crystalline regions could also be controlled. The cold-cured side had larger crystalline domains compared to the hot-cured side. The area between the two temperatures, in this sample, appeared to have the smallest domain size (i.e., the most translucent region), which implies that there are in-between temperatures that produce a more homogenous material than either the 30° C. or 90° C. regions. Without being limited to a particular theory, the hot-cured region may be undergoing a photopolymerization-induced phase separation (PIPS) which leads to Poly(caprolactone) being able to form its own phase which then crystallized upon cooling, whereas the in-between region does not have enough chain mobility and/or diffusion to lead to such phase separation, thus creating a more homogenously mixed polymer matrix with greatly reduced crystallization of the Poly(caprolactone). This demonstrated that materials formed with the processes and methods described herein can contain at least 3 different phases (e.g., an amorphous polymer phase, a crystalline polymer phase, and silica as a non-continuous inorganic amorphous glass phase) in a multiphase system. The example also demonstrated control of a gradient of material properties between two temperature-controlled regions, each of which have different material properties that are directly linked to the temperature at which photopolymerization occurs.

Example 5

Materials from Solid Resins with Filler

This example describes the formation of a polymer materials from a single solid resin sheet including a filler. Properties of the materials photopolymerized at different temperatures was determined.

A resin was compared comprising 50.5 wt % polycaprolactone diacrylate (14 Mn), 43.85 wt % 3,3,5-trimethylcyclohexyl 2-(methacryloxy)benzoate (HSMA, a monofunctional methacrylate), 4.7 wt % glass filler (approximately 800 microns), and 0.95 wt % Diphenyl(2,4,6-trimethylbenzoyl) phosphine oxide (TPO, photoinitiator). The resin sample was divided into two portions. A first portion was heated to 90° C. and was photopolymerized while hot by exposing the resin to a Dymax light source for 3 minutes to form the first polymerized material (i.e., the hot-cured sample). The hot-cured sample was allowed to cool to room temperature, whereupon crystallization of the polycaprolactone was observed.

The second portion of the resin sample was heated to 90° C. and then cooled to room temperature. Crystallization was observed and then the sample was photopolymerized by exposing the resin to a Dymax light source for 30 seconds to form the second polymerized material (i.e., the cold-cured sample). The sample was then post-cured by warming to 90° C. and cured in a Dymax light source for 3 minutes. Even while heated to 90° C., the cold-photocured material comprising the crystallized material remained white in appearance, implying that the crystalline domains did not melt, or alternatively implying the crystalline domains contain air voids that do not coalesce, which may be expected when heated above 60° C. Normally, polycaprolactone crystals have a melting point of about 60° C., but the cold-polymerized samples do not go clear with heating (unlike the hot-photocured samples, which do go clear upon heating above 60° C.), thus indicating that some internal structures were locked-in during the cold-polymerization that are resistant to change.

Figure 14:
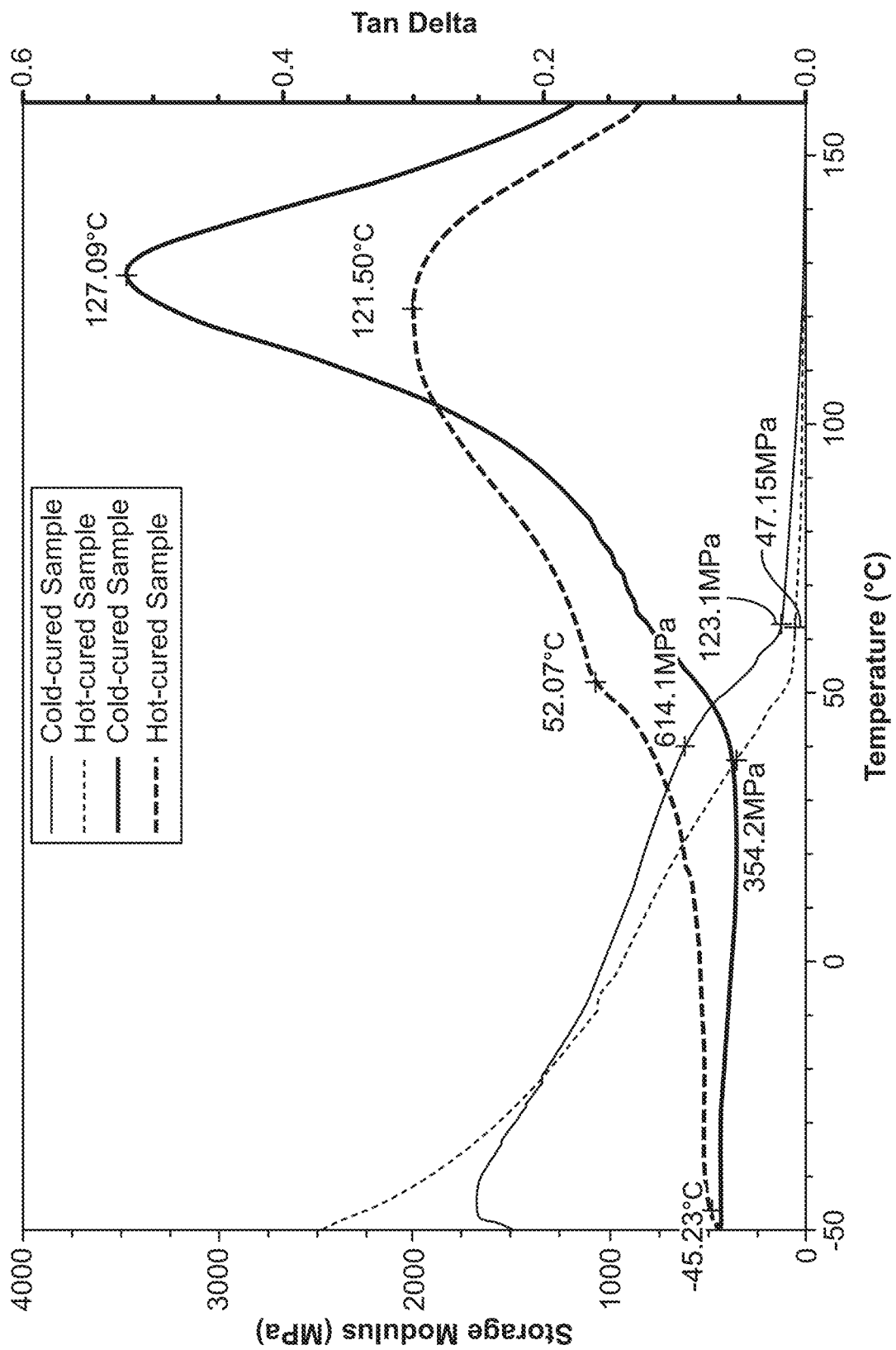
FIG. 14 illustrates differences in physical data from polymeric materials cured while the resin was either at a relatively cool temperature or at a relatively hot temperature.

Both the hot-cured sample and the cold-cured sample were stored at room temperature for 48 hours prior to assessing with dynamic mechanical analysis. Storage Modulus (MPa over temperature) and Tan Delta (over temperature) were determined in the dynamic mechanical analysis, as shown in FIG. 14. The addition of glass fiber appeared to influence crystallization behavior of the polycaprolactone diacrylate, as both hot-cured sample and cold-cured sample displayed relatively high glass transition temperature. The cold-cured sample had a relatively high modulus measured at 40° C. (e.g., near oral temperature), higher than the hot-cured sample. This indicated an enhanced crystallization in the cooled and crystallized resin was occurring, which may be assisted with the addition of the glass fiber filler. This result indicates that fillers, such as glass fiber, can be added to a resin as described herein in order to enhance phase separation and/or to act as crystallization seeds of multiphase materials.

Example 6

Rapidly Heating a Solid Resin

This example describes the formation of a multiphase polymer materials from a single solid resin sheet using a source of heat to regionally quickly control the temperature of the heated region.

A resin was formed having 95 wt % polycaprolactone diacrylate (14 Mn), 4 wt % 3,3,5-trimethylcyclohexyl 2-(methacryloxy)benzoate (HSMA, a monofunctional methacrylate), and 1 wt % Diphenyl(2,4,6-trimethylbenzoyl) phosphine oxide (TPO, photoinitiator). The resin was heated to 80° C. to form a hot homogenous and clear liquid. A layer sample of the resin was prepared by pouring the resin onto a 100-micrometer sheet of fluoropolymer (avoiding the use of glass which acts as a heat sink). The resin was spread onto the fluoropolymer film and was allowed to cool, whereupon it solidified upon the crystallization of the polycaprolactone. The film carrying the resin sample was suspended into the air by attaching clamps to each end of the fluoropolymer film with the resin positioned on the top of the film. A heat lamp (e.g., infrared light source) was placed in proximity to the resin sample. A square mask was placed on top of the sample such that projected light would be exposed to the center of the sample in a square. The heat lamp was activated for 10 seconds, and the square image of the projection passing through the square mask was observable as a clear spot in the middle of the sample, surrounded by the cold resin which was cloudy and white. The heat lamp was removed and the entire resin sample (i.e., in the absence of the mask) was photopolymerized with a 495 nm Semray LED curing system for 15 seconds. The sample was then placed on a hot metal plate set to 100° C. while in a Dymax light curing chamber, and was post-cured for 6 minutes. The sample was then cooled to room temperature and the sample had an observable square portion in the center of the sample corresponding with the region that was exposed to the heat lamp (e.g., exposed to infrared irradiation). The central square portion was observed to have less white cloudiness and more clarity, indicating less crystallinity and/or smaller crystalline domains were present inside the square versus the other regions of the multiphase material (i.e., the regions cured while not heated). The region of material within the square was softer (i.e., had lower modulus) than the material outside the square.

This demonstrated that infrared light can be used to selectively heat portions of a single layer of resin prior to curing, and that such a process changes the physical and visual characteristics of the cured material. This also demonstrated that the infrared light source could very quickly warm layers of resins as described further herein, indicating such heating could be used to quickly adjust layers, e.g., when printing an object using a 3D printer (such as those further described herein).

Example 7

Treatment Using an Orthodontic Appliance

This example describes the use of a directly 3D printed orthodontic appliance to move a patient's teeth according to a treatment plan. This example also describes the characteristics that the orthodontic appliance can have following its use, in contrast to its characteristics prior to use.

A patient in need of, or desirous of, a therapeutic treatment to rearrange at least one tooth has arrangement of the patient's teeth assessed. An orthodontic treatment plan is generated for the patient. The orthodontic treatment plan comprises a plurality of intermediate tooth arrangements for moving teeth along a treatment path, from the initial arrangement (e.g., that which was initially assessed) toward a final arrangement. The treatment plan includes the use of an orthodontic appliance, fabricated using the printable resins and methods disclosed further herein. In some embodiments, a plurality of orthodontic appliances are used, each of which can be fabricated using the printable resins and methods disclosed further herein.

The orthodontic appliances are provided, and iteratively applied to the patient's teeth to move the teeth through each of the intermediate tooth arrangements toward the final arrangement. The patient's tooth movement is tracked. A comparison is made between the patient's actual teeth arrangement and the planned intermediate arrangement. Where the patient's teeth are determined to be tracking according to the treatment plan, but have not yet reached the final arrangement, the next set of appliances can be administered to the patient. The threshold difference values of a planned position of teeth to actual positions selected as indicating that a patient's teeth have progressed on-track are provided above in Table 1. If a patient's teeth have progressed at or within the threshold values, the progress is considered to be on-track. Favorably, the use of the appliances disclosed herein increases the probability of on-track tooth movement.

The assessment and determination of whether treatment is on-track can be conducted, for example, 1 week (7 days) following the initial application of an orthodontic appliance. Following this period of application, additional parameters relating to assessing the durability of the orthodontic appliance can also be conducted. For example, relative repositioning force (compared to that which was initially provided by the appliance), remaining flexural stress, relative flexural modulus, and relative elongation at break can be determined.

What is claimed is:

1. A method for producing a polymeric material, the method comprising:
    providing a resin;
    with a first element, spatially controlling a temperature of the resin, the resin comprising:
        a first region having a first temperature; and
        a second region having a second temperature; and
    with a second element, photopolymerizing the first region of the resin having the first temperature and the second region of the resin having the second temperature to form a polymeric material,
        wherein the resin phase separates into two or more phases before polymerization.

2. The method of claim 1, wherein:
    the photopolymerizing of the polymeric material further comprises producing a first polymerized region comprising at least a portion of the first region and a second polymerized region comprising at least a portion of the second region,
    wherein the first polymerized region has at least one characteristic different from the second polymerized region, the at least one characteristic selected from the group consisting of elongation at break, storage modulus, tensile modulus, and stress remaining, color, transparency, hydrophobicity, lubricity, surface texture, percent crystallinity, and phase composition ratio.

3. The method of claim 1, wherein the first temperature and the second temperature are different, and the difference between the first temperature and the second temperature is 10° C. or greater.

4. The method of claim 1, further comprising providing a mask.

5. The method of claim 1, further comprising applying the resin to a substrate.

6. The method of claim 5, wherein the substrate comprises a fluoropolymer.

7. The method of claim 1, further comprising fabricating an object.

8. The method of claim 7, wherein the fabricating comprises printing the resin with a 3D printer.

9. The method of claim 7, wherein the fabricating comprises stereolithography, digital light processing, two photon-induced photopolymerization, inkjet printing, multijet printing, fused deposition modeling, or any combination thereof.

10. The method of claim 7, wherein the object comprises a plurality of regions having at least one differing characteristic, the at least one differing characteristic selected from the group consisting of elongation at break, storage modulus, tensile modulus, stress remaining, glass transition temperature, water uptake, hardness, color, transparency, hydrophobicity, lubricity, surface texture, percent crystallinity, and phase composition ratio.

11. The method of claim 10, wherein the plurality of regions each have a size dimension less than 150 μm.

12. The method of claim 10, wherein the object has a voxel size for any particular region having a one to three size dimensions less than 150 μm.

13. The method of claim 1, wherein the resin comprises a crystalline form of a material and one of the first region or the second region comprises a melted form of the material.

14. The method of claim 1, wherein the resin is homogenous.

15. The method of claim 1, further comprising separating at least a subset of the two or more phases upon a change in temperature.

16. The method of claim 1, further comprising separating at least a subset of the two or more phases upon photopolymerization.

17. The method of claim 1, wherein the resin comprises a plurality of monomers, at least a portion of which copolymerize at the first temperature and homopolymerize at the second temperature.

18. The method of claim 1, wherein the resin comprises a plurality of monomers, at least a portion of which copolymerize at the second temperature and homopolymerize at the first temperature.

19. The method of claim 1, wherein the spatially controlling the temperature of the resin initiates a secondary chemical reaction.

20. The method of claim 19, wherein the secondary chemical reaction comprises an ionic thermal reaction, an epoxide polymerization, an ionic thermal polymerization, a bond breaking reaction, a bond forming reaction, activation of a catalyst, or any combination thereof.

21. The method of claim 7, wherein the object is an orthodontic appliance, and wherein the orthodontic appliance is an aligner, expander, or spacer.

22. The method of claim 1, wherein the photopolymerization comprises simultaneously irradiating the first region and the second region.

23. The method of claim 1, wherein the first element comprises an energy source comprising an infrared light, a microwave source, an ultrasonic energy source, a laser, a light emitting diode (LED), a direct contact heat source, or any combination thereof.

24. The method of claim 1, wherein the first element comprises an element for energy delivery comprising a temperature controlled plate, a spray jet, a digital light processor, a thermally conductive temperature controlled plate, a thermally conductive temperature controlled pin, or any combination thereof.

25. The method of claim 1, wherein the second element comprises a microwave light source, an infrared light source, a visible light source, an ultraviolet light source, a UVA light source, a UVB light source, a UVC light source, a laser light source, a broadband light source, a narrowband light source, a continuous light source, a pulsed light source, or any combination thereof.

* * * * *